United States Patent
Donnelly et al.

(10) Patent No.: US 12,521,412 B2
(45) Date of Patent: Jan. 13, 2026

(54) NUCLEIC ACIDS AND NUCLEIC ACID ANALOGS FOR TREATING, PREVENTING, AND DISRUPTING PATHOLOGICAL POLYNUCLEOTIDE-BINDING PROTEIN INCLUSIONS

(71) Applicants: UNIVERSITY OF PITTSBURGH—OF THE COMMONWEALTH SYSTEM OF HIGHER EDUCATION, Pittsburgh, PA (US); THE TRUSTEES OF THE UNIVERSITY OF PENNSYLVANIA, Philadelphia, PA (US)

(72) Inventors: Christopher Donnelly, Pittsburgh, PA (US); Jacob Mann, Pittsburgh, PA (US); James Shorter, Philadelphia, PA (US); Lin Guo, Philadelphia, PA (US); Bede Portz, Philadelphia, PA (US)

(73) Assignees: UNIVERSITY OF PITTSBURGH OF THE COMMONWEALTH SYSTEM OF HIGHER EDUCATION, Pittsburgh, PA (US); THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 1155 days.

(21) Appl. No.: 17/268,654

(22) PCT Filed: Aug. 16, 2019

(86) PCT No.: PCT/US2019/046869
§ 371 (c)(1),
(2) Date: Feb. 16, 2021

(87) PCT Pub. No.: WO2020/037234
PCT Pub. Date: Feb. 20, 2020

(65) Prior Publication Data
US 2021/0169914 A1    Jun. 10, 2021

Related U.S. Application Data

(60) Provisional application No. 62/764,828, filed on Aug. 16, 2018.

(51) Int. Cl.
*A61K 31/7088* (2006.01)
*A61P 25/28* (2006.01)

(52) U.S. Cl.
CPC .......... *A61K 31/7088* (2013.01); *A61P 25/28* (2018.01)

(58) Field of Classification Search
CPC . A61K 31/7088; A61K 31/7105; A61P 25/28; C12N 2310/13; C12N 15/11
See application file for complete search history.

(56) References Cited

U.S. PATENT DOCUMENTS

| 2003/0087848 A1 | 5/2003 | Bratzler et al. |
| 2015/0275205 A1 | 10/2015 | Miller et al. |
| 2017/0211064 A1 | 7/2017 | Rigo |
| 2017/0268001 A1* | 9/2017 | Khodarev ............ A61K 31/713 |

FOREIGN PATENT DOCUMENTS

| WO | 2012/174666 A1 | 12/2012 |
| WO | 2015/191780 A2 | 12/2015 |

OTHER PUBLICATIONS

Branlant (et al. 1980. Nucleotide sequences of nuclear U1A RNAs from chicken, rat and man. Nuc. Ac. Res. 8[18]:4143-4154) (Year: 1980).*
Soto (and Satani. 2011. The intricate mechanisms of neurodegeneration in prion diseases. Trend Molec. Med. 17[1]:14-24) (Year: 2011).*
Lakhin ( et al. 2013. Aptamers: Problems, Solutions and Prospects. Acta naturae 5[4{19}]: 34-43 (Year: 2013).*
Bai (et al. 2013. U1 small nuclear ribonucleoprotein complex and RNA splicing alterations in Alzheimer's disease. PNAS 110[41]: 16562-16567) (Year: 2013).*
Branca (et al. 2014. Pharmacological targeting of the β-amyloid precursor protein intracellular domain. Sci. Rep. 4:4618) (Year: 2014).*
Molday (and Moritz. 2015. Photoreceptors at a glance. J. Cell Sci. 128[22]:4039-4045) (Year: 2015).*
Zhou (and Rossi. 2016. Aptamers as targeted therapeutics: current potential and challenges. Drug Discov. 16:181-202 (Year: 2016).*
Kovacevic (et al. 2018. Pharmacokinetics, pharmacodynamics and safety of aptamers. Advanced Drug Delivery Reviews 134:36-50) (Year: 2018).*
Zheng ( t al. Mar. 2018. Novel DNA Aptamers for Parkinson's Disease Treatment Inhibit α-Synuclein Aggregation and Facilitate its Degradation. Molec. Ther. Nucleic Acid 11:228-242) (Year: 2018).*

(Continued)

*Primary Examiner* — Nancy J Leith
*Assistant Examiner* — Ruth Sophia Arieti
(74) *Attorney, Agent, or Firm* — Meunier Carlin & Curiman LLC.

(57) ABSTRACT

Disclosed herein are methods to treat a neurodegenerative disease comprising administering to a subject with a neurodegenerative disease a therapeutically effective amount of a polynucleotide that binds a nucleic acid-binding polypeptide, wherein the nucleic acid-binding polypeptide can aggregate in cells and is associated with a neurodegenerative disease. Also disclosed are methods to inhibit protein aggregation in a cell comprising contacting the cell with a composition comprising a polynucleotide that binds a nucleic acid-binding polypeptide, wherein the nucleic acid-binding polypeptide can aggregate in cells and is associated with a neurodegenerative disease. Additionally disclosed are compositions comprising a polynucleotide that binds a nucleic acid-binding polypeptide, wherein the nucleic acid-binding polypeptide can aggregate in cells and is associated with a neurodegenerative disease.

18 Claims, 13 Drawing Sheets
Specification includes a Sequence Listing.

(56) References Cited

OTHER PUBLICATIONS

Jiang (et al. Aug. 13, 2018. Alpha-Synuclein Modulates the Physical Properties of DNA. Chemistry A European J. 24[58]:15685-15690) (Year: 2018).*
Wikipedia (version last edited May 12, 2018. "U1 spliceosomal RNA". Available online at Wikipedia.org. Accessed on Oct. 17, 2024) (Year: 2018).*
Park (2019. Rhodopsin oligomerization and aggregation. J. Membrane Biol. 252:413-423) (Year: 2019).*
Lerga (et al. 2001. Identification of an RNA Binding Specificity for the Potential Splicing Factor TLS. J. Biol. Chem. 276[9]:6807-6816) (Year: 2001).*
Nolan (et al. 2016. Pathogenesis of FUS-associated ALS and FTD: insights from rodent models. Acta Neuropathol. Commun. 4[1]:99) (Year: 2016).*
Qu (et al. 2017. Aptamer and its applications in neurodegenerative diseases. Cell. Mol. Life Sci. 74:683â695) (Year: 2017).*
Chi (et al. Jun. 2018. Interactome analyses revealed that the U1 snRNP machinery overlaps extensively with the RNAP II machinery and contains multiple ALS/SMA-causative proteins. Sci. Rep. 8:8755) (Year: 2018).*
Afroz, T., Hock, E.-M., Ernst, P., Foglieni, C., Jambeau, M., Gilhespy, L.A.B., Laferriere, F., Maniecka, Z., Plückthun, A., Mittl, P., et al. (2017). Functional and dynamic polymerization of the ALS-linked protein TDP-43 antagonizes its pathologic aggregation. Nat. Commun. 8, 45.
Alami, N. H., Smith, R. B., Carrasco, M. A., Williams, L. A., Winborn, C. S., Han, S. S., . . . & Taylor, J. P. (2014). Axonal transport of TDP-43 mRNA granules is impaired by ALS-causing mutations. Neuron, 81(3), 536-543.
Al-Sarraj, S., King, A., Troakes, C., Smith, B., Maekawa, S., Bodi, I., Rogelj, B., Al-Chalabi, A., Hortobágyi, T., and Shaw, C.E. (2011). p62 positive, TDP-43 negative, neuronal cytoplasmic and intranuclear inclusions in the cerebellum and hippocampus define the pathology of C9orf72-linked FTLD and MND/ALS. Acta Neuropathol. 122, 691-702.
Altschul, S. F., Gish, W., Miller, W., Myers, E. W., & Lipman, D. J. (1990). Basic local alignment search tool. Journal of molecular biology, 215(3), 403-410.
Altschul, S. F., Madden, T. L., Schäffer, A. A., Zhang, J., Zhang, Z., Miller, W., & Lipman, D. J. (1997). Gapped BLAST and PSI-BLAST: a new generation of protein database search programs. Nucleic acids research, 25(17), 3389-3402.
Amador-Ortiz, Catalina, et al. TDP-43 immunoreactivity in hippocampal sclerosis and Alzheimer's disease. Annals of Neurology: Official Journal of the American Neurological Association and the Child Neurology Society 61.5 (2007): 435-445.
Anderson, P., and Kedersha, N. (2008). Stress granules: the Tao of RNA triage. Trends Biochem. Sci. 33, 141-150.
Arnold, E.S., Ling, S.-C., Huelga, S.C., Lagier-Tourenne, C., Polymenidou, M., Ditsworth, D., Kordasiewicz, H.B., McAlonis-Downes, M., Platoshyn, O., Parone, P.A., et al. (2013). ALS-linked TDP-43 mutations produce aberrant RNA splicing and adult-onset motor neuron disease without aggregation or loss of nuclear TDP-43. Proc. Natl. Acad. Sci. USA 110, E736-45.
Avis, Johanna M., et al. Solution structure of the N-terminal RNP domain of U1A protein: the role of C-terminal residues in structure stability and RNA binding. Journal of molecular biology 257.2 (1996): 398-411.
Ayala, Y.M., De Conti, L., Avendaño-Vázquez, S.E., Dhir, A., Romano, M., D'Ambrogio, A., Tollervey, J., Ule, J., Baralle, M., Buratti, E., et al. (2011). TDP-43 regulates its mRNA levels through a negative feedback loop. EMBO J. 30, 277-288.
Baloh, R.H. (2011). TDP-43: the relationship between protein aggregation and neurodegeneration in amyotrophic lateral sclerosis and frontotemporal lobar degeneration. FEBS J. 278, 3539-3549.
Barmada, Sami J., et al. Autophagy induction enhances TDP43 turnover and survival in neuronal ALS models. Nature chemical biology 10.8 (2014): 677-685.

Becker, L.A., Huang, B., Bieri, G., Ma, R., Knowles, D.A., Jafar-Nejad, P., Messing, J., Kim, H.J., Soriano, A., Auburger, G., et al. (2017). Therapeutic reduction of ataxin-2 extends lifespan and reduces pathology in TDP-43 mice. Nature 544, 367-371.
Bentmann, E., Neumann, M., Tahirovic, S., Rodde, R., Dormann, D., and Haass, C. (2012). Requirements for stress granule recruitment of fused in sarcoma (FUS) and TAR DNA-binding protein of 43 kDa (TDP-43). J. Biol. Chem. 287, 23079-23094.
Bhardwaj, A., Myers, M.P., Buratti, E., and Baralle, F.E. (2013). Characterizing TDP-43 interaction with its RNA targets. Nucleic Acids Res. 41, 5062-5074.
Boeynaems, S., and Gitler, A.D. (2018). Pour Some Sugar on TDP(-43). Mol. Cell 71, 649-651.
Boeynaems, S., Bogaert, E., Van Damme, P., and Van Den Bosch, L. (2016). Inside out: the role of nucleocytoplasmic transport in ALS and FTLD. Acta Neuropathol. 132, 159-173.
Brangwynne, C.P., Eckmann, C.R., Courson, D.S., Rybarska, A., Hoege, C., Gharakhani, J., Jülicher, F., and Hyman, A.A. (2009). Germline P granules are liquid droplets that localize by controlled dissolution/condensation. Science 324, 1729-1732.
Brangwynne, C.P., Tompa, P., and Pappu, R.V. (2015). Polymer physics of intracellular phase transitions. Nat. Phys. 11, 899-904.
Brown, Robert H., and Ammar Al-Chalabi. Amyotrophic lateral sclerosis. New England Journal of Medicine 377.2 (2017a): 162-172.
Brown, Robert H., and Ammar Al-Chalabi. Amyotrophic lateral sclerosis. New England Journal of Medicine 377.2 (2017b): 1602.
Buratti, E., and Baralle, F.E. (2001). Characterization and functional implications of the RNA binding properties of nuclear factor TDP-43, a novel splicing regulator of CFTR exon 9. J. Biol. Chem. 276, 36337-36343.
Buratti, Emanuele, et al. Nuclear factor TDP-43 can affect selected microRNA levels. The FEBS journal 277.10 (2010): 2268-2281.
Buratti, Emanuele. Functional significance of TDP-43 mutations in disease. Advances in genetics 91 (2015): 1-53.
Chang, C., Wu, T.-H., Wu, C.-Y., Chiang, M., Toh, E.K.-W., Hsu, Y.-C., Lin, K.-F., Liao, Y., Huang, T., and Huang, J.J.-T. (2012). The N-terminus of TDP-43 promotes its oligomerization and enhances DNA binding affinity. Biochem. Biophys. Res. Commun. 425, 219-224.
Choi, SunKyung, et al. An in vitro technique to identify the RNA binding-site sequences for RNA-binding proteins. BioTechniques 63.1 (2017): 28-33.
Colombrita, C., Onesto, E., Megiorni, F., Pizzuti, A., Baralle, F. E., Buratti, E., . . . & Ratti, A. (2012). TDP-43 and FUS RNA-binding proteins bind distinct sets of cytoplasmic messenger RNAs and differently regulate their post-transcriptional fate in motoneuron-like cells. Journal of Biological Chemistry, 287(19), 15635-15647.
Colombrita, C., Zennaro, E., Fallini, C., Weber, M., Sommacal, A., Buratti, E., Silani, V., and Ratti, A. (2009). TDP-43 is recruited to stress granules in conditions of oxidative insult. J. Neurochem. 111, 1051-1061.
Conicella, A.E., Zerze, G.H., Mittal, J., and Fawzi, N.L. (2016). ALS Mutations Disrupt Phase Separation Mediated by α-Helical Structure in the TDP-43 Low-Complexity C-Terminal Domain. Structure 24, 1537-1549.
Cordeiro, Yraima, et al. DNA converts cellular prion protein into the β-sheet conformation and inhibits prion peptide aggregation. Journal of Biological Chemistry 276.52 (2001): 49400-49409.
Daigle, J.G., Lanson, N.A., Smith, R.B., Casci, I., Maltare, A., Monaghan, J., Nichols, C.D., Kryndushkin, D., Shewmaker, F., and Pandey, U.B. (2013). RNA-binding ability of FUS regulates neurodegeneration, cytoplasmic mislocalization and incorporation into stress granules associated with FUS carrying ALS-linked mutations. Hum. Mol. Genet. 22, 1193-1205.
Dewey, Colleen M., Basar Cenik, Chantelle F. Sephton, Brett A. Johnson, Joachim Herz, and Gang Yu. TDP-43 aggregation in neurodegeneration: are stress granules the key?. Brain research 1462 (2012): 16-25.
Donato, R., Miljan, E.A., Hines, S.J., Aouabdi, S., Pollock, K., Patel, S., Edwards, F.A., and Sinden, J.D. (2007). Differential development of neuronal physiological responsiveness in two human neural stem cell lines. BMC Neurosci. 8, 36.

(56) References Cited

OTHER PUBLICATIONS

Elbaum-Garfinkle, S., Kim, Y., Szczepaniak, K., Chen, C.C.-H., Eckmann, C.R., Myong, S., and Brangwynne, C.P. (2015). The disordered P granule protein LAF-1 drives phase separation into droplets with tunable viscosity and dynamics. Proc. Natl. Acad. Sci. USA 112, 7189-7194.

Elden, A.C., Kim, H.-J., Hart, M.P., Chen-Plotkin, A.S., Johnson, B.S., Fang, X., Armakola, M., Geser, F., Greene, R., Lu, M.M., et al. (2010). Ataxin-2 intermediate-length polyglutamine expansions are associated with increased risk for ALS. Nature 466, 1069-1075.

Fernandes, N., Eshleman, N., and Buchan, J.R. (2018). Stress granules and ALS: A case of causation or correlation? Adv. Neurobiol. 20, 173-212.

Freibaum, B.D., Lu, Y., Lopez-Gonzalez, R., Kim, N.C., Almeida, S., Lee, K.-H., Badders, N., Valentine, M., Miller, B.L., Wong, P.C., et al. (2015). GGGGCC repeat expansion in C9orf72 compromises nucleocytoplasmic transport. Nature 525, 129-133.

Gendron, T. F., Rademakers, R., & Petrucelli, L. (2013). TARDBP mutation analysis in TDP-43 proteinopathies and deciphering the toxicity of mutant TDP-43. Journal of Alzheimer's Disease, 33(s1), S35-S45.

Gopal, P.P., Nirschl, J.J., Klinman, E., and Holzbaur, E.L.F. (2017). Amyotrophic lateral sclerosis-linked mutations increase the viscosity of liquid-like TDP-43 RNP granules in neurons. Proc. Natl. Acad. Sci. USA 114, E2466-E2475.

Guenther, E.L., Ge, P., Trinh, H., Sawaya, M.R., Cascio, D., Boyer, D.R., Gonen, T., Zhou, Z.H., and Eisenberg, D.S. (2018). Atomic-level evidence for packing and positional amyloid polymorphism by segment from TDP-43 RRM2. Nat. Struct. Mol. Biol. 25, 311-319.

Guo, L., Kim, H.J., Wang, H., Monaghan, J., Freyermuth, F., Sung, J.C., O'Donovan, K., Fare, C.M., Diaz, Z., Singh, N., et al. (2018). Nuclear-Import Receptors Reverse Aberrant Phase Transitions of RNA-Binding Proteins with Prion-like Domains. Cell 173, 677-692.e20.

Guo, W., Fumagalli, L., Prior, R., & Van Den Bosch, L. (2017). Current advances and limitations in modeling ALS/FTD in a dish using induced pluripotent stem cells. Frontiers in neuroscience, 11, 671.

Han, Tina W., et al. Cell-free formation of RNA granules: bound RNAs identify features and components of cellular assemblies. Cell 149.4 (2012): 768-779.

Harrison, A.F., and Shorter, J. (2017). RNA-binding proteins with prion-like domains in health and disease. Biochem. J. 474, 1417-1438.

Hasegawa, M., Arai, T., Nonaka, T., Kametani, F., Yoshida, M., Hashizume, Y., et al. & Akiyama, H. (2008). Phosphorylated TDP-43 in frontotemporal lobar degeneration and amyotrophic lateral sclerosis. Annals of Neurology: Official Journal of the American Neurological Association and the Child Neurology Society, 64(1), 60-70.

Henikoff, S., & Henikoff, J. G. (1992). Amino acid substitution matrices from protein blocks. Proceedings of the National Academy of Sciences, 89(22), 10915-10919.

Hirsch-Reinshagen, V., Pottier, C., Nicholson, A. M., Baker, M., Hsiung, G. Y. R., Krieger, C., . . . & Mackenzie, I. R. (2017). Clinical and neuropathological features of ALS/FTD with TIA1 mutations. Acta neuropathologica communications, 5(1), 1-13.

Hyman, Anthony A., Christoph A. Weber, and Frank Jülicher. Liquid-liquid phase separation in biology. Annual review of cell and developmental biology 30 (2014): 39-58.

Ishimaru, D., Ano Bom, A. P. D., Lima, L. M. T., Quesado, P. A., Oyama, M. F., de Moura Gallo, C. V., . . . & Silva, J. L. (2009). Cognate DNA stabilizes the tumor suppressor p53 and prevents misfolding and aggregation. Biochemistry, 48(26), 6126-6135.

Janssens, J., and Van Broeckhoven, C. (2013). Pathological mechanisms underlying TDP-43 driven neurodegeneration in FTLD-ALS spectrum disorders. Hum. Mol. Genet. 22, R77-87.

Johnson, B.S., Snead, D., Lee, J.J., McCaffery, J.M., Shorter, J., and Gitler, A.D. (2009). TDP-43 is intrinsically aggregation-prone, and amyotrophic lateral sclerosis-linked mutations accelerate aggregation and increase toxicity. J. Biol. Chem. 284, 20329-20339.

Jovičić, A., Mertens, J., Boeynaems, S., Bogaert, E., Chai, N., Yamada, S. B., . . . & Gitler, A. D. (2015). Modifiers of C9orf72 dipeptide repeat toxicity connect nucleocytoplasmic transport defects to FTD/ALS. Nature neuroscience, 18(9), 1226-1229.

Karlin, Samuel, and Stephen F. Altschul. Applications and statistics for multiple high-scoring segments in molecular sequences. Proceedings of the National Academy of Sciences 90.12 (1993): 5873-5877.

Kato, M., Han, T. W., Xie, S., Shi, K., Du, X., Wu, L. C., . . . & McKnight, S. L. (2012). Cell-free formation of RNA granules: low complexity sequence domains form dynamic fibers within hydrogels. Cell, 149(4), 753-767.

Kedersha, N., Chen, S., Gilks, N., Li, W., Miller, I. J., Stahl, J., & Anderson, P. (2002). Evidence that ternary complex (eIF2-GTP-tRNAi Met)-deficient preinitiation complexes are core constituents of mammalian stress granules. Molecular biology of the cell, 13(1), 195-210.

Kedersha, Nancy L., et al. RNA-binding proteins TIA-1 and TIAR link the phosphorylation of eIF-2α to the assembly of mammalian stress granules. The Journal of cell biology 147.7 (1999): 1431-1442.

Kim, H. J., Kim, N. C., Wang, Y. D., Scarborough, E. A., Moore, J., Diaz, Z., . . . & Taylor, J. P. (2013). Prion-like domain mutations in hnRNPs cause multisystem proteinopathy and ALS. Nature, 495(7442), 467-473.

Kim, H.-J., Raphael, A.R., LaDow, E.S., McGurk, L., Weber, R.A., Trojanowski, J.Q., Lee, V.M.-Y., Finkbeiner, S., Gitler, A.D., and Bonini, N.M. (2014). Therapeutic modulation of eIF2a phosphorylation rescues TDP-43 toxicity in amyotrophic lateral sclerosis disease models. Nat. Genet. 46, 152-160.

Kitamura, A., Nakayama, Y., Shibasaki, A., Taki, A., Yuno, S., Takeda, K., Yahara, M., Tanabe, N., and Kinjo, M. (2016). Interaction of RNA with a C-terminal fragment of the amyotrophic lateral sclerosis-associated TDP43 reduces cytotoxicity. Sci. Rep. 6, 19230.

Köhler, A., and Hurt, E. (2007). Exporting RNA from the nucleus to the cytoplasm. Nat. Rev. Mol. Cell Biol. 8, 761-773.

Kuo, P.-H., Doudeva, L.G., Wang, Y.-T., Shen, C.-K.J., and Yuan, H.S. (2009). Structural insights into TDP-43 in nucleic-acid binding and domain interactions. Nucleic Acids Res. 37, 1799-1808.

Lagier-Tourenne, C., Polymenidou, M., & Cleveland, D. W. (2010). TDP-43 and FUS/TLS: emerging roles in RNA processing and neurodegeneration. Human molecular genetics, 19(R1), R46-R64.

Lee, Edward B., Virginia M-Y. Lee, and John Q. Trojanowski. Gains or losses: molecular mechanisms of TDP43-mediated neurodegeneration Nature Reviews Neuroscience 13.1 (2012): 38-50.

Lee, Sebum, and Eric J. Huang. Modeling ALS and FTD with iPSC-derived neurons. Brain research 1656 (2017): 88-97.

Li, Y. R., King, O. D., Shorter, J., & Gitler, A. D. (2013). Stress granules as crucibles of ALS pathogenesis. Journal of cell biology, 201(3), 361-372.

Ling, J. P., Pletnikova, O., Troncoso, J. C., & Wong, P. C. (2015). TDP-43 repression of nonconserved cryptic exons is compromised in ALS-FTD. Science, 349(6248), 650-655.

Ling, S. C., Albuquerque, C. P., Han, J. S., Lagier-Tourenne, C., Tokunaga, S., Zhou, H., & Cleveland, D. W. (2010). ALS-associated mutations in TDP-43 increase its stability and promote TDP-43 complexes with FUS/TLS. Proceedings of the National Academy of Sciences, 107(30), 13318-13323.

Ling, S.-C., Polymenidou, M., and Cleveland, D.W. (2013). Converging mechanisms in ALS and FTD: disrupted RNA and protein homeostasis. Neuron 79, 416-438.

Liu, Yu-Chih, Po-Min Chiang, and Kuen-Jer Tsai. Disease animal models of TDP-43 proteinopathy and their pre-clinical applications. International journal of molecular sciences 14.10 (2013): 20079-20111.

Mackenzie, I. R., Nicholson, A. M., Sarkar, M., Messing, J., Purice, M. D., Pottier, C., . . . & Rademakers, R. (2017). TIA1 mutations in amyotrophic lateral sclerosis and frontotemporal dementia promote phase separation and alter stress granule dynamics. Neuron, 95(4), 808-816.

(56) References Cited

OTHER PUBLICATIONS

Mackenzie, I.R., Arzberger, T., Kremmer, E., Troost, D., Lorenzl, S., Mori, K., Weng, S.-M., Haass, C., Kretzschmar, H.A., Edbauer, D., et al. (2013). Dipeptide repeat protein pathology in C9ORF72 mutation cases: clinico-pathological correlations. Acta Neuropathol. 126, 859-879.

Maharana, S., Wang, J., Papadopoulos, D.K., Richter, D., Pozniakovsky, A., Poser, I., Bickle, M., Rizk, S., Guillén-Boixet, J., Franzmann, T.M., et al. (2018). RNA buffers the phase separation behavior of prion-like RNA binding proteins. Science 360, 918-921.

Mcgurk, L., Gomes, E., Guo, L., Mojsilovic-Petrovic, J., Tran, V., Kalb, R.G., Shorter, J., and Bonini, N.M. (2018). Poly(ADP-Ribose) Prevents Pathological Phase Separation of TDP-43 by Promoting Liquid Demixing and Stress Granule Localization. Mol. Cell 71, 703-717.e9.

McKee, A.C., Gavett, B.E., Stern, R.A., Nowinski, C.J., Cantu, R.C., Kowall, N.W., Perl, D.P., Hedley-Whyte, E.T., Price, B., Sullivan, C., et al. (2010). TDP-43 proteinopathy and motor neuron disease in chronic traumatic encephalopathy. J. Neuropathol. Exp. Neurol. 69, 918-929.

Mitrea, D. M., & Kriwacki, R. W. (2016). Phase separation in biology; functional organization of a higher order. Cell Communication and Signaling, 14(1), 1-20.

Molliex, A., Temirov, J., Lee, J., Coughlin, M., Kanagaraj, A.P., Kim, H.J., Mittag, T., and Taylor, J.P. (2015). Phase separation by low complexity domains promotes stress granule assembly and drives pathological fibrillization. Cell 163, 123-133.

Mompeán, M., Romano, V., Pantoja-Uceda, D., Stuani, C., Baralle, F.E., Buratti, E., and Laurents, D.V. (2017). Point mutations in the N-terminal domain of transactive response DNA-binding protein 43 kDa (TDP-43) compromise its stability, dimerization, and functions. J. Biol. Chem. 292, 11992-12006.

Monahan, Z., Ryan, V. H., Janke, A. M., Burke, K. A., Rhoads, S. N., Zerze, G. H., . . . & Fawzi, N. L. (2017). Phosphorylation of the FUS low-complexity domain disrupts phase separation, aggregation, and toxicity. The EMBO journal, 36(20), 2951-2967.

Murakami, T., Qamar, S., Lin, J. Q., Schierle, G. S. K., Rees, E., Miyashita, A., . . . & St George-Hyslop, P. (2015). ALS/FTD mutation-induced phase transition of FUS liquid droplets and reversible hydrogels into irreversible hydrogels impairs RNP granule function. Neuron, 88(4), 678-690.

Murray, D. T., Kato, M., Lin, Y., Thurber, K. R., Hung, I., McKnight, S. L., & Tycko, R. (2017). Structure of FUS protein fibrils and its relevance to self-assembly and phase separation of low-complexity domains. Cell, 171(3), 615-627.

Neumann, M., Kwong, L.K., Truax, A.C., Vanmassenhove, B., Kretzschmar, H.A., Van Deerlin, V.M., Clark, C.M., Grossman, M., Miller, B.L., Trojanowski, J.Q., et al. (2007). TDP-43-positive white matter pathology in frontotemporal lobar degeneration with ubiquitin-positive inclusions. J. Neuropathol. Exp. Neurol. 66, 177-183.

Neumann, M., Sampathu, D.M., Kwong, L.K., Truax, A.C., Micsenyi, M.C., Chou, T.T., Bruce, J., Schuck, T., Grossman, M., Clark, C.M., et al. (2006). Ubiquitinated TDP-43 in frontotemporal lobar degeneration and amyotrophic lateral sclerosis. Science 314, 130-133.

Nguyen, H.P., Van Broeckhoven, C., and van der Zee, J. (2018). ALS Genes in the Genomic Era and their Implications for FTD. Trends Genet. 34, 404-423.

Nonhoff, Ute, et al. Ataxin-2 interacts with the DEAD/H-box RNA helicase DDX6 and interferes with P-bodies and stress granules. Molecular biology of the cell 18.4 (2007): 1385-1396.

Nott, T.J., Petsalaki, E., Farber, P., Jervis, D., Fussner, E., Plochowietz, A., Craggs, T.D., Bazett-Jones, D.P., Pawson, T., Forman-Kay, J.D., et al. (2015). Phase transition of a disordered nuage protein generates environmentally responsive membraneless organelles. Mol. Cell 57, 936-947.

Patel, Avinash, et al. A liquid-to-solid phase transition of the ALS protein FUS accelerated by disease mutation. Cell 162.5 (2015): 1066-1077.

Patel, S.S., Belmont, B.J., Sante, J.M., and Rexach, M.F. (2007). Natively unfolded nucleoporins gate protein diffusion across the nuclear pore complex. Cell 129, 83-96.

Philips, T., and Rothstein, J.D. (2015). Rodent models of amyotrophic lateral sclerosis. Curr. Protoc. Pharmacol. 69, 5.67.1-21.

Polymenidou, M., Lagier-Tourenne, C., Hutt, K. R., Huelga, S. C., Moran, J., Liang, T. Y., . . . & Cleveland, D. W. (2011). Long pre-mRNA depletion and RNA missplicing contribute to neuronal vulnerability from loss of TDP-43. Nature neuroscience, 14(4), 459.

Prpar Mihevc, S., Baralle, M., Buratti, E., and Rogelj, B. (2016). TDP-43 aggregation mirrors TDP-43 knockdown, affecting the expression levels of a common set of proteins. Sci. Rep. 6, 33996.

Ryan, V. H., Dignon, G. L., Zerze, G. H., Chabata, C. V., Silva, R., Conicella, A. E., . . . & Fawzi, N. L. (2018). Mechanistic view of hnRNPA2 low-complexity domain structure, interactions, and phase separation altered by mutation and arginine methylation. Molecular cell, 69(3), 465-479.

Schmidt, H.B., and Rohatgi, R. (2016). In Vivo Formation of Vacuolated Multi-phase Compartments Lacking Membranes. Cell Rep. 16, 1228-1236.

Scotter, E.L., Chen, H.-J., and Shaw, C.E. (2015). TDP-43 Proteinopathy and ALS: Insights into Disease Mechanisms and Therapeutic Targets. Neurotherapeutics 12, 352-363.

Sephton, C. F., Cenik, C., Kucukural, A., Dammer, E. B., Cenik, B., Han, Y., . . . & Yu, G. (2011). Identification of neuronal RNA targets of TDP-43-containing ribonucleoprotein complexes. Journal of biological chemistry, 286(2), 1204-1215.

Shin, Y., and Brangwynne, C.P. (2017). Liquid phase condensation in cell physiology and disease. Science 357.

Shin, Y., Berry, J., Pannucci, N., Haataja, M.P., Toettcher, J.E., and Brangwynne, C.P. (2017). Spatiotemporal Control of Intracellular Phase Transitions Using Light-Activated optoDroplets. Cell 168, 159-171.e14.

Sun, Y., and Chakrabartty, A. (2017). Phase to Phase with TDP-43. Biochemistry 56, 809-823.

Sun, Y., Arslan, P.E., Won, A., Yip, C.M., and Chakrabartty, A. (2014). Binding of TDP-43 to the 3'UTR of its cognate mRNA enhances its solubility. Biochemistry 53, 5885-5894.

Taslimi, A., Vrana, J.D., Chen, D., Borinskaya, S., Mayer, B.J., Kennedy, M.J., and Tucker, C.L. (2014). An optimized optogenetic clustering tool for probing protein interaction and function. Nat. Commun. 5, 4925.

Tollervey, J. R., Curk, T., Rogelj, B., Briese, M., Cereda, M., Kayikci, M., . . . & Ule, J. (2011). Characterizing the RNA targets and position-dependent splicing regulation by TDP-43. Nature neuroscience, 14(4), 452-458.

Tourrière, H., Chebli, K., Zekri, L., Courselaud, B., Blanchard, J. M., Bertrand, E., & Tazi, J. (2003). The RasGAP-associated endoribonuclease G3BP assembles stress granules. The Journal of cell biology, 160(6), 823-831.

Van Eersel, J., Ke, Y. D., Gladbach, A., Bi, M., Götz, J., Kril, J. J., & Ittner, L. M. (2011). Cytoplasmic accumulation and aggregation of TDP-43 upon proteasome inhibition in cultured neurons. PloS one, 6(7), e22850.

Volkening, K., Leystra-Lantz, C., Yang, W., Jaffee, H., & Strong, M. J. (2009). Tar DNA binding protein of 43 kDa (TDP-43), 14-3-3 proteins and copper/zinc superoxide dismutase (SOD1) interact to modulate NFL mRNA stability. Implications for altered RNA processing in amyotrophic lateral sclerosis (ALS). Brain research, 1305, 168-182.

Wang, A., Conicella, A. E., Schmidt, H. B., Martin, E. W., Rhoads, S. N., Reeb, A. N., . . . & Fawzi, N. L. (2018). A single N-terminal phosphomimic disrupts TDP-43 polymerization, phase separation, and RNA splicing. The EMBO journal, 37(5), e97452.

Wegmann, S., Eftekharzadeh, B., Tepper, K., Zoltowska, K. M., Bennett, R. E., Dujardin, S., . . . & Hyman, B. T. (2018). Tau protein liquid-liquid phase separation can initiate tau aggregation. The EMBO journal, 37(7), e98049.

Williamson, J.R. (2000). Induced fit in RNA-protein recognition. Nat. Struct. Biol. 7,834-837.

Xiang, S., Kato, M., Wu, L. C., Lin, Y., Ding, M., Zhang, Y., . . . & McKnight, S. L. (2015). The LC domain of hnRNPA2 adopts

(56) References Cited

OTHER PUBLICATIONS similar conformations in hydrogel polymers, liquid-like droplets, and nuclei. Cell, 163(4), 829-839.

Xu, Z., and Yang, C. (2014). TDP-43-The key to understanding amyotrophic lateral sclerosis. Rare Dis. 2, e944443.

Yang, J., Huang, T., Petralia, F., Long, Q., Zhang, B., Argmann, C., . . . & Tu, Z. (2015). Synchronized age-related gene expression changes across multiple tissues in human and the link to complex diseases. Scientific reports, 5(1), 15145, 1-16.

Yoshizawa, T., Ali, R., Jiou, J., Fung, H.Y.J., Burke, K.A., Kim, S.J., Lin, Y., Peeples, W.B., Saltzberg, D., Soniat, M., et al. (2018). Nuclear Import Receptor Inhibits Phase Separation of FUS through Binding to Multiple Sites. Cell 173, 693-705.e22.

Youmans, K.L., and Wolozin, B. (2012). TDP-43: a new player on the AD field? Exp. Neurol. 237, 90-95.

Young, J.J., Lavakumar, M., Tampi, D., Balachandran, S., and Tampi, R.R. (2018). Frontotemporal dementia: latest evidence and clinical implications. Ther Adv Psychopharmacol 8, 33-48.

Zhang, H., Elbaum-Garfinkle, S., Langdon, E.M., Taylor, N., Occhipinti, P., Bridges, A.A., Brangwynne, C.P., and Gladfelter, A.S. (2015a). RNA controls polyq protein phase transitions. Mol. Cell 60, 220-230.

Zhang, K., Donnelly, C.J., Haeusler, A.R., Grima, J.C., Machamer, J.B., Steinwald, P., Daley, E.L., Miller, S.J., Cunningham, K.M., Vidensky, S., et al. (2015b). The C9orf72 repeat expansion disrupts nucleocytoplasmic transport. Nature 525, 56-61.

Zhang, Y.-J., Xu, Y.-F., Cook, C., Gendron, T.F., Roettges, P., Link, C.D., Lin, W.-L., Tong, J., Castanedes-Casey, M., Ash, P., et al. (2009). Aberrant cleavage of TDP-43 enhances aggregation and cellular toxicity. Proc. Natl. Acad. Sci. USA 106, 7607-7612.

Zoltowski, Brian D., and Brian R. Crane. Light activation of the LOV protein vivid generates a rapidly exchanging dimer. Biochemistry 47.27 (2008): 7012-7019.

Communication pursuant to Rule 164(1) EPC received in EP Application No. 19849952.7 dated Apr. 5, 2022, 13 pages.

Huang, Yi-Chen, et al., "Inhibition of TDP-43 Aggregation by Nucleic Acid Binding", PLOS ONE, vol. 8, No. 5, May 1, 2013 (May 1, 2013), p. e64002, XP055905863, DOI: 10.137 1/journal. pone.0064002.

Chou et al., "PABPN1 suppresses TDP-43 toxicity in ALS disease models", Human Molecular Genetics, vol. 24, No. 18, Sep. 15, 2015 (Sep. 15, 2015), pp. 5154-5173, XP055905856, GB ISSN: 0964-6906, DOI: 10.1093/hmg/ddv238.

International Search Report and Written Opinion dated Dec. 13, 2019, from International Application No. PCT/US2019/046869, 13 pages.

Examination Report for European Application No. 19849952.7, dated Apr. 24, 2023, 6 pages.

* cited by examiner

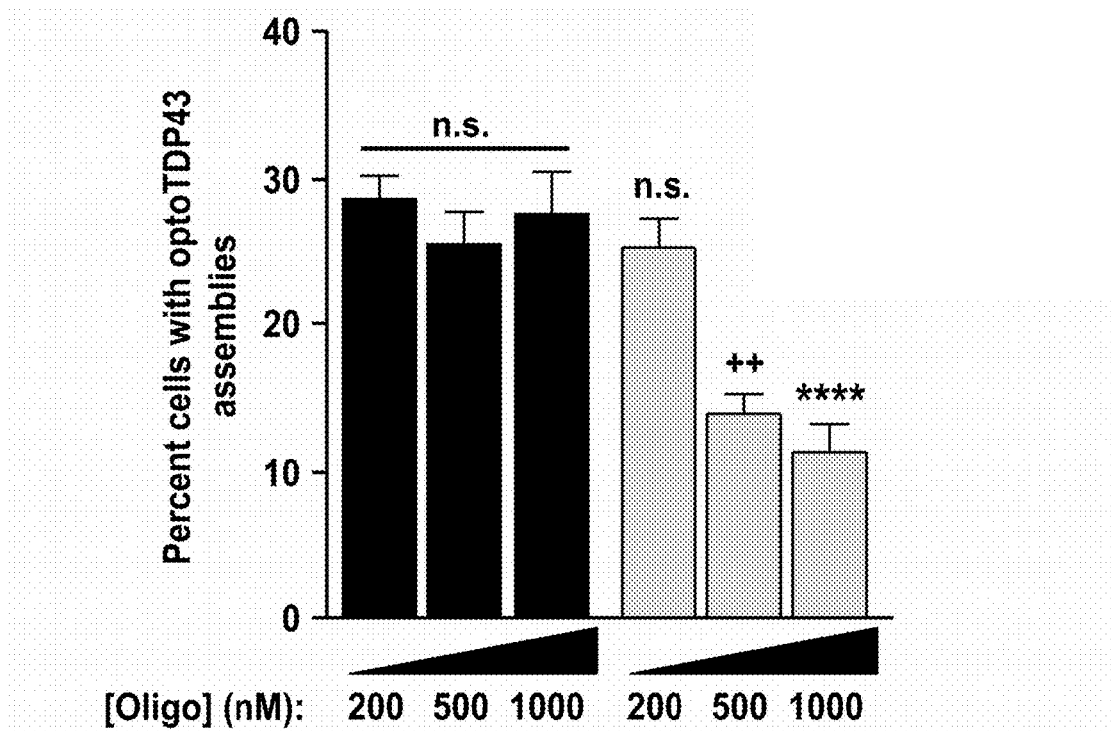
FIG. 6A
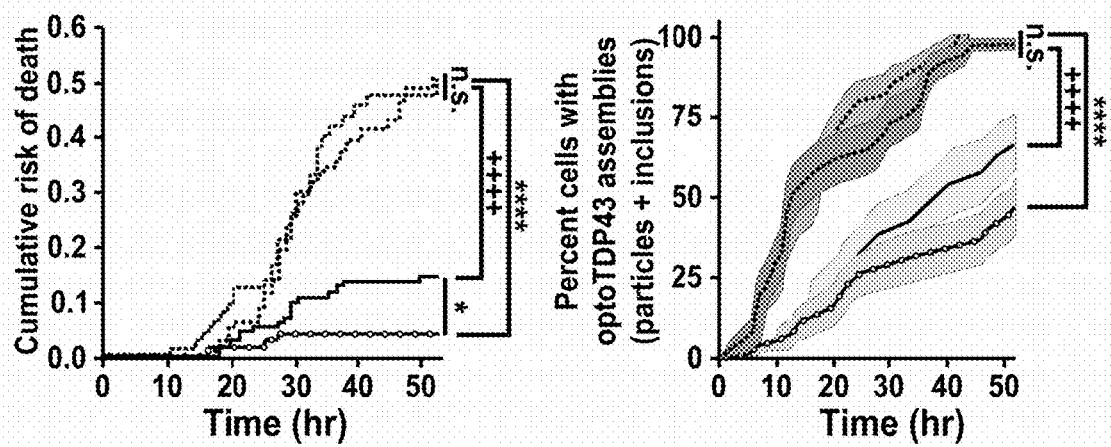
FIG. 6B
FIG. 6C

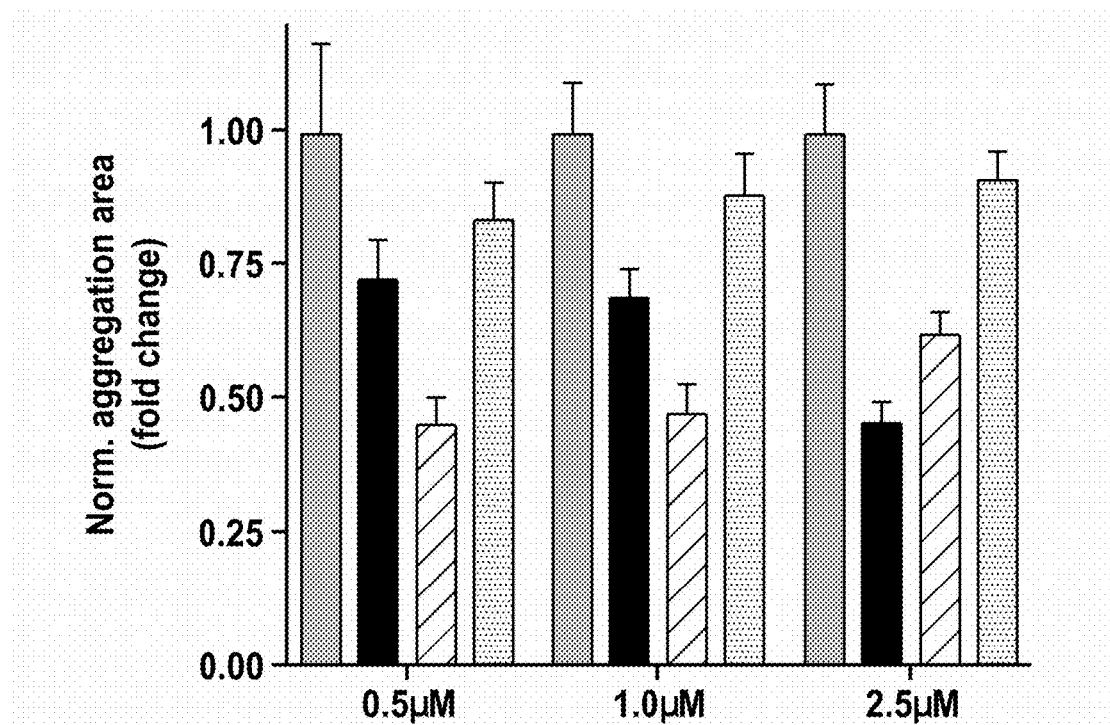
FIG. 16A
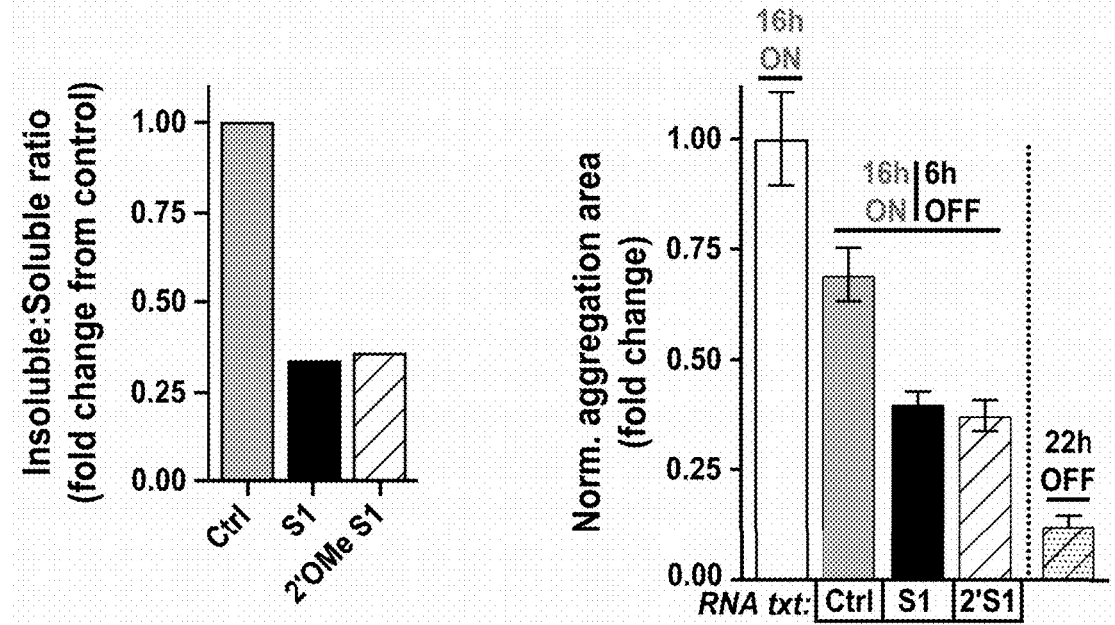
FIG. 16B
FIG. 17

NUCLEIC ACIDS AND NUCLEIC ACID ANALOGS FOR TREATING, PREVENTING, AND DISRUPTING PATHOLOGICAL POLYNUCLEOTIDE-BINDING PROTEIN INCLUSIONS

STATEMENT REGARDING FEDERALLY SPONSORED RESEARCH

This invention was made with government support under Grant No. NS105756 awarded by the National Institutes of Health. The government has certain rights in the invention.

REFERENCE TO SEQUENCE LISTING

A Sequence Listing conforming to the rules of WIPO Standard ST.25 is hereby incorporated by reference. Said Sequence Listing has been filed as an electronic document via the USPTO patent electronic filing system in ASCII formatted text. The electronic document, created on Jan. 10, 2025, is entitled "10504-029US1_ST25", and is 70,887 bytes in size.

FIELD

The disclosure generally relates to neurodegenerative diseases such as Amyotrophic Lateral Sclerosis, Frontotemporal Dementia, and Chronic Traumatic Encephalopathy, and methods and compositions comprising polynucleotides for treating neurodegenerative diseases.

BACKGROUND

Amyotrophic Lateral Sclerosis (ALS) and Frontotemporal Dementia (FTD) are fatal neurodegenerative disorders characterized by the progressive loss of motor neurons of the spinal cord and motor cortex or cortical neurons of the frontal and temporal lobes, respectively. No effective treatments currently exist to halt ALS or FTD progression and the cause(s) of these disorders remain unknown. Significant overlap of clinical, genetic, and neuropathological features among patients suggests that ALS and FTD exist on a neurodegenerative disease spectrum (Ling, et al., (2013), Neuron 79, 416-438), and a number of familial ALS and/or FTD causing mutations have been identified (Nguyen, et al., (2018), Trends Genet. 34, 404-423). Despite this vast genetic heterogeneity, 97% of ALS patients and up to 45% of FTD patients exhibit a common neuropathological feature called TDP-43 proteinopathy. TDP-43 proteinopathy is characterized by the cytoplasmic deposition and nuclear clearance of the transactivation response element DNA-binding protein 43 kDa (TDP-43; TARDBP) (Neumann, et al., (2006), Science 314, 130-133).

TDP-43 is a ubiquitously-expressed, tightly-regulated, and predominantly nuclear DNA/RNA-binding protein that contains two RNA-Recognition Motifs (RRMs) and a C-terminal glycine-rich, low complexity domain (LCD) (Scotter, et al., (2015), Neurotherapeutics 12, 352-363). TDP-43 preferentially binds UG-rich RNA intronic sequences or 3'UTR stem loop structures and influences a variety of RNA processing events including alternative splicing, RNA trafficking, and RNA stability (Ling, et al., (2013), Neuron 79, 416-438). In ALS and FTD, the protein is found in cytoplasmic inclusions that are detergent-insoluble, hyperphosphorylated, p62-positive, and ubiquitinated (Scotter, et al., (2015), Neurotherapeutics 12, 352-363). Cytoplasmic inclusions also contain truncated TDP-43 species resulting from its N-terminal cleavage (Neumann, et al., (2007), J. Neuropathol. Exp. Neurol. 66, 177-183). This neuropathological hallmark correlates well with regions of neurodegeneration in ALS/FTD patient tissue (Baloh, R. H. (2011), FEBS J. 278, 3539-3549) and is found in postmortem tissue from patients diagnosed with Alzheimer's Disease (60%) (Youmans, et al., (2012), Exp. Neurol. 237, 90-95), and Chronic Traumatic Encephalopathy (80%) (McKee, et al., (2010), J. Neuropathol. Exp. Neurol. 69, 918-929). Thus, TDP-43 proteinopathy might serve as a convergence point of pathogenesis despite the diverse upstream mechanisms responsible for disease etiology across several neurodegenerative disorders.

Over 50 ALS/FTD-causing missense mutations have been identified in the TARDBP gene (Harrison, et al., (2017), Biochem. J. 474, 1417-1438). While rare in the total patient population, these mutations occur more frequently in fALS patients (5%) as compared to patients with familial FTD (Ling, et al., (2013), Neuron 79, 416-438). The majority of known ALS/FTD-causing TARDBP mutations cluster within the TDP-43 LCD, although others have been identified within the RRMs (Harrison, et al., (2017), Biochem. J. 474, 1417-1438). The location and functional impact of these mutations likely reflects the importance of these regions in disease pathogenesis. LCDs are common in RNA-binding proteins (RBPs) and mediate protein and RNA interactions through a process termed liquid-liquid phase separation (LLPS). LLPS involves the condensation of molecules into liquid-like compartments and is driven by weak, transient interactions between LCD regions and other multivalent protein/nucleic acid interaction domains (Harrison, et al., (2017), Biochem. J. 474, 1417-1438). Following specific protein:protein, protein:RNA and/or RNA:RNA nucleating interactions, this de-mixing process allows for intracellular compartmentalization, as observed with membraneless organelles such as nucleoli, P-bodies, and stress granules (SGs) (Shin, et al., (2017), Science 357). Many of these biological condensates contain high local concentrations of LCD-containing proteins, which contribute to the properties of these structures through a combination of specific and non-specific heterotypic protein/nucleic acid interactions (Harrison, et al., (2017), Biochem. J. 474, 1417-1438; Shin, et al., (2017), Science 357). Interestingly, ALS-associated mutations in the TDP-43 LCD alter LLPS behavior and enhance aggregation of the protein (Conicella, et al., (2016), Structure 24, 1537-1549; Johnson, et al., (2009), J. Biol. Chem. 284, 20329-20339; Schmidt, et al., (2016), Cell Rep. 16, 1228-1236). Similar observations have been reported of other RBPs implicated in neurodegeneration, where disease-linked LCD mutations or aging of droplets promotes the maturation and fibrillization of initially reversible protein assemblies (Harrison, et al., (2017), Biochem. J. 474, 1417-1438). While the physical processes underlying droplet solidification is unknown, these findings suggest that aberrant phase transitions drive the formation of pathological inclusions of RNA-binding proteins observed in neurodegenerative disease.

The cellular pathway(s) that promote aberrant TDP-43 phase transitions remain unclear, but evidence suggests that altered SG homeostasis contributes to the seeding of pathological inclusions. SGs are membraneless organelles that assemble in the cytoplasm via LLPS during periods of cellular stress and may reversibly inhibit non-essential protein synthesis (Anderson, et al., (2008), Trends Biochem. Sci. 33, 141-150). In addition to mRNA, ribosomal subunits, and translation initiation factors, SGs sequester a number of RBPs mutated in fALS, including TDP-43 (Boeynaems, et al., (2016), Acta Neuropathol. 132, 159-173). The nucleation and phase separation of these various proteins and RNAs into liquid-like droplets is required for cellular compartmentalization of SGs and alterations of intermolecular dynamics may promote an irreversible gel-like state or fibrillization of prion-like protein components of these structures. The high local concentration of aggregate-prone proteins, like TDP-43, within SGs is thought to enhance protein self-interactions that subsequently mature into pathological inclusions (Harrison, et al., (2017), Biochem. J. 474, 1417-1438). Supporting the role of SGs in seeding TDP-43 proteinopathy, recent work has also revealed that antisense oligonucleotide-mediated depletion of SG components ameliorates neurotoxicity in a TDP-43 rodent model (Becker, et al., (2017), Nature 544, 367-371).

Modeling TDP-43 proteinopathy has proven challenging. Current cellular and animal models rely on enhanced expression of wildtype or rare mutant variants of TDP-43 to initiate pathological aggregation; however, this approach is unreliable and many models fail to develop inclusions that recapitulate ALS/FTD phenotypes (Philips, et al., (2015), Curr. Protoc. Pharmacol. 69, 5.67.1-21). Furthermore, the lack of control over intracellular TDP-43 interactions impedes the ability to test whether cytoplasmic phase separation precedes inclusion formation and whether this process, or these inclusions themselves, are neurotoxic.

The compositions and methods disclosed herein address these and other needs.

SUMMARY

The disclosed subject matter relates to compositions and methods for treating neurodegenerative diseases. In one aspect, disclosed herein is a method to treat a neurodegenerative disease comprising administering to a subject with a neurodegenerative disease a therapeutically effective amount of a polynucleotide that binds a nucleic acid-binding polypeptide, wherein the nucleic acid-binding polypeptide can aggregate in cells and is associated with a neurodegenerative disease.

In some embodiments, the neurodegenerative disease is selected from Limbic-predominant Age-related TDP-43 Encephalopathy (LATE), Multisystem Proteinopathy, Amyotrophic Lateral Sclerosis, Frontotemporal Dementia, Alzheimer's Disease, Chronic Traumatic Encephalopathy, Traumatic Brain Injury, Cortical Basal Degeneration, and Huntington's Disease. In some embodiments, the polynucleotide is administered in a pharmaceutical composition comprising a pharmaceutically acceptable excipient. In some embodiments, the method reduces the rate of aggregation of the nucleic acid-binding polypeptide in the subject. In some embodiments, the method reduces the amount of aggregate of the nucleic acid-binding polypeptide in the subject. In some embodiments, the nucleic acid-binding polypeptide has an increased rate of aggregation when the concentration of free polynucleotides is reduced. In some embodiments, the nucleic acid-binding polypeptide is selected from TDP-43, FUS, HNRNPA1, HNRNPA2/B1, EWSR1, TIA-1, TTP, TAF15, MATR3, ATXN2, OPTN, Tau, HTT, and biologically active fragments and variants thereof. In some embodiments, the polynucleotide comprises a synthetic RNA. In some embodiments, the polynucleotide comprises at least 24 consecutive nucleotides comprising at least 60% uracil and guanine nucleotides. In some embodiments, the method further comprises administering one or more additional polynucleotides.

Also disclosed are methods to inhibit protein aggregation in a cell comprising contacting the cell with a composition comprising a polynucleotide that binds a nucleic acid-binding polypeptide, wherein the nucleic acid-binding polypeptide can aggregate in cells and is associated with a neurodegenerative disease.

In some embodiments, the method reduces the rate of aggregation of the nucleic acid-binding polypeptide in the cell compared to an untreated control. In some embodiments, the method reduces the amount of aggregate of the nucleic acid-binding polypeptide in the cell. In some embodiments, the cell is a neuronal cell.

Also disclosed are compositions comprising a polynucleotide that binds a nucleic acid-binding polypeptide, wherein the nucleic acid-binding polypeptide can aggregate in cells and is associated with a neurodegenerative disease.

In some embodiments, the nucleic acid-binding polypeptide is selected from TDP-43, FUS, HNRNPA1, HNRNPA2/B1, EWSR1, TIA-1, TTP, TAF15, MATR3, ATXN2, OPTN, Tau, HTT, and biologically active fragments and variants thereof. In some embodiments, the polynucleotide comprises at least 24 consecutive nucleotides comprising at least 60% uracil and guanine nucleotides. In some embodiments, the composition further comprises one or more additional polynucleotides.

Also disclosed are pharmaceutical compositions comprising a pharmaceutically acceptable excipient and a polynucleotide that binds a nucleic acid-binding polypeptide, wherein the nucleic acid-binding polypeptide can aggregate in cells and is associated with a neurodegenerative disease. Also disclosed are compositions comprising a polynucleotide having at least 70% identity with any one of SEQ ID NO:10-84. Also disclosed are compositions comprising a polynucleotide having at least 70% identity with any one of SEQ ID NO:96-119.

Additional aspects and advantages of the disclosure will be set forth, in part, in the detailed description and any claims which follow, and in part will be derived from the detailed description or can be learned by practice of the various aspects of the disclosure. The advantages described below will be realized and attained by means of the elements and combinations particularly pointed out in the appended claims. It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate certain examples of the present disclosure and together with the description, serve to explain, without limitation, the principles of the disclosure. Like numbers represent the same element(s) throughout the figures.

FIG. 1(A-B) is a set of images and a graph showing optoTDP43 is a light-inducible model of TDP-43 proteinopathy.

optoTDP43 with light; dashed line: TDP43 without light; dotted and dashed line: TDP43 with light. n=494-791 cells. Data shown are mean+/−S.E.M. ****, p<0.0001. Scale bars=10 µm.

Figure 2:
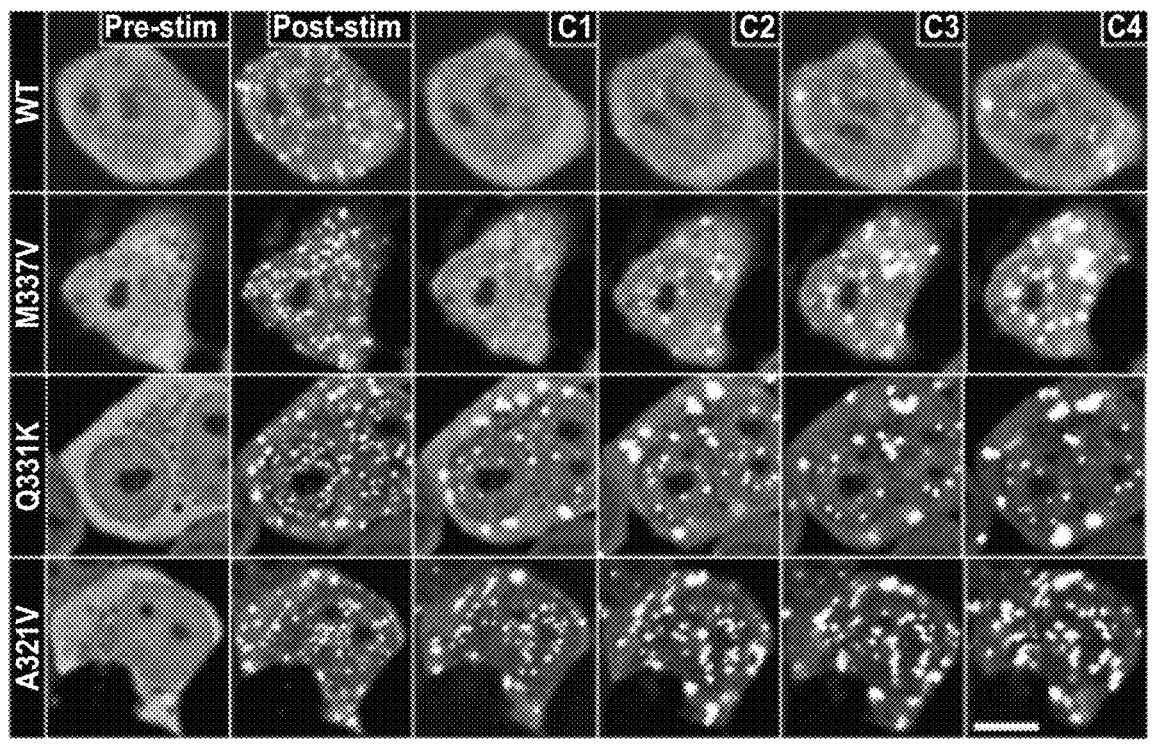

FIG. 2 is a set of images showing optogenetic phase transitions of TDP-43 LCD drives inclusion formation. Images of repetitive light-induced phase transitions of WT and ALS-linked mutant (M337V, Q331K, A321V) optoLCD proteins during a cycling light stimulation protocol consisting of a single blue light pulse (1 sec, 1% laser power) every 10 min for 40 min. Pre-stim refers to images taken before any blue light exposure. Post-stim refers to images taken after the first 1 sec blue light pulse. C1, C2, C3, and C4 refer to Cycle 1, Cycle 2, Cycle 3, and Cycle 4, respectively, and are images taken 10 minutes after each 1 sec blue light pulse (1 sec pulse, 10 minute incubation in darkness, obtain image, repeat cycle). Images shown are the final images acquired per cycle prior to subsequent light stimulation. Scale bars=10 µm.

FIG. 3(A-D) is a set of graphs showing RNA-binding prevents light-induced phase separation and aggregation of TDP-43. FIG. 3(A-C) include data for HEK293 cells expressing photoreceptors. FIG. 3A shows granules observed per cell expressing the Cry2olig photoreceptor fused to the TDP-43 LCD (top solid line) or to the TDP-43 RNA-binding regions (RRMs) (bottom dotted line). FIG. 3B shows granules observed per cell expressing the Cry2olig photoreceptor fused to TDP-43 LCD and functional (WT) RRMs (top solid line) or fused to TDP-43 LCD and RNA-binding deficient (5FL) RRMs (bottom dotted line). FIG. 3C shows granules observed per cell expressing the Cry2olig photoreceptor fused to TDP-43 LCD and functional (WT) FUS RRM (top solid line) or fused to TDP-43 LCD and FUS RNA-binding deficient (4FL) RRM (bottom dotted line). Cells were exposed to acute light stimulation (1-8 sec, 10% laser power, 488 nm). n=33-59 (FIG. 3A), 24-36 (FIG. 3B) and 31-45 cells (FIG. 3C). Data shown are mean+/−S.E.M. FIG. 3D shows the percentage of optoTDP-43-expressing HEK293 cells having cytoplasmic inclusions after received mock (left) or RNA (right; 2.5 µg HEK293 total mRNA) treatment 4 hours into a 16 hour chronic blue light treatment. Data points correspond to individual fields of view. Data shown are mean+/−S.E.M. **, p<0.01.

Figure 4A:
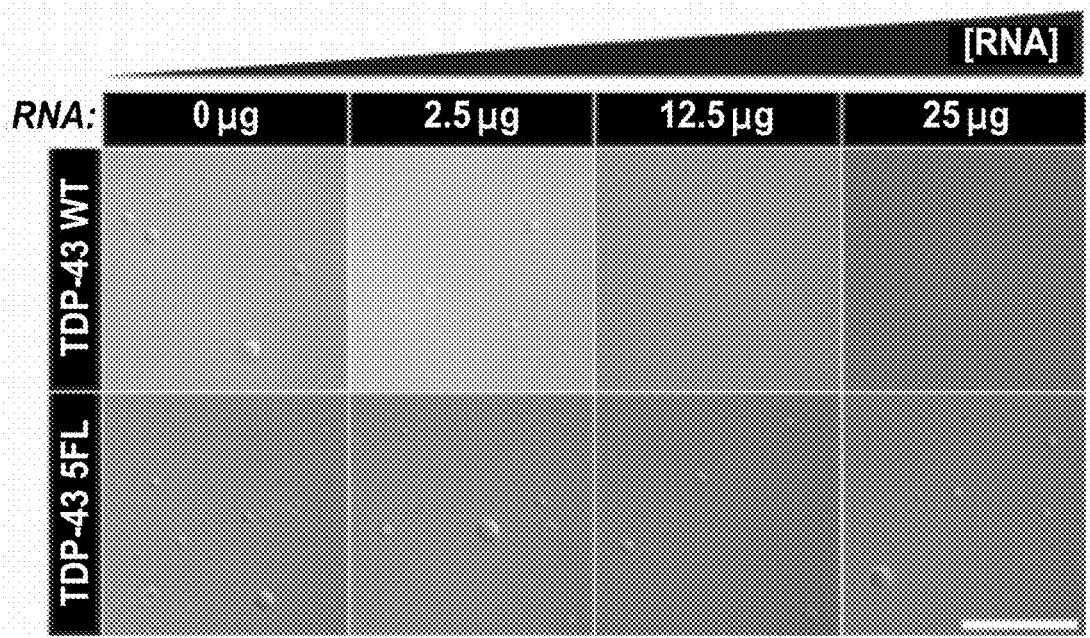
Figure 4B:
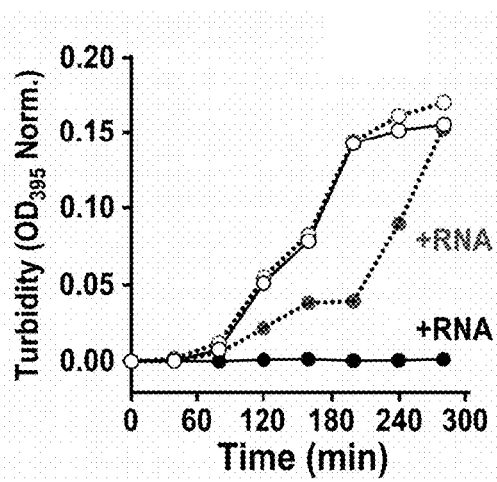
Figure 4C:
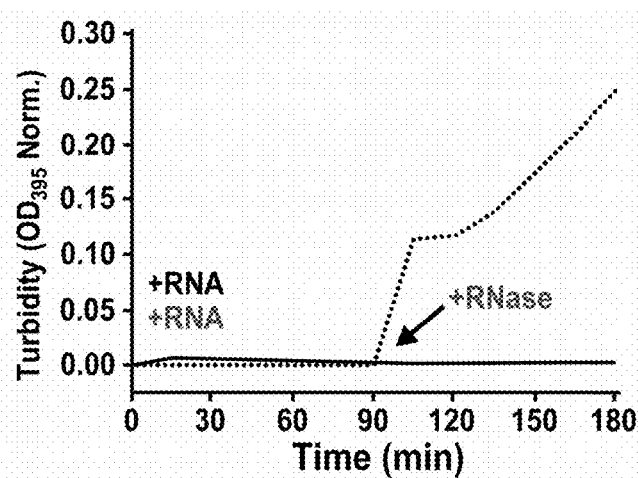

FIG. 4(A-C) show TDP-43 LLPS and aggregation is inhibited by RNA-binding. FIG. 4A is a set of differential interference contrast (DIC) images of purified TDP43 WT or 5FL fused to maltose binding protein (MBP) following incubation with increasing concentrations (from left to right: 0 µg, 2.5 µg, 12.5 µg, 25 µg) of yeast total RNA. In the absence of RNA, C-terminal MBP-tagged TDP-43 WT and 5FL formed liquid-like droplets at physiological salt concentrations. However, in the presence of increasing concentrations of total RNA, WT TDP-43 (but not TDP-43 5FL) LLPS was inhibited in a dose-dependent manner. Scale bar=50 µm. FIG. 4B shows turbidity changes (normalized $OD_{395}$ readings) of TDP-43 WT (solid lines) and 5FL (dotted lines) proteins following TEV cleavage of MBP in the absence (open circles) or presence (solid circles) of yeast total RNA (15 µg). FIG. 4C shows turbidity changes (normalized $OD_{395}$ readings) of TDP-43 WT proteins following TEV cleavage of MBP in the presence of yeast total RNA-only (25 µg) (solid line) or yeast total RNA (25 µg) followed by RNase A addition (2.5 µg) at 90 min post-TEV cleavage (dotted line). Data shown are mean+/−S.E.M.

FIG. 5(A-D) is a set of graphs showing light-induced optoTDP43 phase transitions are neurotoxic. Lentiviral expression vectors were used in neuronal survival experiments. optoTDP43 or the Cry2-mCh photoreceptor alone were expressed along with a far-red fluorescent reporter (iRFP670) under the control of the human synapsin promoter (hSyn). FIG. 5A shows survival curves of ReNcell cortical neurons during longitudinal toxicity screening in the presence or absence of light. Solid line: Cry2-mCH without light; dotted line: optoTDP43 without light; dashed line: Cry2-mCH with light; dotted and dashed line: optoTDP43 with light. n=74-89 cells. Data are presented as mean percent survival. FIG. 5B shows nuclear-cytoplasmic (N/C) ratios of optoTDP43 signal analyzed at baseline (prior to light exposure) and endpoints (last frame prior to cell death or conclusion of imaging session) in neurons exposed to light (open circles) or darkness (solid circles). n=25 cells per light condition. Data is presented as fold-changes in N/C ratios normalized to baseline values. Inset shows raw N/C values and data points represent individual neurons. Dotted lines indicate population mean at baseline. FIG. 5C shows survival curves of optoTDP43-expressing neurons exposed to light stimulation stratified by one of three optoTDP43 assembly phenotypes: inclusion (solid line), particles (dotted line), or diffuse nuclear phenotype (dashed line). n=13-28 cells. FIG. 5D shows time-to-death between event onset (particle or inclusion formation) and cell death analyzed between neurons showing either inclusion (solid line) or particle (dotted line) optoTDP43 assembly subtype. n=17-28 cells. Data shown are mean+/−S.E.M. ****, p<0.0001.

Figure 6D:
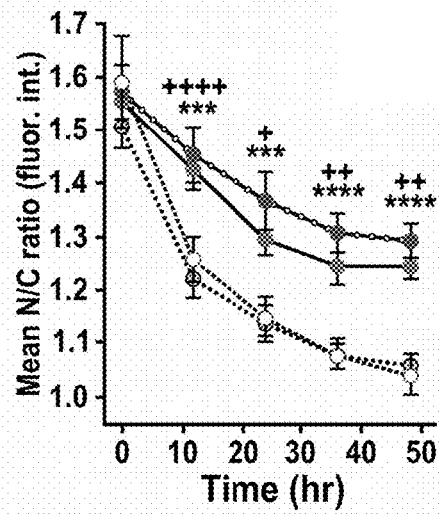

FIG. 6(A-D) is a set of graphs showing bait oligonucleotides (bONs) inhibit aberrant phase transitions of TDP-43 and rescue associated neurotoxicity. In FIG. 6A, HEK293 cells expressing optoTDP43 were pre-treated with non-targeting scrambled or targeting 2'OMe-modified Clip_34nt RNA oligonucleotides (SEQ ID NO:13) for 30 min prior to chronic blue light stimulation (8 hr, ~0.3 mW/cm², 465 nm). FIG. 6A shows quantification of percentage of cells having light-induced cytoplasmic optoTDP43 assemblies following the treatment with either scramble control RNA (left set of three bars in black) or Clip_34nt RNA (right set of three bars in gray) at the indicated concentrations (200 nM, 500 nM, or 1,000 nM). n=578-943 cells. FIG. 6B-D show results for optoTDP43-expressing ReNcell neurons treated with non-targeting scrambled or targeting 2'OMe-modified Clip_34nt RNA oligonucleotides 4 hr prior to blue light exposure and automated longitudinal imaging. In FIG. 6B-6D, solid line: 500 nM Clip_34nt; dotted and dashed line: 1 µM Clip_34nt; dotted line: 500 nM scrambled; dashed line: 1 µM scrambled. FIG. 6B shows cumulative risk-of-death plots generated from Kaplan-Meier survival curves of ReNcell neurons over time following treatment with increasing doses of scrambled or targeting Clip_34nt oligonucleotides. n=78-121 cells. FIG. 6C shows percentage of ReNcell neurons having optoTDP43 assemblies (inclusions or particles) over time following the indicated oligonucleotide treatments. n=37-39 cells. FIG. 6D shows nuclear-cytoplasmic (N/C) ratios of optoTDP43 signal calculated over time in neurons exposed to the indicated oligonucleotide treatments. n=34-45 cells. *, p<0.05; , p<0.01; *, p<0.001; ****, p<0.0001. + indicate comparisons between 500 nM treatment groups; * indicate comparisons between 1000 nM treatment groups. Data shown are mean+/−S.E.M.

Figure 7:
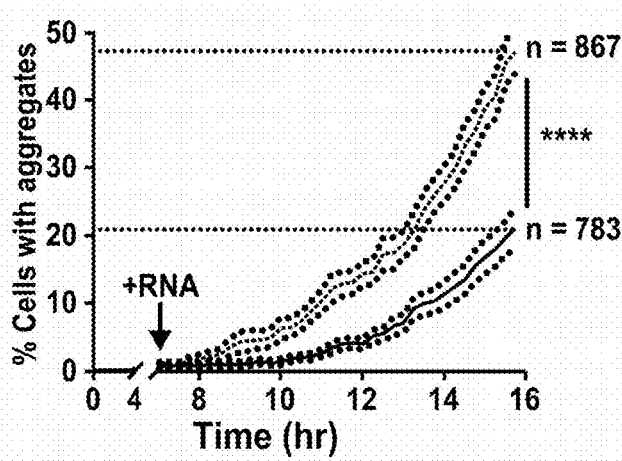

FIG. 7 is a graph showing poly UG RNA substrates (SEQ ID NO:10; solid line) prevent the formation of TDP-43 inclusions, as compared to mock RNA (dashed line).

Figure 8:
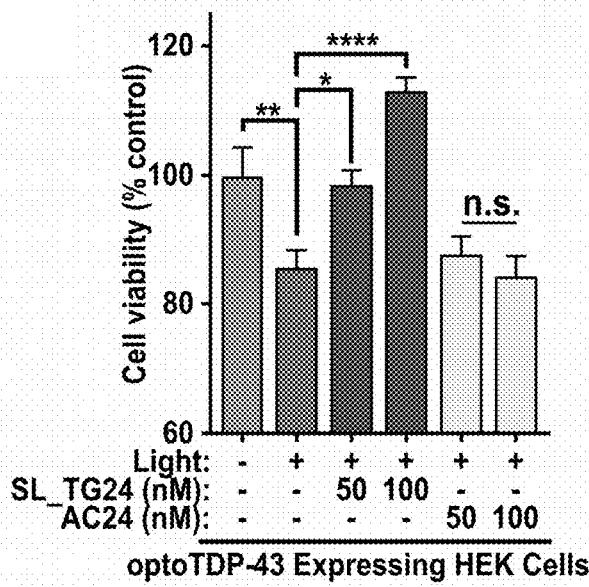

FIG. 8 is a graph showing that the binding DNA oligo-nucleotide SL_TG24 (SEQ ID NO:11) by TDP-43 rescues TDP-43 aggregation toxicity in a dose dependent manner. Non-binding RNA AC24 was included as a control.

Figure 9:
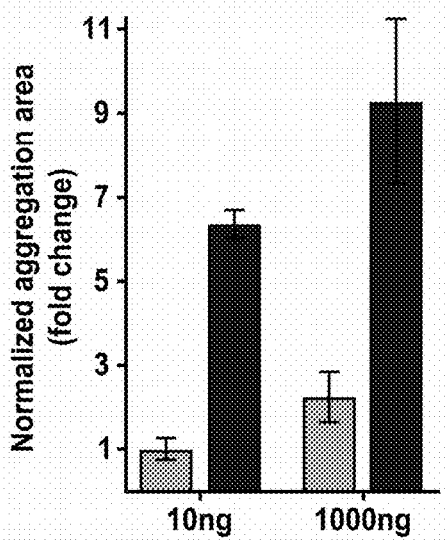

FIG. 9 is a graph showing quantification of normalized aggregation area observed in cells expressing VVD-TDP43-V5 inclusion formation after induction with 10 ng (left two bars) or 1,000 ng (right two bars) doxycycline and following exposure to darkness (light gray) or blue light (dark gray).

Figure 10A:
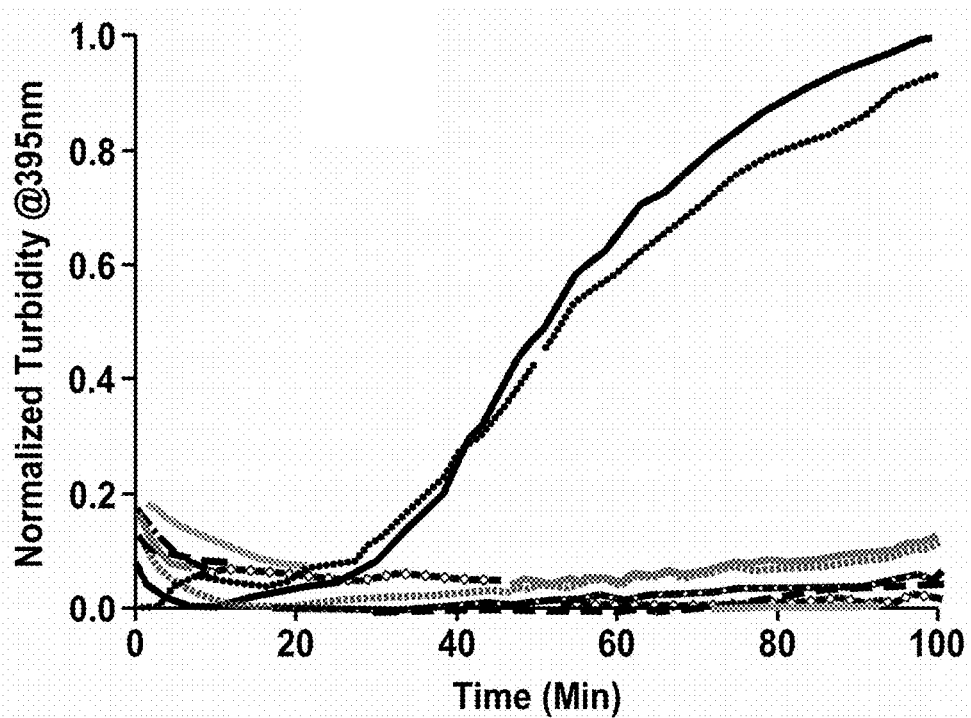
Figure 10B:
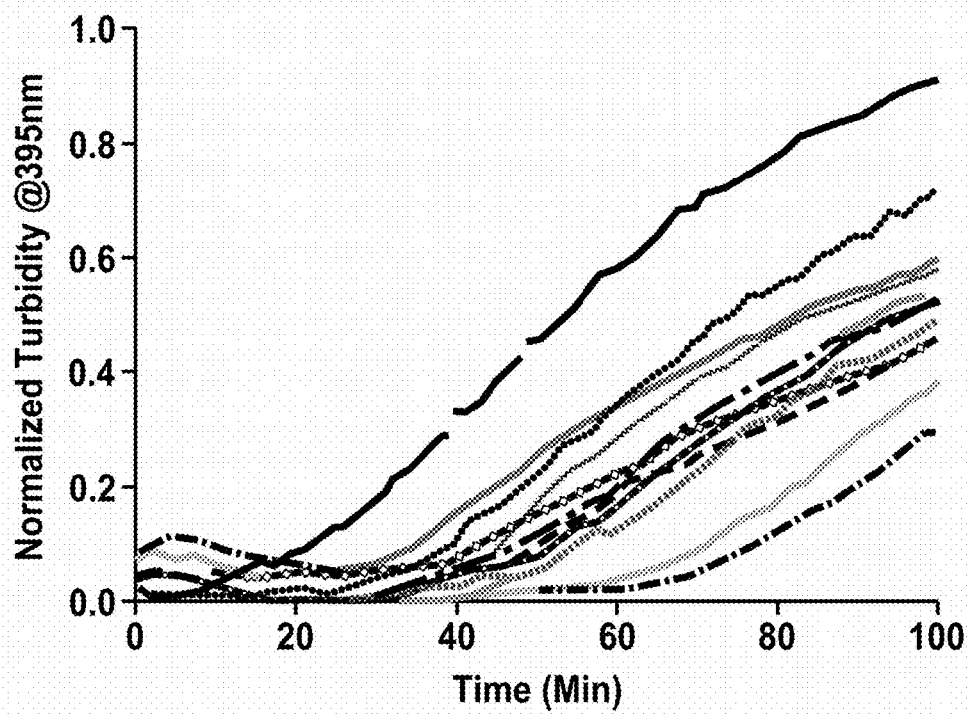

FIG. 10(A-B) is a set of graphs showing turbidity measurements each minute for 100 minutes when strong (FIG. 10A) and intermediate (FIG. 10B) RNA inhibitors were incubated with GST-TEV-FUS protein, TEV protease (to cleave the GST-TEV motif), and RNasin (to protect against RNA degradation). The tested samples in FIG. 10A included FUS alone (solid line), FUS+RNasin (dotted line), FUS+RNasin+RNA7 (SEQ ID NO:97), FUS+RNasin+RNA8 (SEQ ID NO:98), FUS+RNasin+RNA15 (SEQ ID NO:96), FUS+RNasin+RNA19 (SEQ ID NO:99), FUS+RNasin+RNA25 (SEQ ID NO:100), FUS+RNasin+RNA26 (SEQ ID NO:101), FUS+RNasin+RNA31 (SEQ ID NO:102), and FUS+RNasin+RNA32 (SEQ ID NO:103). While FUS alone and FUS+RNasin resulted in highly increased turbidity by 100 minutes, each of the strong inhibitors robustly prevented turbidity induction. The tested samples in FIG. 10B included FUS alone (solid line), FUS+RNasin (dotted line), FUS+RNasin+RNA1 (SEQ ID NO:104), FUS+RNasin+RNA2 (SEQ ID NO:105), FUS+RNasin+RNA9 (SEQ ID NO:106), FUS+RNasin+RNA10 (SEQ ID NO:107), FUS+RNasin+RNA11 (SEQ ID NO:108), FUS+RNasin+RNA13 (SEQ ID NO:109), FUS+RNasin+RNA14 (SEQ ID NO:110), FUS+RNasin+RNA17 (SEQ ID NO:111), FUS+RNasin+RNA27 (SEQ ID NO:112), FUS+RNasin+RNA28 (SEQ ID NO:113), FUS+RNasin+RNA29 (SEQ ID NO:114), and FUS+RNasin+RNA30 (SEQ ID NO:115). While FUS alone and FUS+RNasin resulted in highly increased turbidity by 100 minutes, each of the intermediate inhibitors prevented turbidity induction to an intermediate extent but not as well as the strong inhibitors. In order from most inhibition (least normalized turbidity) to least inhibition (most normalized turbidity) by 100 minutes, the intermediate inhibitors were ranked as RNA27, RNA17, RNA9≈RNA13≈RNA1≈RNA30≈RNA2 29≈RNA14, RNA10, RNA30, RNA11.

Figure 11:
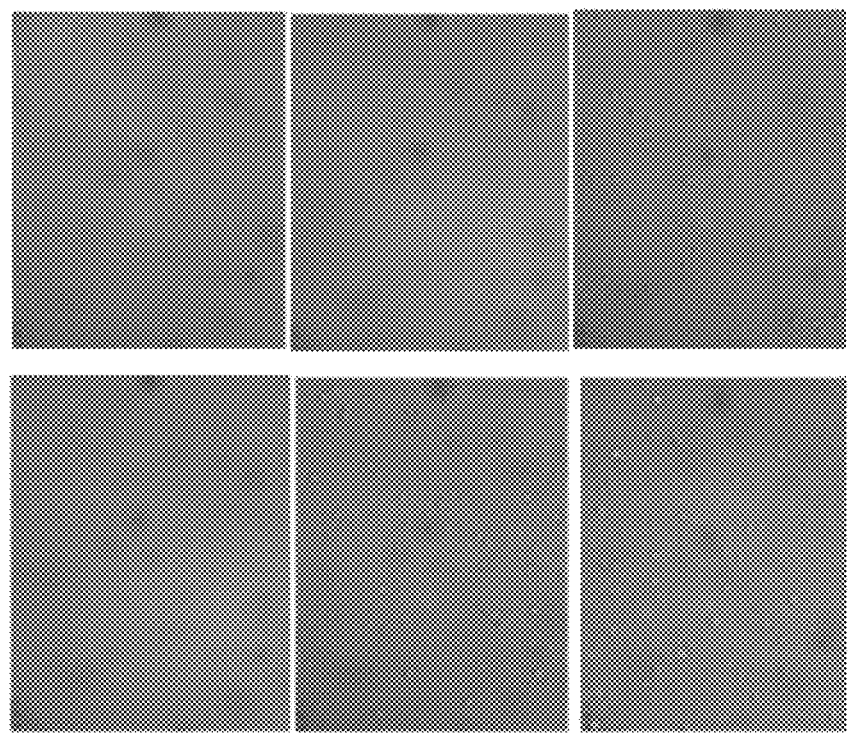

FIG. 11 is a set of DIC images showing GST-TEV-FUS (5 µM) droplets formed in the presence of 20 µM of either RNA19 (upper left panel), RNA15 (upper middle panel), RNA9 (upper right panel), RNA8 (lower left panel), a control RNA (lower middle panel), or no RNA (lower right panel).

Figure 12:
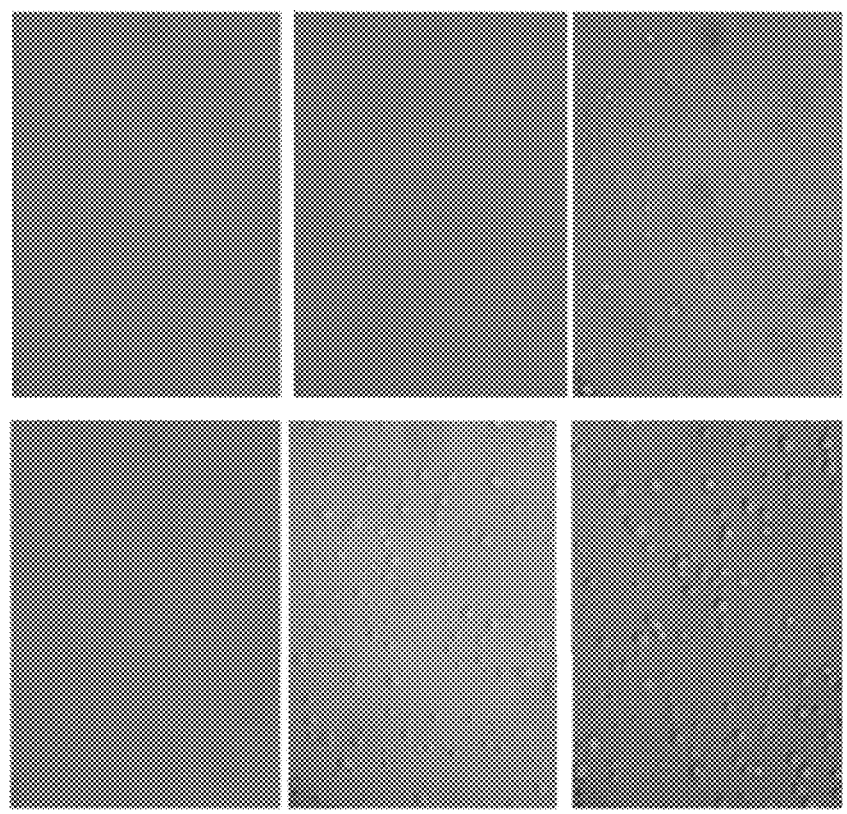

FIG. 12 is a set of DIC images showing GST-TEV-FUS (5 µM) droplets which were first formed, then subsequently exposed to 20 µM of either RNA19 (upper left panel), RNA15 (upper middle panel), RNA9 (upper right panel), RNA8 (lower left panel), a control RNA (lower middle panel), or no RNA (lower right panel).

FIG. 13(A-D) is a set of graphs showing RNA inhibitory and disaggregation activity depend on length and sequence of the RNA. GST-TEV-FUS protein was incubated with TEV protease (to cleave the GST-TEV motif), and 20 µM bONs were separately added at the beginning of the reaction (FIGS. 13A and 13B; prevention of aggregation) or at the end of the reaction (FIGS. 13C and 13D; disaggregation). Turbidity measurements were obtained over time. FUS with control RNA (solid line) served as a control in each experiment. In FIGS. 13A and 13C, the strong inhibitor RNA15 (SEQ ID NO:96) was shortened from 48 nucleotides to 24 nucleotides to create RNA22 (SEQ ID NO:117; sometimes called "FUS+RNA15/2"; dashed line), then further modified to include an A-U point mutation to create RNA15/2(A-U) (SEQ ID NO:118; sometimes called "FUS+RNA15/2(A-U)"; dotted and dashed line). In FIGS. 13B and 13D, the 24 nucleotide RNA9 (SEQ ID NO:106; dotted line) was doubled to create the 48 nucleotide RNA9^2 (SEQ ID NO:119; sometimes called "FUS+RNA9^2); dashed line).

Figure 14A:
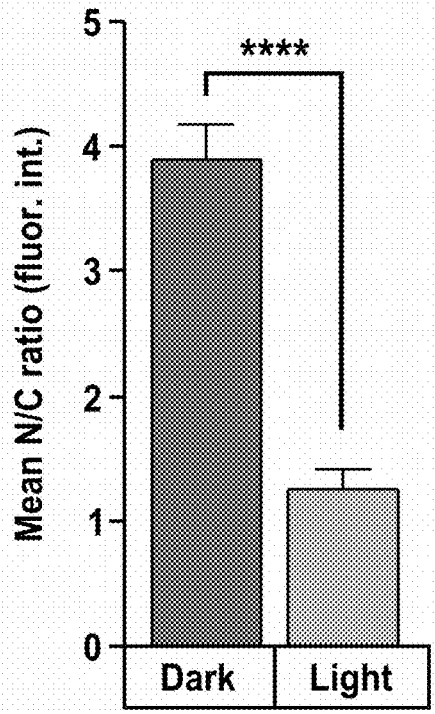
Figure 14B:
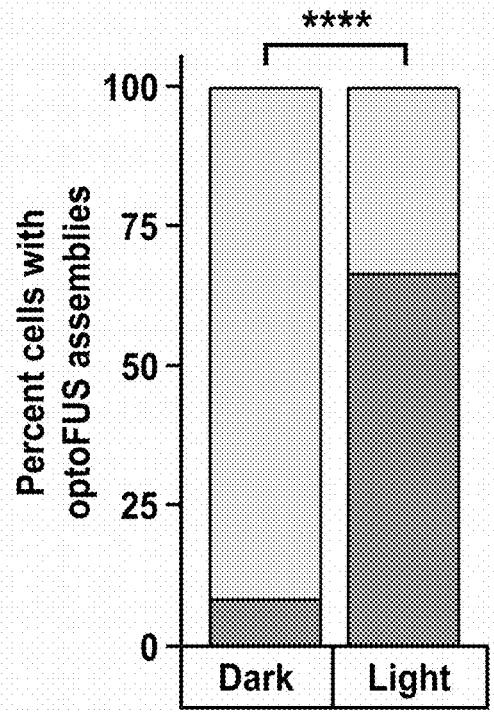
Figure 14C:
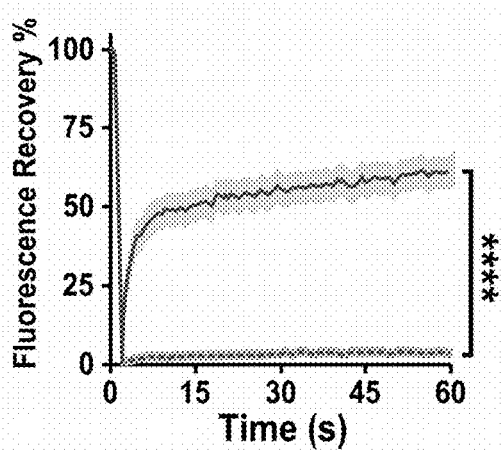

FIG. 14(A-C) is a set of graphs showing optoFUS is a light-inducible model of FUS proteinopathy. FIG. 14A shows the nuclear/cytoplasmic ratio of optoFUS fluorescence signal in cells kept in darkness (left) or exposed to blue light (right). FIG. 14B shows the percentage of cells having cytoplasmic optoFUS assemblies in cells kept in darkness (left) or exposed to blue light (right). Cells having cytoplasmic optoFUS assemblies are represented by the dark gray segments of the bar graph, whereas cells having no cytoplasmic optoFUS assemblies are represented by the light gray segments of the bar graph. FIG. 14C shows that after exposing HEK294 cells expressing optoFUS to 8 h of either darkness (solid line) or blue light (dashed line) prior to fluorescence recovery after photobleaching (FRAP) analysis of optoFUS assemblies, light-induced optoFUS assemblies showed little fluorescence recovery following bleaching. Thus, FIG. 14C shows that optoFUS assemblies are static, immobile inclusions in cells and recapitulate pathological hallmarks.

Figure 15:
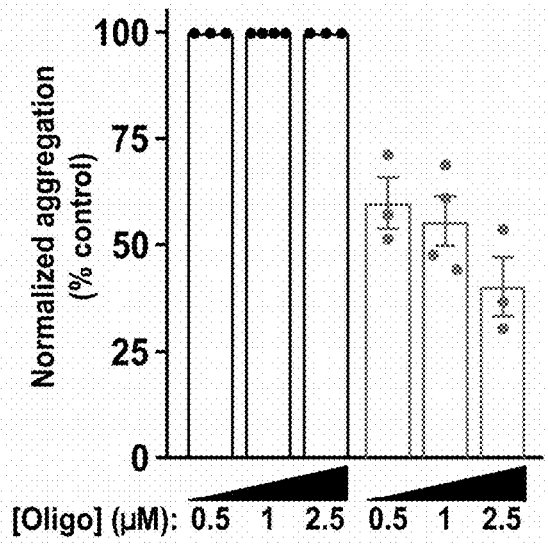

FIG. 15 is a graph showing optoFUS inclusion formation observed in immunofluorescence experiments following treatment with control RNA oligonucleotides (left three bars) or RNAS1 (SEQ ID NO:98) (right three bars) at the indicated concentrations. Data were normalized to control RNA.

FIG. 16(A-B) is a set of graphs showing 2'OMe modified bait oligonucleotides (bONs) prevent optoFUS inclusions. HEK293 cells expressing optoFUS were pre-treated with unmodified non-binding control RNA (SEQ ID NO:121; gray bars), the unmodified RNAS1 (SEQ ID NO:98; black bars), the 2'OMe modified RNA2'S1 (SEQ ID NO:116; hatched bars), or the 2'OMe- and phosphorothioate bond (PS)-modified RNAPS-2'S1 (a PS-modified sequence of SEQ ID NO:116; dotted bars) at the indicated concentrations prior to 8 hr exposure to blue light (FIG. 16A). Cells were then fixed and quantified for immunofluorescence. FIG. 16B shows the ratio of insoluble:soluble optoFUS protein identified in optoFUS-expressing HEK293 cells pre-treated with 1 µM of control RNA (left bar), unmodified RNAS1 (middle bar), or 2'OMe modified RNA2'S1 (right bar) prior to 8 hr blue light exposure. After the 8 hr exposure, cells were lysed, and cell lysates were separated into soluble and insoluble fractions. Fractions were separated on a gel, immunoblotted, and protein amounts were quantified by densitometry measurements.

FIG. 17 is a graph showing bait oligonucleotides (bONs) can disaggregate optoFUS inclusions. optoFUS-expressing HEK293 cells were exposed to 16 hr blue light, then treated with no RNA as a positive control (white bar), 1 µM unmodified non-binding control RNA (SEQ ID NO:121; gray bar), 1 µM unmodified RNAS1 (SEQ ID NO:98; black bar), or 1 µM 2'OMe modified RNA2'S1 (SEQ ID NO:116; hatched bar), then incubated in the dark for 6 hr. Cells were then fixed and quantified for immunofluorescence, and results were normalized to the positive control. Cells exposed to darkness throughout the experiment served as a negative control (dotted and hatched bar).

DETAILED DESCRIPTION

The following description of the disclosure is provided as an enabling teaching of the disclosure in its best, currently known embodiments. To this end, those skilled in the relevant art will recognize and appreciate that many changes can be made to the various embodiments of the invention described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Terminology

Unless defined otherwise, all technical and scientific terms used herein have the same meaning as commonly understood to one of ordinary skill in the art to which this invention belongs. The following definitions are provided for the full understanding of terms used in this specification.

Disclosed are the components to be used to prepare the disclosed compositions as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a particular polynucleotide is disclosed and discussed and a number of modifications that can be made to the polynucleotide are discussed, specifically contemplated is each and every combination and permutation of the polynucleotide and the modifications that are possible unless specifically indicated to the contrary. Thus, if a class of polynucleotides A, B, and C are disclosed as well as a class of polynucleotides D, E, and F and an example of a combination polynucleotide, or, for example, a combination polynucleotide comprising A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the disclosed compositions. Thus, if there are a variety of additional steps that can be performed it is understood that each of these additional steps can be performed with any specific embodiment or combination of embodiments of the disclosed methods.

It is understood that the compositions disclosed herein have certain functions. Disclosed herein are certain structural requirements for performing the disclosed functions, and it is understood that there are a variety of structures which can perform the same function which are related to the disclosed structures, and that these structures will ultimately achieve the same result.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

As used in the specification and claims, the singular form "a," "an," and "the" include plural references unless the context clearly dictates otherwise. For example, the term "an agent" includes a plurality of agents, including mixtures thereof.

As used herein, the terms "can," "may," "optionally," "can optionally," and "may optionally" are used interchangeably and are meant to include cases in which the condition occurs as well as cases in which the condition does not occur. Thus, for example, the statement that a formulation "may include an excipient" is meant to include cases in which the formulation includes an excipient as well as cases in which the formulation does not include an excipient.

Use of the phrase "and/or" indicates that any one or any combination of a list of options can be used. For example, "A, B, and/or C" means "A", or "B", or "C", or "A and B", or "A and C", or "B and C", or "A and B and C".

Grammatical variations of "administer," "administration," and "administering" to a subject include any route of introducing or delivering to a subject an agent. Administration can be carried out by any suitable route, including oral, topical, intravenous, subcutaneous, transcutaneous, transdermal, intramuscular, intra-joint, parenteral, intra-arteriole, intradermal, intraventricular, intracranial, intraperitoneal, intralesional, intranasal, rectal, vaginal, by inhalation, via an implanted reservoir, parenteral (e.g., subcutaneous, intravenous, intramuscular, intra-articular, intra-synovial, intrasternal, intrathecal, intraperitoneal, intrahepatic, intralesional, and intracranial injections or infusion techniques), and the like. "Concurrent administration", "administration in combination", "simultaneous administration" or "administered simultaneously" as used herein, means that the compounds are administered at the same point in time, overlapping in time, or one following the other.

In the latter case, the two compounds are administered at times sufficiently close that the results observed are indistinguishable from those achieved when the compounds are administered at the same point in time. "Systemic administration" refers to the introducing or delivering to a subject an agent via a route which introduces or delivers the agent to extensive areas of the subject's body (e.g. greater than 50% of the body), for example through entrance into the circulatory or lymph systems. By contrast, "local administration" refers to the introducing or delivery to a subject an agent via a route which introduces or delivers the agent to the area or area immediately adjacent to the point of administration and does not introduce the agent systemically in a therapeutically significant amount. For example, locally administered agents are easily detectable in the local vicinity of the point of administration, but are undetectable or detectable at negligible amounts in distal parts of the subject's body. Administration includes self-administration and the administration by another.

A "control" is an alternative subject, sample, or set of values used in an experiment for comparison purposes. A control can be "positive" or "negative." A control can also be a collection of values used as a standard applied to one or more subjects (e.g., a general number or average that is known and not identified in the method using a sample).

"Identical" or percent "identity," in the context of two or more nucleic acids or polypeptide sequences, refer to two or more sequences or subsequences that are the same or have a specified percentage of amino acid residues or nucleotides that are the same (e.g., about 60% identity, preferably 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or higher identity over a specified region when compared and aligned for maximum correspondence over a comparison window or designated region) as measured using a BLAST or BLAST 2.0 sequence comparison algorithms with default parameters described below, or by manual alignment and visual inspection (see, e.g., NCBI web site or the like). Such sequences are then said to be "substantially identical." This definition also refers to, or may be applied to, the complement of a test sequence. The definition also includes sequences that have deletions and/or additions, as well as those that have substitutions. As described below, the preferred algorithms can account for gaps and the like. Preferably, identity exists over a region that is at least about 10 amino acids or 20 nucleotides in length, or more preferably over a region that is 10-50 amino acids or 20-50 nucleotides in length. As used herein, percent (%) amino acid sequence identity is defined as the percentage of amino acids in a candidate sequence that are identical to the amino acids in a reference sequence, after aligning the sequences and introducing gaps, if necessary, to achieve the maximum percent sequence identity. Alignment for purposes of determining percent sequence identity can be achieved in various ways that are within the skill in the art, for instance, using publicly available computer software such as BLAST, BLAST-2, ALIGN, ALIGN-2 or Megalign (DNASTAR) software. Appropriate parameters for measuring alignment, including any algorithms needed to achieve maximal alignment over the full-length of the sequences being compared can be determined by known methods.

For sequence comparisons, typically one sequence acts as a reference sequence, to which test sequences are compared. When using a sequence comparison algorithm, test and reference sequences are entered into a computer, subsequence coordinates are designated, if necessary, and sequence algorithm program parameters are designated. Preferably, default program parameters can be used, or alternative parameters can be designated. The sequence comparison algorithm then calculates the percent sequence identities for the test sequences relative to the reference sequence, based on the program parameters.

One example of an algorithm that is suitable for determining percent sequence identity and sequence similarity are the BLAST and BLAST 2.0 algorithms, which are described in Altschul et al. (1977) *Nuc. Acids Res.* 25:3389-3402, and Altschul et al. (1990) *J. Mol. Biol.* 215:403-410, respectively. Software for performing BLAST analyses is publicly available through the National Center for Biotechnology Information. This algorithm involves first identifying high scoring sequence pairs (HSPs) by identifying short words of length W in the query sequence, which either match or satisfy some positive-valued threshold score T when aligned with a word of the same length in a database sequence. T is referred to as the neighborhood word score threshold (Altschul et al. (1990) *J. Mol. Biol.* 215:403-410). These initial neighborhood word hits act as seeds for initiating searches to find longer HSPs containing them. The word hits are extended in both directions along each sequence for as far as the cumulative alignment score can be increased. Cumulative scores are calculated using, for nucleotide sequences, the parameters M (reward score for a pair of matching residues; always >0) and N (penalty score for mismatching residues; always <0). For amino acid sequences, a scoring matrix is used to calculate the cumulative score. Extension of the word hits in each direction are halted when: the cumulative alignment score falls off by the quantity X from its maximum achieved value; the cumulative score goes to zero or below, due to the accumulation of one or more negative-scoring residue alignments; or the end of either sequence is reached. The BLAST algorithm parameters W, T, and X determine the sensitivity and speed of the alignment. The BLASTN program (for nucleotide sequences) uses as defaults a wordlength (W) of 11, an expectation (E) or 10, M=5, N=-4 and a comparison of both strands. For amino acid sequences, the BLASTP program uses as defaults a wordlength of 3, and expectation (E) of 10, and the BLOSUM62 scoring matrix (see Henikoff and Henikoff (1989) *Proc. Natl. Acad. Sci. USA* 89:10915) alignments (B) of 50, expectation (E) of 10, M=5, N=-4, and a comparison of both strands.

The BLAST algorithm also performs a statistical analysis of the similarity between two sequences (see, e.g., Karlin and Altschul (1993) *Proc. Natl. Acad. Sci. USA* 90:5873-5787). One measure of similarity provided by the BLAST algorithm is the smallest sum probability (P(N)), which provides an indication of the probability by which a match between two nucleotide or amino acid sequences would occur by chance. For example, a nucleic acid is considered similar to a reference sequence if the smallest sum probability in a comparison of the test nucleic acid to the reference nucleic acid is less than about 0.2, more preferably less than about 0.01.

As used herein, the terms "aggregate" or "aggregation" refer to a biological phenomenon in which a protein molecule attaches to another and accumulates to form a higher order complex such as a proteinaceous clump or fibril. Generally, protein aggregates contain a single type of protein, of which numerous copies attach and clump together. A protein aggregate can, but need not necessarily, deposit (e.g., on or in cells or tissue) as an insoluble complex. The term is intended to exclude small oligomeric clumps (10 copies of a protein molecule or less), as well as native hetero- and homo-polymeric proteins in which the polymeric form of the protein naturally contributes to the function of the protein (e.g., polymeric actin filaments). Incorrect three-dimensional protein folding ("misfolding") is a known cause of protein aggregation. Numerous diseases, including many neurodegenerative diseases, are associated with protein aggregation. As used herein, the term "aggregate" and grammatical variations thereof, as it relates to proteins, is used interchangeably with the terms "inclusion," "particle," and grammatical variations thereof.

As used herein, the term "disaggregate" refers to the breaking down of one or more protein aggregates. As a protein aggregate contains numerous copies of a protein clumped together, disaggregation refers to a process of removing portions of the aggregated protein clump. Thus, as used herein, disaggregation refers to the removal of portions of an existing protein aggregate, such that after disaggregation, the result is a smaller protein aggregate clump or an absence of a protein aggregate clump altogether. Detection of aggregate size and changes thereto depend on the sensitivity of the equipment and techniques used to detect aggregate size. Thus, under one technique, a disaggregated clump may be undetectable, whereas under another technique, the same disaggregated clump may be detected as having a smaller size.

As used herein, the term "associated with a neurodegenerative disease," as it relates to a nucleic acid-binding polypeptide, is intended to refer to the existence of a correlation between the nucleic acid-binding polypeptide and occurrence of the neurodegenerative disease which is sufficiently strong and researched, such that one of skill in the art would conclude that the nucleic acid-binding polypeptide (specifically, in vivo aggregation of the nucleic acid-binding polypeptide) likely plays a role in the risk, onset, progression, and/or exacerbation of the neurodegenerative disease. However, one of skill in the art would neither need to conclude that the nucleic acid-binding polypeptide plays the only role in the risk, onset, progression, and/or exacerbation of the neurodegenerative disease, nor that the particular neurodegenerative disease is always influenced or affected by the nucleic acid-binding protein.

"Pharmaceutically acceptable carrier" (sometimes referred to as a "carrier") means a carrier or excipient that is useful in preparing a pharmaceutical or therapeutic composition that is generally safe and non-toxic, and includes a carrier that is acceptable for veterinary and/or human pharmaceutical or therapeutic use. The terms "carrier" or "pharmaceutically acceptable carrier" can include, but are not limited to, phosphate buffered saline solution, water, emulsions (such as an oil/water or water/oil emulsion) and/or various types of wetting agents. As used herein, the term "carrier" encompasses, but is not limited to, any excipient, diluent, filler, salt, buffer, stabilizer, solubilizer, lipid, stabilizer, or other material well known in the art for use in pharmaceutical formulations and as described further herein.

"Preventing" a disorder or unwanted physiological event in a subject refers specifically to the prevention of the occurrence of symptoms and/or their underlying cause, wherein the subject may or may not exhibit heightened susceptibility to the disorder or event. As used herein, preventing protein inclusion includes preventing or delaying the initiation of protein inclusion. The term further includes preventing a recurrence of one or more signs or symptoms of protein inclusion.

"Polynucleotide" refers to a polymeric form of nucleotides of any length, either deoxyribonucleotides or ribonucleotides, or analogs thereof. Polynucleotides may have any three-dimensional structure, and may perform any function, known or unknown. The following are non-limiting examples of polynucleotides: a gene or gene fragment, exons, introns, messenger RNA (mRNA), transfer RNA, ribosomal RNA, ribozymes, cDNA, recombinant polynucleotides, branched polynucleotides, plasmids, vectors, isolated DNA of any sequence, isolated RNA of any sequence, nucleic acid probes, and primers. A polynucleotide may comprise modified nucleotides, such as methylated nucleotides and nucleotide analogs. If present, modifications to the nucleotide structure may be imparted before or after assembly of the polymer. The sequence of nucleotides may be interrupted by non-nucleotide components. A polynucleotide may be further modified after polymerization, such as by conjugation with a labeling component. A polynucleotide is composed of a specific sequence of four nucleotide bases: adenine (A); cytosine (C); guanine (G); thymine (T); and uracil (U) for thymine (T) when the polynucleotide is RNA. Thus, a "polynucleotide" sequence can be represented by the sequential alphabetical representation of each base in a polynucleotide molecule.

"Peptide," "protein," and "polypeptide" are used interchangeably to refer to a natural or synthetic molecule comprising two or more amino acids linked by the carboxyl group of one amino acid to the alpha amino group of another. The amino acids may be natural or synthetic, and can contain chemical modifications such as disulfide bridges, substitution of radioisotopes, phosphorylation, substrate chelation (e.g., chelation of iron or copper atoms), glycosylation, acetylation, formylation, amidation, biotinylation, and a wide range of other modifications. A polypeptide may be attached to other molecules, for instance molecules required for function. Examples of molecules which may be attached to a polypeptide include, without limitation, cofactors, polynucleotides, lipids, metal ions, phosphate, etc. Non-limiting examples of polypeptides include peptide fragments, denatured/unstructured polypeptides, polypeptides having quaternary or aggregated structures, etc. There is expressly no requirement that a polypeptide must contain an intended function; a polypeptide can be functional, non-functional, function for unexpected/unintended purposes, or have unknown function. A polypeptide is comprised of approximately twenty, standard naturally occurring amino acids, although natural and synthetic amino acids which are not members of the standard twenty amino acids may also be used. The standard twenty amino acids include alanine (Ala, A), arginine (Arg, R), asparagine (Asn, N), aspartic acid (Asp, D), cysteine (Cys, C), glutamine (Gln, Q), glutamic acid (Glu, E), glycine (Gly, G), histidine, (His, H), isoleucine (Ile, I), leucine (Leu, L), lysine (Lys, K), methionine (Met, M), phenylalanine (Phe, F), proline (Pro, P), serine (Ser, S), threonine (Thr, T), tryptophan (Trp, W), tyrosine (Tyr, Y), and valine (Val, V). The terms "polypeptide sequence" or "amino acid sequence" are an alphabetical representation of a polypeptide molecule.

The term "TDP-43" refers herein to TAR DNA Binding Protein 43 kDa. TDP-43 is also known as TDP43, TARDBP, and ALS10. In some embodiments, the TDP-43 polypeptide or polynucleotide is that identified in one or more publicly available databases as follows: HGNC: 11571 Entrez Gene: 23435 Ensembl: ENSG00000120948 OMIM: 605078 UniProtKB: Q13148.

The term "Fus" refers herein to a FUS RNA binding protein. FUS is also known as "Heterogeneous Nuclear Ribonucleoprotein P2," "Translocated In Liposarcoma Protein," 75 KDa DNA-Pairing Protein," "Fused In Sarcoma," "Oncogene FUS," "Oncogene TLS," "POMP75," and "TLS." In some embodiments, the FUS polypeptide or polynucleotide is that identified in one or more publicly available databases as follows: HGNC: 4010 Entrez Gene: 2521 Ensembl: ENSG00000089280 OMIM: 137070 UniProtKB: P35637.

The term "Tau" refers herein to a Microtubule Associated Protein Tau. Tau is also known as "G Protein Beta1/Gamm2 Subunit-Interacting Factor 1," "Protein Phosphatase 1," Neurofibrillary Tangle Protein," "PPP1R103," "FTDP-17," "MTBT2," "DDPAC," "MSTD," PPND," "MAPTL," and "MTBT1." In some embodiments, the Tau polypeptide or polynucleotide is that identified in one or more publicly available databases as follows: HGNC: 6893 Entrez Gene: 4137 Ensembl: ENSG00000186868 OMIM: 157140 UniProtKB: P10636.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

"Therapeutically effective amount" or "therapeutically effective dose" of a composition (e.g. a composition comprising an agent) refers to an amount that is effective to achieve a desired therapeutic result. In some embodiments, a desired therapeutic result is the control of type I diabetes. In some embodiments, a desired therapeutic result is the control of obesity. Therapeutically effective amounts of a given therapeutic agent will typically vary with respect to factors such as the type and severity of the disorder or disease being treated and the age, gender, and weight of the subject. The term can also refer to an amount of a therapeutic agent, or a rate of delivery of a therapeutic agent (e.g., amount over time), effective to facilitate a desired therapeutic effect, such as pain relief. The precise desired therapeutic effect will vary according to the condition to be treated, the tolerance of the subject, the agent and/or agent formulation to be administered (e.g., the potency of the therapeutic agent, the concentration of agent in the formulation, and the like), and a variety of other factors that are appreciated by those of ordinary skill in the art. In some instances, a desired biological or medical response is achieved following administration of multiple dosages of the composition to the subject over a period of days, weeks, or years.

The terms "treat," "treating," "treatment," and grammatical variations thereof as used herein, include partially or completely delaying, curing, healing, alleviating, relieving, altering, remedying, ameliorating, improving, stabilizing, mitigating, and/or reducing the intensity or frequency of one or more diseases or conditions, symptoms of a disease or condition, or underlying causes of a disease or condition. Treatments according to the invention may be applied prophylactically, palliatively or remedially. Prophylactic treatments are administered to a subject prior to onset (e.g., before obvious signs of cancer), during early onset (e.g., upon initial signs and symptoms of cancer), or after an established development of cancer. Prophylactic administration can occur for several days to years prior to the manifestation of symptoms.

Compositions

It is understood that the polynucleotides of the present disclosure can be used in combination with the various compositions, methods, products, and applications disclosed herein.

The disclosure herein addresses needs in the art by providing for compositions and methods to treat one or more neurodegenerative diseases. To date, no currently approved drugs are available which can prevent protein aggregation or inclusion formation, disrupt existing protein aggregates or inclusions, and reduce the overall amount of protein aggregates or inclusions in a patient suffering from a neurodegenerative disease. The disclosed compositions and methods can achieve these outcomes by binding one or more polynucleotides to a neurodegenerative disease-associated nucleic acid-binding polypeptide to prevent aggregation or disrupt aggregates. Thus, the disclosed methods of using the polynucleotide compositions represent a major breakthrough in the advancement of neurodegenerative disease treatments.

Disclosed herein are compositions comprising a polynucleotide that binds a nucleic acid-binding polypeptide, wherein the nucleic acid-binding polypeptide can aggregate within or outside cells and is associated with a neurodegenerative disease.

The nucleic acid-binding polypeptide can be any polypeptide that can or is known to aggregate in cells and is associated with a neurodegenerative disease. Deposited aggregates can be toxic to cells and tissues. An aggregate generally comprises numerous molecules of the same protein, but can be comprised of a mixture of different protein molecules. The protein molecules of an aggregate are typically arranged in a regular three-dimensional structure and frequently are bonded together via hydrophobic interaction, although other intermolecular forces can further stabilize the interaction. A polypeptide can or is known to aggregate in cells when it is observed to form an aggregate in a subject (e.g., in a post-mortem tissue analysis), or in a cell- or tissue-based assay under physiological conditions. Generally, the cell or tissue used in the assay natively expresses the polypeptide in vivo. For instance, the polypeptide TDP-43 is a human polypeptide which can be natively expressed in human neuronal cells, and has been observed to form protein aggregates in both cell-based assays and in post-mortem brain autopsies. Typically, the polypeptide aggregate can deposit on cells of the nervous system such as glial cells and/or neuronal cells.

The nucleic acid-binding polypeptide can have a number of various attributes. In some embodiments, the nucleic acid-binding polypeptide comprises a RNA-binding domain (sometimes referred to as a RNA-recognition motifs or RRM). In some embodiments, the nucleic acid-binding polypeptide comprises a C-terminal glycine-rich, prion-like/ low complexity domain (LCD; sometimes referred to as an intrinsically-disordered region (IDR)). In some embodiments, the nucleic acid-binding polypeptide has an increased rate of aggregation when the concentration of free polynucleotides is reduced. As used herein, the term "free polynucleotide" (encompassing, for example, "free RNA," and "free DNA") when used in reference to intracellular polynucleotides, refers to polynucleotides present in the cell and readily available for binding (e.g., not sequestered or sterically blocked) to the nucleic acid-binding protein, but is not bound by the nucleic acid-binding protein. Free polynucleotides can be bound by other factors (e.g., other proteins) if the polynucleotides remain readily available for binding to the nucleic acid-binding protein. Conversely, a polynucleotide which is sequestered, sterically blocked from further binding, housed within a vacuole, incorporated into a large supramolecular complex, or otherwise incapable of readily binding to the nucleic-acid binding protein is not a free polynucleotide. Reduction of free polynucleotides can be below average cellular or physiological levels. Average cellular and physiological levels of free polynucleotides differ between organisms, tissue types, and cell types and are readily determinable by those skilled in the art, but in some embodiments can be roughly 7.5 µg/µL free RNA in the nucleus and roughly 0.2 µg/µL free RNA in the cytoplasm. Average levels of free polynucleotides can be determined empirically from a control sample or can be a collection of values used as a standard applied to one or more subjects (e.g., a general number or average that is known and not identified in the method using a sample). In some embodiments, the nucleic acid-binding polypeptide can aggregate intracellularly in the cytoplasm. In some embodiments, the nucleic acid-binding polypeptide can aggregate and deposit on cells such as neuronal cells. In some embodiments, aggregation of the nucleic acid-binding polypeptide can cause, exacerbate, and/or accelerate a neurodegenerative disease or a symptom of a neurodegenerative disease.

In some embodiments, binding of the polynucleotide to the nucleic acid-binding polypeptide results in a complex which associates with stress granules or stress granule components, whereas lack of binding of the polynucleotide to the nucleic acid-binding polypeptide results in aggregated nucleic acid-binding polypeptide which does not associate with stress granules or stress granule components. In some embodiments, binding of the polynucleotide to the nucleic acid-binding polypeptide results in a complex which is soluble under physiological conditions (e.g., no appreciable aggregation of the nucleic acid-binding polypeptide occurs upon binding to the polynucleotide). In some embodiments, binding of the polynucleotide to the nucleic acid-binding polypeptide prevents, delays, or reverses aggregation of the nucleic acid-binding polypeptide.

In some embodiments, the nucleic acid-binding polypeptide specifically binds nucleic acids. As used herein, the term "specifically binds" refers to a binding reaction in which a first molecule that "specifically binds" a second molecule has an affinity constant (Ka) greater than about $10^2$ $M^{-1}$ (e.g., $10^3$ $M^{-1}$, $10^4$ $M^{-1}$, $10^5$ $M^{-1}$, $10^6$ $M^{-1}$, $10^7$ $M^{-1}$, $10^8$ $M^{-1}$, and $10^9$ $M^{-1}$ or more) with that second molecule.

In some embodiments, the nucleic acid-binding polypeptide preferentially binds UG-rich RNA. As used herein, the term "preferentially binds," as used in reference to the binding of a nucleic acid-binding polypeptide and a nucleic acid, refers to a binding reaction in which the nucleic acid-binding polypeptide binds the nucleic acid comprising the stated characteristic with an affinity constant (Ka) which is greater compared to the affinity constant when binding to an RNA which lacks the stated characteristic.

In some embodiments, the nucleic acid-binding polypeptide can be any one or more of TDP-43, FUS, HNRNPA1, HNRNPA2/B1, EWSR1, TIA-1, TTP, TAF15, MATR3, ATXN2, OPTN, Tau, HTT, and biologically active fragments and variants thereof. In some embodiments, the nucleic acid-binding polypeptide comprises TDP-43 or a biologically active fragment or variant thereof, or FUS or a biologically active fragment or variant thereof.

TABLE 1

Example RNA and/or DNA binding polypeptides which can be aggregated in neurodegenerative diseases.

| RNA/DNA Binding Protein | Associated Disease |
| --- | --- |
| TDP-43 | ALS, FTD, CTE, AD, HD |
| FUS | ALS, FTD |
| HNRNPA1 | ALS, MSP |
| HNRNPA2/B1 | ALS, MSP |
| EWSR1 | ALS |
| TIA-1 | ALS |
| TTP | ALS, FTD, AD |
| TAF15 | ALS, FTD |
| ATXN2 | ALS |
| OPTN | ALS |
| MART3 | ALS |
| ADAR1 | ALS |
| ADAR2 | ALS |
| ADAR3 | ALS |

TABLE 1-continued

Example RNA and/or DNA binding polypeptides which can be aggregated in neurodegenerative diseases.

| Potential RNA Binding Proteins | Associated Disease |
| --- | --- |
| Tau | AD, TBI, FTD, CBD |
| HTT | HD |

ALS: Amyotrophic Lateral Sclerosis
MSP: Multisystem Proteinopathy
FTD: Frontotemporal Dementia
AD: Alzheimer's Disease
CTE: Chronic Traumatic Encephalopathy
TBI: Traumatic Brain Injury
CBD: Cortical Basal Degeneration
HD: Huntington's Disease TBI: Traumatic Brain Injury
CBD: Cortical Basal Degeneration
HD: Huntington's Disease In some embodiments, the nucleic acid-binding polypeptide can comprise an amino acid sequence which is at least 70% identical to SEQ ID NO:1. In some embodiments, the nucleic acid-binding polypeptide is a polypeptide comprising an amino acid sequence which is at least 75%, at least 80%, at least 85%, at least 90%, at least 95%, at least 98%, or at least 99% identical to SEQ ID NO:1. In some embodiments, the nucleic acid-binding polypeptide is a polypeptide comprising SEQ ID NO:1.

In some embodiments, the nucleic acid-binding polypeptide can comprise an amino acid sequence which is at least 70% identical to SEQ ID NO:2. In some embodiments, the nucleic acid-binding polypeptide is a polypeptide comprising an amino acid sequence which is at least 75%, at least 80%, at least 85%, at least 90%, at least 95%, at least 98%, or at least 99% identical to SEQ ID NO:2. In some embodiments, the nucleic acid-binding polypeptide is a polypeptide comprising SEQ ID NO:2.

In some embodiments, the nucleic acid-binding polypeptide can comprise an amino acid sequence which is at least 70% identical to SEQ ID NO:3. In some embodiments, the nucleic acid-binding polypeptide is a polypeptide comprising an amino acid sequence which is at least 75%, at least 80%, at least 85%, at least 90%, at least 95%, at least 98%, or at least 99% identical to SEQ ID NO:3. In some embodiments, the nucleic acid-binding polypeptide is a polypeptide comprising SEQ ID NO:3.

The nucleic acid-binding polypeptide is associated with one or more neurodegenerative diseases. Neurodegenerative diseases include, but not limited to, Limbic-predominant Age-related TDP-43 Encephalopathy (LATE), Alzheimer's disease (AD), dementia, Parkinson's disease (PD), Prion disease, Motor neurone diseases (MND), Huntington's disease (HD), Spinocerebellar ataxia (SCA), Spinal muscular atrophy (SMA), Multisystem Proteinopathy, Amyotrophic Lateral Sclerosis (ALS), Frontotemporal Dementia, Chronic Traumatic Encephalopathy, Traumatic Brain Injury, Cortical Basal Degeneration, Friedreich's ataxia, Lewy body disease, Alper's Disease, Batten Disease, Cerebro-Oculo-Facio-Skeletal Syndrome, Corticobasal Degeneration, Gerstmann-Straussler-Scheinker Disease, Kuru, Leigh's Disease, Monomelic Amyotrophy, Shy-Drager Syndrome, Opsoclonus Myoclonus, Progressive Multifocal Leukoencephalopathy, Striatonigral Degeneration, Spongiform Encephalopathy, Creutzfeldt-Jakob Disease, Primary Progressive Aphasia, and Progressive Supranuclear Palsy. In some embodiments, the neurodegenerative disease can comprise Multisystem Proteinopathy, Amyotrophic Lateral Sclerosis, Frontotemporal Dementia, Alzheimer's Disease, Chronic Traumatic Encephalopathy, Traumatic Brain Injury, Cortical Basal Degeneration, and Huntington's Disease. A patient may suffer from any one or more neurodegenerative diseases. In some embodiments, the neurodegenerative disease can comprise Limbic-predominant Age-related TDP-43 Encephalopathy (LATE), Alzheimer's disease (AD), Amyotrophic Lateral Sclerosis or Frontotemporal Dementia. In some embodiments, the neurodegenerative disease can comprise Amyotrophic Lateral Sclerosis or Frontotemporal Dementia.

An array of polynucleotide molecules can be compatible with the disclosed technology. In some embodiments, the polynucleotide in the composition comprises RNA, DNA, or combinations thereof. The polynucleotide can be either single-stranded or double-stranded. In some embodiments, a single-stranded polynucleotide is selected. In some embodiments, the polynucleotide comprises RNA. In some embodiments, the polynucleotide comprises DNA, particularly a modified DNA. In some embodiments, the polynucleotide can comprise a synthetic polynucleotide (e.g., a synthetic RNA). By "synthetic," it is meant that the polynucleotide is non-naturally occurring and formed by laboratory, commercial, or industrial methods.

The polynucleotide can be a modified polynucleotide. The polynucleotide can contain one or more modifications, for example, methylation, deamination, thiolation, alkylation, pegylation, phosphorothioate bonds, 2'-O-methylation, and numerous others known in the art. Modifications can be present not only on synthetic polynucleotides, but also on polynucleotides from natural sources or derived from natural sources (thereby resulting in a "non-natural" polynucleotide).

In some embodiments, the composition further comprises one or more additional polynucleotides. In some embodiments, the composition can comprise a plurality of polynucleotides.

Generally, the polynucleotide is at least 2 nucleotides long. In some embodiments, the polynucleotide is at least 3, at least 4, at least 5, at least 6, at least 7, at least 8, at least 9, at least 10, at least 12, at least 15, at least 20, at least 25, at least 30, or at least 50 nucleotides long. In some embodiments, the polynucleotide is at least 100, at least 150, at least 200, at least 250, at least 300, at least 350, at least 400, at least 450, or at least 500 nucleotides long. In some embodiments, the polynucleotide is at least 24 nucleotides long.

In some embodiments, the polynucleotide comprises 500 nucleotides or less. In some embodiments, the polynucleotide comprises 400, 300, 250, 200, or 150 nucleotides or less. In some embodiments, the polynucleotide comprises 100 nucleotides or less. In some embodiments, the polynucleotide comprises 75 nucleotides or less. In some embodiments, the polynucleotide comprises 50 nucleotides or less.

The polynucleotide can have a variety of length ranges. For instance, the polynucleotide can be from 2 to 500 nucleotides long. In some embodiments, the polynucleotide can range from 5 to 250 nucleotides long, from 10 to 100 nucleotides long, from 15 to 75 nucleotides long, or from 20 to 50 nucleotides long. In some embodiments, the polynucleotide can range from 20 to 45 nucleotides long, from 21 to 44 nucleotides long, from 22 to 43 nucleotides long, from 23 to 42 nucleotides long, from 24 to 41 nucleotides long, or from 25 to 40 nucleotides long. In some embodiments, the polynucleotide can range from 5 to 20 nucleotides long, or from 10 to 20 nucleotides long, or from 10 to 15 nucleotides long.

In some embodiments, the polynucleotide comprises a uracil- and guanine-rich nucleic acid sequence, or a thymine- and guanine-rich nucleic acid sequence. In some embodiments, the uracil- and guanine-rich nucleic acid sequence or the thymine- and guanine-rich nucleic acid sequence is at least 24 bp long. In some embodiments, the uracil- and guanine-rich nucleic acid sequence comprises at least 55%, at least 60%, at least 70%, at least 80%, at least 90%, at least 95%, or at least 99% uracil and guanine nucleotides. In some embodiments, the thymine- and guanine-rich nucleic acid sequence comprises at least 55%, at least 60%, at least 70%, at least 80%, at least 90%, at least 95%, or at least 99% thymine and guanine nucleotides. In some embodiments, the polynucleotide comprises a GGUG or a GGTG sequence, which are known to be binding recognition sequences for nucleic acid-binding polypeptides. Other binding recognition sequences for nucleic acid-binding polypeptides include, but are not limited to, $(TG)_n$ wherein n is an integer from 6 to 10 representing the number of repeats of the immediately preceding sequence in parentheses, and $(TG)_nTA(TG)_m$ wherein n and m are both integers separately ranging from 0 to 5 and represent the number of repeats of the immediately preceding sequence in parentheses (Colombrita et al., J. Biol. Chem., (2012), 287, 15635-15647. Further binding recognition sequences for nucleic acid-binding polypeptides include, but are not limited to, AGN(A/C)(A/G)NNNUG, G(A/C)UN(U/C)(G/C)A(A/G)UG, and GCU(U/G)C(C/G)A(G/C)C, wherein two nucleotides in parentheses separated by a "/" refer to selection of either one of the two nucleotides, and wherein N refers to any nucleotide (Choi et al., Biotechniques, (2017), 62:28-33).

The polynucleotide can comprise a single sequence, or alternatively can comprise a sequence which is repeated one or more times. Polynucleotide sequences which are well-suited for use singly or as repeated motifs in a polynucleotide that binds a nucleic acid-binding polypeptide include SEQ ID NO:33-56 and can be repeated "n" times, wherein the subscript "n" is an integer from 1 to 100. For example, the sequence $(ATGTGTGTGTGT)_n$ (SEQ ID NO:33) can be used as a polynucleotide that binds a nucleic acid-binding polypeptide in the form of ATGTGTGTGTGT (n=1), ATGTGTGTGTGTATGTGTGTGTGT (n=2), ATGTGTGTGTGTATGTGTGTGTGTATGTGTGTGTGT (n=3), and so on. In some embodiments, the polynucleotide can comprise a sequence which is repeated once. In some embodiments, the polynucleotide can comprise a sequence which is repeated twice, three times, four times, or five times. In some embodiments, the polynucleotide can comprise a sequence which is repeated more than five times. In some embodiments, "n" can be any integer from 1 to 100, or from 1 to 50, or from 1 to 25, or from 1 to 10, from 1 to 5, from 1 to 4, from 1 to 3, or from 1 to 2.

In some embodiments, the polynucleotide can comprise a nucleic acid sequence which is at least 70% identical to any one or more of SEQ ID NO:10 through SEQ ID NO:84 or SEQ ID NO:96-119. In some embodiments, the polynucleotide can comprise a nucleic acid sequence which is at least 70% identical to any one or more of SEQ ID NO:10 through SEQ ID NO:84. In some embodiments, the polynucleotide can comprise a nucleic acid sequence which is at least 70% identical to any one or more of SEQ ID NO:96 through SEQ ID NO:119. In some embodiments, the polynucleotide can comprise a nucleic acid sequence which is at least 75%, at least 80%, at least 85%, at least 90%, at least 95%, at least 98%, or at least 99% identical to any one or more of the sequences described in this paragraph. In some embodiments, the polynucleotide is a polynucleotide comprising any one or more of the sequences described in this paragraph.

In some embodiments, the selected polynucleotide comprises any one or more of SEQ ID NO:62 through SEQ ID NO:84. A polynucleotide comprising any one or more of SEQ ID NO:62 through SEQ ID NO:84 can further comprise any one or more of SEQ ID NO:85 through SEQ ID NO:95. SEQ ID NO:85 through SEQ ID NO:95 are useful for forming stem secondary structures, for instance in a stem loop. An array of combinations are possible, which include non-limiting examples such as a polynucleotide comprising any of the following:

SEQ ID NO:85, SEQ ID NO:62, and SEQ ID NO:86, in that order;
SEQ ID NO:87, SEQ ID NO:63, and SEQ ID NO:88, in that order;
SEQ ID NO:92, SEQ ID NO:64, and SEQ ID NO:92, in that order;
SEQ ID NO:92, SEQ ID NO:65, and SEQ ID NO:92, in that order;
SEQ ID NO:92, SEQ ID NO:66, and SEQ ID NO:92, in that order;
SEQ ID NO:92, SEQ ID NO:67, and SEQ ID NO:92, in that order;
SEQ ID NO:92, SEQ ID NO:68, and SEQ ID NO:92, in that order;
SEQ ID NO:92, SEQ ID NO:69, and SEQ ID NO:92, in that order;
SEQ ID NO:92, SEQ ID NO:70, and SEQ ID NO:92, in that order;
SEQ ID NO:92, SEQ ID NO:71, and SEQ ID NO:92, in that order;
SEQ ID NO:92, SEQ ID NO:72, and SEQ ID NO:92, in that order;
SEQ ID NO:92, SEQ ID NO:73, and SEQ ID NO:92, in that order;
SEQ ID NO:92, UGUGUGUG, and SEQ ID NO:92, in that order;
SEQ ID NO:92, UGUGUG, and SEQ ID NO:92, in that order;
SEQ ID NO:89, SEQ ID NO:74, and SEQ ID NO:89, in that order;
SEQ ID NO:90, SEQ ID NO:74, and SEQ ID NO:90, in that order;
SEQ ID NO:91, SEQ ID NO:74, and SEQ ID NO:91, in that order;
SEQ ID NO:92, SEQ ID NO:74, and SEQ ID NO:92, in that order;
SEQ ID NO:93, SEQ ID NO:74, and SEQ ID NO:93, in that order;
SEQ ID NO:94, SEQ ID NO:74, and SEQ ID NO:94, in that order;
SEQ ID NO:95, SEQ ID NO:74, and SEQ ID NO:95, in that order;
CGCGCGCG, SEQ ID NO:74, and CGCGCGCG, in that order;
CGCGCG, SEQ ID NO:74, and CGCGCG, in that order;
CGCG, SEQ ID NO:74, and CGCG, in that order;
CG, SEQ ID NO:74, and CG, in that order;
SEQ ID NO:92, SEQ ID NO:75, and SEQ ID NO:92, in that order;
SEQ ID NO:92, SEQ ID NO:76, and SEQ ID NO:92, in that order;
SEQ ID NO:92, SEQ ID NO:77, and SEQ ID NO:92, in that order;
SEQ ID NO:92, SEQ ID NO:78, and SEQ ID NO:92, in that order;
SEQ ID NO:92, SEQ ID NO:79, and SEQ ID NO:92, in that order;
SEQ ID NO:92, SEQ ID NO:80, and SEQ ID NO:92, in that order;
SEQ ID NO:92, SEQ ID NO:81, and SEQ ID NO:92, in that order;
SEQ ID NO:92, SEQ ID NO:82, and SEQ ID NO:92, in that order;
SEQ ID NO:92, SEQ ID NO:83, and SEQ ID NO:92, in that order;
SEQ ID NO:92, SEQ ID NO:84, and SEQ ID NO:92, in that order;
SEQ ID NO:92, TGTGTGTG, and SEQ ID NO:92, in that order; or
SEQ ID NO:92, TGTGTG, and SEQ ID NO:92, in that order.

Where the selected polynucleotide comprises two or more of the disclosed sequences, 100 or less intervening nucleotides can be between the two or more disclosed sequences. In some embodiments, 90 or less, 80 or less, 70 or less, 60 or less, 50 or less, 40 or less, 30 or less, 20 or less, or 10 or less intervening nucleotides can be between the two or more disclosed sequences. In some embodiments, 7 or less, 5 or less, 3 or less, 2 or less, 1, or 0 intervening nucleotides can be between the two or more disclosed sequences. Where the selected polynucleotide comprises three or more of the disclosed sequences, neither the number nor the sequence of the intervening nucleotides between the disclosed sequences need be the same, As a non-limiting example, the selected polynucleotide can comprise SEQ ID NO:85, followed by the intervening sequence "AGCG", followed by SEQ ID NO:62, followed by the intervening sequence "GGGGCC", and followed by SEQ ID NO:86, in that order.

In some embodiments, the selected polynucleotide comprises any one or more of SEQ ID NO:10 through SEQ ID NO:61. A polynucleotide comprising any one or more of SEQ ID NO:10 through SEQ ID NO:61 can further comprise any one or more of SEQ ID NO:85 through SEQ ID NO:95. An array of combinations are possible.

In some embodiments, the selected polynucleotide comprises any one or more of SEQ ID NO:10, SEQ ID NO:11, SEQ ID NO:12, SEQ ID NO:13, SEQ ID NO:14, and SEQ ID NO:59.

In some embodiments, the selected polynucleotide comprises any one or more of SEQ ID NO:96, SEQ ID NO:97, SEQ ID NO:98, SEQ ID NO:99, SEQ ID NO:100, SEQ ID NO:101, SEQ ID NO:102, or SEQ ID NO:103. In some embodiments, the selected polynucleotide comprises any one or more of SEQ ID NO:104, SEQ ID NO:105, SEQ ID NO:106, SEQ ID NO:107, SEQ ID NO:108, SEQ ID NO:109, SEQ ID NO:110, SEQ ID NO:111, SEQ ID NO:112, SEQ ID NO:113, SEQ ID NO:114, SEQ ID NO:115, SEQ ID NO:117, SEQ ID NO:118, and SEQ ID NO:119. In some embodiments, the selected polynucleotide comprises any one or more of SEQ ID NO:98 and SEQ ID NO: 116.

The polynucleotide can have secondary structure or be further bound to additional components. For example, the polynucleotide can comprise a region of paired nucleic acids (base pairs), for instance in the stem portion of a stem loop. In some embodiments, the polynucleotide comprises a secondary structure. In some embodiments, the secondary structure (e.g., stem loop structure) facilitates binding of the polynucleotide to the nucleic acid-binding polypeptide.

Numerous polynucleotides which bind to the nucleic acid-binding polypeptides disclosed herein are known in the art. For example, polynucleotides which bind to the nucleic acid-binding polypeptide TDP-43 are disclosed in Sephton et al., J. Biol. Chem., (2011) 286(2):1204-1215.

Also disclosed herein are pharmaceutical compositions comprising a therapeutically effective amount of a pharmaceutically acceptable excipient and a polynucleotide that binds a nucleic acid-binding polypeptide, wherein the nucleic acid-binding polypeptide can aggregate in cells and is associated with a neurodegenerative disease. In some embodiments, the polynucleotide is present in a therapeutically effective amount to treat a neurodegenerative disease. Suitable excipients include, but are not limited to, salts, diluents, (e.g., Tris-HCl, acetate, phosphate), preservatives (e.g., Thimerosal, benzyl alcohol, parabens), binders, fillers, solubilizers, disintegrants, sorbents, solvents, pH modifying agents, antioxidants, antinfective agents, suspending agents, wetting agents, viscosity modifiers, tonicity agents, stabilizing agents, and other components and combinations thereof. Suitable pharmaceutically acceptable excipients are preferably selected from materials which are generally recognized as safe (GRAS), and may be administered to an individual without causing undesirable biological side effects or unwanted interactions. Suitable excipients and their formulations are described in Remington's Pharmaceutical Sciences, 16th ed. 1980, Mack Publishing Co. In addition, such compositions can be complexed with polyethylene glycol (PEG), metal ions, or incorporated into polymeric compounds such as polyacetic acid, polyglycolic acid, hydrogels, etc., or incorporated into liposomes, microemulsions, micelles, unilamellar or multilamellar vesicles, erythrocyte ghosts or spheroblasts. Suitable dosage forms for administration, e.g., parenteral administration, include solutions, suspensions, and emulsions. Typically, the components of the formulation are dissolved or suspended in a suitable solvent such as, for example, water, Ringer's solution, phosphate buffered saline (PBS), or isotonic sodium chloride. The formulation may also be a sterile solution, suspension, or emulsion in a nontoxic, parenterally acceptable diluent or solvent such as 1,3-butanediol. In some cases, formulations can include one or more tonicity agents to adjust the isotonic range of the formulation. Suitable tonicity agents are well known in the art and include glycerin, mannitol, sorbitol, sodium chloride, and other electrolytes. In some cases, the formulations can be buffered with an effective amount of buffer necessary to maintain a pH suitable for parenteral administration. Suitable buffers are well known by those skilled in the art and some examples of useful buffers are acetate, borate, carbonate, citrate, and phosphate buffers. In some embodiments, the formulation can be distributed or packaged in a liquid form, or alternatively, as a solid, obtained, for example by lyophilization of a suitable liquid formulation, which can be reconstituted with an appropriate carrier or diluent prior to administration. The pharmaceutical compositions comprise a polynucleotide that selectively binds a nucleic acid-binding polypeptide, wherein the nucleic acid-binding polypeptide is capable of intracellular aggregation and is associated with a neurodegenerative disease in a therapeutically effective amount sufficient to treat a neurodegenerative disease. The pharmaceutical compositions can be formulated for medical and/or veterinary use.

Also disclosed herein are polynucleotides comprising a nucleic acid sequence which is at least 70% identical to any one or more of SEQ ID NO:10 through SEQ ID NO:84 and SEQ ID NO:96-119. In some embodiments, the polynucleotide can comprise a nucleic acid sequence which is at least 75%, at least 80%, at least 85%, at least 90%, at least 95%, at least 98%, or at least 99% identical to any one or more of SEQ ID NO:10 through SEQ ID NO:84 and SEQ ID NO:96-119. In some embodiments, the polynucleotide is a polynucleotide comprising any one or more of SEQ ID NO:10 through SEQ ID NO:84 and SEQ ID NO:96-119.

In some embodiments, the polynucleotide can comprise a nucleic acid sequence which is at least 70% identical to any one or more of SEQ ID NO:10-14, 33-56, and 61-84. In some embodiments, the polynucleotide can comprise a nucleic acid sequence which is at least 75%, at least 80%, at least 85%, at least 90%, at least 95%, at least 98%, or at least 99% identical to any one or more of SEQ ID NO:10-14, 33-56, and 61-84. In some embodiments, the polynucleotide is a polynucleotide comprising any one or more of SEQ ID NO:10-14, 33-56, and 61-84.

Also disclosed herein are polynucleotides comprising a nucleic acid sequence which is at least 70% identical to any one or more of SEQ ID NO:10, SEQ ID NO:11, SEQ ID NO:12, SEQ ID NO:13, and SEQ ID NO:14. In some embodiments, the polynucleotide can comprise a nucleic acid sequence which is at least 75%, at least 80%, at least 85%, at least 90%, at least 95%, at least 98%, or at least 99% identical to any one or more of SEQ ID NO:10, SEQ ID NO:11, SEQ ID NO:12, SEQ ID NO:13, and SEQ ID NO:14. In some embodiments, the polynucleotide is a polynucleotide comprising any one or more of SEQ ID NO:10, SEQ ID NO:11, SEQ ID NO:12, SEQ ID NO:13, and SEQ ID NO:14.

Also disclosed herein are polynucleotides comprising a nucleic acid sequence which is at least 70% identical to any one or more of SEQ ID NO:96, SEQ ID NO:97, SEQ ID NO:98, SEQ ID NO:99, SEQ ID NO:100, SEQ ID NO:101, SEQ ID NO:102, or SEQ ID NO:103. In some embodiments, the polynucleotide can comprise a nucleic acid sequence which is at least 75%, at least 80%, at least 85%, at least 90%, at least 95%, at least 98%, or at least 99% identical to any one or more of SEQ ID NO:96, SEQ ID NO:97, SEQ ID NO:98, SEQ ID NO:99, SEQ ID NO:100, SEQ ID NO:101, SEQ ID NO:102, or SEQ ID NO:103. In some embodiments, the polynucleotide is a polynucleotide comprising any one or more of SEQ ID NO:96, SEQ ID NO:97, SEQ ID NO:98, SEQ ID NO:99, SEQ ID NO:100, SEQ ID NO:101, SEQ ID NO:102, or SEQ ID NO:103.

Also disclosed herein are polynucleotides comprising a nucleic acid sequence which is at least 70% identical to any one or more of SEQ ID NO:104, SEQ ID NO:105, SEQ ID NO:106, SEQ ID NO:107, SEQ ID NO:108, SEQ ID NO:109, SEQ ID NO:110, SEQ ID NO:111, SEQ ID NO:112, SEQ ID NO:113, SEQ ID NO:114, SEQ ID NO:115, SEQ ID NO:117, SEQ ID NO:118, and SEQ ID NO:119. In some embodiments, the polynucleotide can comprise a nucleic acid sequence which is at least 75%, at least 80%, at least 85%, at least 90%, at least 95%, at least 98%, or at least 99% identical to any one or more of SEQ ID NO:104, SEQ ID NO:105, SEQ ID NO:106, SEQ ID NO:107, SEQ ID NO:108, SEQ ID NO:109, SEQ ID NO:110, SEQ ID NO:111, SEQ ID NO:112, SEQ ID NO:113, SEQ ID NO:114, SEQ ID NO:115, SEQ ID NO:117, SEQ ID NO:118, and SEQ ID NO:119. In some embodiments, the polynucleotide is a polynucleotide comprising any one or more of SEQ ID NO:104, SEQ ID NO:105, SEQ ID NO:106, SEQ ID NO:107, SEQ ID NO:108, SEQ ID NO:109, SEQ ID NO:110, SEQ ID NO:111, SEQ ID NO:112, SEQ ID NO:113, SEQ ID NO:114, SEQ ID NO:115, SEQ ID NO:117, SEQ ID NO:118, and SEQ ID NO:119.

Also disclosed herein are polynucleotides comprising a nucleic acid sequence which is at least 70% identical to any one or more of SEQ ID NO:98 and SEQ ID NO:116. In some embodiments, the polynucleotide can comprise a nucleic acid sequence which is at least 75%, at least 80%, at least 85%, at least 90%, at least 95%, at least 98%, or at least 99% identical to any one or more of SEQ ID NO:98 and SEQ ID NO:116. In some embodiments, the polynucleotide is a polynucleotide comprising any one or more of SEQ ID NO:98 and SEQ ID NO:116.

Also disclosed herein are polynucleotides comprising a nucleic acid sequence which is at least 70% identical to any one or more of SEQ ID NO:99-101 and 106-119. In some embodiments, the polynucleotide can comprise a nucleic acid sequence which is at least 75%, at least 80%, at least 85%, at least 90%, at least 95%, at least 98%, or at least 99% identical to any one or more of SEQ ID NO:99-101 and 106-119. In some embodiments, the polynucleotide is a polynucleotide comprising any one or more of SEQ ID NO:99-101 and 106-119.

Also disclosed herein is a composition to model TDP-43 protein aggregation comprising a nucleotide sequence encoding a chimeric polypeptide, comprising: a first nucleotide sequence encoding a light-induced oligomerization domain and a second nucleotide sequence encoding a TDP-43 polypeptide. The TDP-43 polypeptide can be full-length TDP-43 polypeptide, or can in some embodiments comprise the TDP-43 Low Complexity Domain (LCD), the TDP-43 RNA-Recognition Motif (RRM), or both. The composition to model TDP-43 protein aggregation can comprise any of the TDP43 modeling constructs (e.g., optoTDP43) disclosed in PCT/US2018/021335, which is incorporated by reference herein in its entirety. In some embodiments, the light-induced oligomerization domain is selected from the group consisting of CRYPHR, CRY2OLIG, NcVVD, NcVVDY50W, NcLOV, and VfAU1LOV. In some embodiments, the first and second nucleotide sequences are comprised within an expression vector. Also disclosed is a cell comprising a nucleotide sequence encoding a chimeric polypeptide, comprising: a first nucleotide sequence encoding a light-induced oligomerization domain and a second nucleotide sequence encoding a TDP-43 polypeptide. In some embodiments, the TDP-43 polypeptide comprises a full-length TDP-43 polypeptide.

Also disclosed herein is a composition to model FUS protein aggregation comprising a nucleotide sequence encoding a chimeric polypeptide, comprising: a first nucleotide sequence encoding a light-induced oligomerization domain and a second nucleotide sequence encoding a FUS polypeptide. The FUS polypeptide can be full-length FUS polypeptide, or can comprise the FUS Low Complexity Domain (LCD), the FUS RNA-Recognition Motif (RRM), or both. In some embodiments, the light-induced oligomerization domain is selected from the group consisting of CRYPHR, CRY2OLIG, NcVVD, NcVVDY50W, NcLOV, and VfAU1LOV. In some embodiments, the first and second nucleotide sequences are comprised within an expression vector. Also disclosed is a cell comprising a nucleotide sequence encoding a chimeric polypeptide, comprising: a first nucleotide sequence encoding a light-induced oligomerization domain and a second nucleotide sequence encoding a FUS polypeptide.

In some embodiments, the FUS polypeptide is comprised within a full-length FUS polypeptide. In some embodiments, the FUS polypeptide is comprised within a sequence which is at least 70% identical to SEQ ID NO:5. In some embodiments, the FUS polypeptide is comprised within a sequence which is at least 75%, at least 80%, at least 85%, at least 90%, at least 95%, at least 98%, or at least 99% identical to SEQ ID NO:5. In some embodiments, the polynucleotide is a polypeptide comprising SEQ ID NO:5.

Methods of Treatment

Also disclosed herein are methods to treat and/or prevent a neurodegenerative disease comprising administering to a subject with a neurodegenerative disease a therapeutically effective amount of a polynucleotide that binds a nucleic acid-binding polypeptide, wherein the nucleic acid-binding polypeptide can aggregate in cells and is associated with a neurodegenerative disease. The nucleic acid-binding polypeptide can be any herein disclosed nucleic acid-binding polypeptide. The polynucleotide can be any herein disclosed polynucleotide, but can also include, in some embodiments, a naturally occurring polynucleotide, or a polynucleotide derived from a natural source (e.g., cleaved from a naturally occurring polynucleotide).

The methods are useful for treating and/or preventing a variety of neurodegenerative diseases. For instance, a subject may suffer from, be diagnosed with, or be suspected of having any one or more neurodegenerative diseases including, but not limited to, Limbic-predominant Age-related TDP-43 Encephalopathy (LATE), Alzheimer's disease (AD), dementia, Parkinson's disease (PD), Prion disease, Motor neurone diseases (MND), Huntington's disease (HD), Spinocerebellar ataxia (SCA), Spinal muscular atrophy (SMA), Multisystem Proteinopathy, Amyotrophic Lateral Sclerosis (ALS), Frontotemporal Dementia, Chronic Traumatic Encephalopathy, Traumatic Brain Injury, Cortical Basal Degeneration, Friedreich's ataxia, Lewy body disease, Alper's Disease, Batten Disease, Cerebro-Oculo-Facio-Skeletal Syndrome, Corticobasal Degeneration, Gerstmann-Straussler-Scheinker Disease, Kuru, Leigh's Disease, Monomelic Amyotrophy, Shy-Drager Syndrome, Opsoclonus Myoclonus, Progressive Multifocal Leukoencephalopathy, Striatonigral Degeneration, Spongiform Encephalopathy, Creutzfeldt-Jakob Disease, Primary Progressive Aphasia, and Progressive Supranuclear Palsy. In some embodiments, the neurodegenerative disease can comprise Multisystem Proteinopathy, Amyotrophic Lateral Sclerosis, Frontotemporal Dementia, Alzheimer's Disease, Chronic Traumatic Encephalopathy, Traumatic Brain Injury, Cortical Basal Degeneration, and Huntington's Disease. A patient may suffer from any one or more neurodegenerative diseases. In some embodiments, the neurodegenerative disease can comprise Limbic-predominant Age-related TDP-43 Encephalopathy (LATE), Alzheimer's disease (AD), Amyotrophic Lateral Sclerosis or Frontotemporal Dementia. In some embodiments, the neurodegenerative disease can comprise Amyotrophic Lateral Sclerosis or Frontotemporal Dementia.

The methods can improve a range of physical, mental, and emotional attributes of the treated subject. The subject can show an improvement in one or more symptoms of a neurodegenerative disease. Such improvements include, but are not limited to, improved physical abilities such as fine motor skills (e.g., writing and typing, grasping small objects, cutting, pointing, etc.), or gross motor skills (e.g., walking, balance, jumping, standing up, throwing); improved sensations such as decreased tingling and/or increased sensitivity in extremities, reduced sensation of muscle weakness or rigidity, and reduced tremors or pain; improved cognitive abilities such as increased alertness, reduced memory loss/ improved memory recall, increased cognitive comprehension, improved speech and sleep, improved puzzle-solving abilities, increased focus; and improved behavioral performance such as decreased apathy, depression, agitation, or anxiety, and improved mood and general contentment.

In some embodiments, the methods treats or prevents a neurodegenerative disease by reducing the rate of aggregation of the nucleic acid-binding polypeptide in the subject (e.g., reducing the rate of formation of protein inclusions). In some embodiments, the methods treats a neurodegenerative disease by reducing the amount of aggregate of the nucleic acid-binding polypeptide in the subject (e.g., reducing the amount of protein inclusions). In some embodiments, the method prevents aggregation of the nucleic acid-binding polypeptide in the subject. Thus, the methods can reduce and/or prevent formation of pathological inclusions in cells of a subject. For instance, the methods can treat and/or prevent pathological phase separation and aggregation of one or more nucleic acid-binding polypeptides.

In some or further embodiments, the methods can disaggregate existing protein aggregates. Thus, the methods can reduce the amount of existing protein aggregates prior to beginning the methods. This can be important for patients experiencing neurodegenerative disease symptoms, as such patients are likely to have existing protein aggregates. Disaggregation of existing aggregates can be, but need not necessarily be, in addition to prevention or reduction of further aggregate formation.

The methods can generate neuroprotective results when performed in a subject. As used herein, the term "neuroprotective" refers to maintaining or improving existing neurological function in the target neurological organ or tissue (e.g., nerve, spinal cord), or can refer to maintaining or improving the rate or overall amount of neuronal cell death in target neuronal cells. For example, "neuroprotective" can refer to slowing the rate of nerve tissue destruction, deterioration, or malfunction, slowing the rate of neuronal cell death, reducing the rate at which nerve conduction speed slows, etc. In some embodiments, the methods can generate at least 5%, at least 10%, at least 20%, or at least 25% or more neuroprotective improvement, as compared to a control.

The subject can be any mammalian subject, for example a human, dog, cow, horse, mouse, rabbit, etc. In some embodiments, the subject is a primate, particularly a human. The subject can be a male or female of any age, race, creed, ethnicity, socio-economic status, or other general classifiers. The subject can be diagnosed as having, or suspected of having, one or more neurodegenerative diseases. In some embodiments, the subject comprises neuronal cells having a reduced concentration of free polynucleotides. Binding of the polynucleotide to the nucleic acid-binding polypeptide can treat and/or prevent neurodegenerative proteinopathies, and can further prevent cell death.

The administering step can include at least one, at least two, at least three, at least four, at least five, at least six, at least seven, at least eight, at least nine, or at least ten dosages. The administering step can be performed before the subject exhibits disease symptoms (e.g., prophylactically), or during or after disease symptoms occur. The administering step can be performed prior to, concurrent with, or subsequent to administration of other agents to the subject. In some embodiments, the administering step is performed prior to, concurrent with, or subsequent to the administration of one or more additional diagnostic or therapeutic agents. In some embodiments, the methods comprise administering one or more additional polynucleotides. In some embodiments, at least two, at least three, at least four, or at least five different polynucleotides are administered.

In some embodiments, a subsequent administration is provided at least one day after a prior administration, or at least two days, at least three days, at least four days, at least five days, or at least six days after a prior administration. In some embodiments, a subsequent administration is provided at least one week after a prior administration, or at least two weeks, at least three weeks, or at least four weeks after a prior administration. In some embodiments, a subsequent administration is provided at least one month, at least two months, at least three months, at least six months, or at least twelve months after a prior administration.

The amount of the disclosed compositions administered to a subject will vary from subject to subject, depending on the nature of the disclosed compositions and/or formulations, the species, gender, age, weight and general condition of the subject, the mode of administration, and the like. Effective dosages and schedules for administering the compositions may be determined empirically, and making such determinations is within the skill in the art. The dosage ranges for the administration of the disclosed compositions are those large enough to produce the desired effect (e.g., to reduce protein inclusions or to improve a symptom of a neurodegenerative disease). The dosage should not be so large as to outweigh benefits by causing extensive or severe adverse side effects, such as unwanted cross-reactions, anaphylactic reactions, and the like, although some adverse side effects may be expected. The dosage can be adjusted by the individual clinician in the event of any counterindications. Generally, the disclosed compositions and/or formulations are administered to the subject at a dosage of active component(s) ranging from 0.1 µg/kg body weight to 100 g/kg body weight. In some embodiments, the disclosed compositions and/or formulations are administered to the subject at a dosage of active component(s) ranging from 1 µg/kg to 10 g/kg, from 10 µg/kg to 1 g/kg, from 10 µg/kg to 500 mg/kg, from 10 µg/kg to 100 mg/kg, from 10 µg/kg to 10 mg/kg, from 10 µg/kg to 1 mg/kg, from 10 µg/kg to 500 µg/kg, or from 10 µg/kg to 100 µg/kg body weight. Dosages above or below the range cited above may be administered to the individual subject if desired. The compositions can be administered in any herein disclosed pharmaceutical composition comprising a pharmaceutically acceptable excipient.

In some embodiments, the subject comprises neuronal cells having a ratio of nucleic acid-binding polypeptide to free nucleic acids of at least 1:1, on a weight percent basis. In some embodiments, the subject comprises neuronal cells having a ratio of nucleic acid-binding polypeptide to free nucleic acids of from 1:1 to 100,000:1 or more, on a weight percent basis. In some embodiments, the subject comprises neuronal cells having a ratio of nucleic acid-binding polypeptide to free nucleic acids of at least 2:1, at least 3:1, at least 4:1, at least 5:1, at least 10:1, at least 50:1, at least 100:1, at least 500:1, at least 1,000:1, at least 10,000:1, or at least 100,000:1 on a weight percent basis.

Methods of Inhibiting Aggregation

Also disclosed herein are methods to inhibit protein aggregation in a cell comprising contacting the cell with a composition comprising a polynucleotide that binds a nucleic acid-binding polypeptide, wherein the nucleic acid-binding polypeptide can aggregate in cells and is associated with a neurodegenerative disease. The nucleic acid-binding polypeptide can be any herein disclosed nucleic acid-binding polypeptide. The polynucleotide can be any herein disclosed polynucleotide, but can also include, in some embodiments, a naturally occurring polynucleotide, or a polynucleotide derived from a natural source (e.g., cleaved from a naturally occurring polynucleotide).

The cell can be any cell in which the nucleic acid-binding polypeptide can aggregate. In some embodiments, the cell is a cell of the nervous system (e.g., a glial cell or a neuronal cell). In some embodiments, the cell is a neuronal cell, optionally a human neuronal cell. In some embodiments, the cell is a muscular, connective, or epithelial cell. In some embodiments, the cell is a laboratory cell line (e.g., human embryonic kidney cells such as HEK293, HeLa cells, and osteosarcoma cells such as U2OS cells). The cell can be comprised within an isolated cell culture, or within a subject.

In some embodiments, the method reduces the rate of aggregation of the nucleic acid-binding polypeptide in the cell compared to an untreated control. In some embodiments, the method prevents aggregation of the nucleic acid-binding polypeptide in the cell compared to an untreated control.

The determined rates of aggregation can be compared to a control. In some embodiments, the rate of aggregation in the cell is at least 5% reduced compared to a control. In some embodiments, the rate or amount of aggregation in the cell is reduced by at least at least 10%, at least 25%, at least 30%, at least 40%, at least 50%, at least 60%, at least 70%, at least 80%, at least 90%, at least 95%, at least 98%, or at least 99% reduced compared to a control.

The control can comprise a biological sample, or alternatively, a collection of values used as a standard applied to one or more subjects (e.g., a general number or average that is known and not identified in the method using a sample). In some embodiments, the control can comprise an untreated biological sample of a subject having or suspected of having a neurodegenerative disease (e.g., a baseline sample). In some embodiments, the control can comprise untreated neuronal cells (e.g., from a subject having or suspected of having a neurodegenerative disease). In some embodiments, the control can be a treatment comprising a polynucleotide known not to bind to the nucleic acid-binding polypeptide (a non-targeting polynucleotide). For example, SEQ ID NO:120 is a non-targeting polynucleotide for TDP-43 because it is known not to bind to TDP-43. In some embodiments, the control can comprise a scrambled polynucleotide sequence.

In some embodiments, the cell comprises a ratio of nucleic acid-binding polypeptide (e.g., TDP-43, FUS, Tau) to free nucleic acids of at least 1:1, on a weight percent basis. In some embodiments, the cell comprises a ratio of nucleic acid-binding polypeptide to free nucleic acids of from 1:1 to 100,000:1 or more, on a weight percent basis. In some embodiments, the cell comprises a ratio of nucleic acid-binding polypeptide to free nucleic acids of at least 2:1, at least 3:1, at least 4:1, at least 5:1, at least 10:1, at least 50:1, at least 100:1, at least 500:1, at least 1,000:1, at least 10,000:1, or at least 100,000:1 on a weight percent basis.

In some embodiments, the methods comprise further administering a nuclease inhibitor, such as a RNase inhibitor, a DNase inhibitor, or combinations thereof. The nuclease inhibitor can be administered with the polynucleotide that binds a nucleic acid-binding polypeptide, wherein the nucleic acid-binding polypeptide can aggregate in cells and is associated with a neurodegenerative disease.

Methods of Disaggregating Protein Aggregates

Also disclosed herein are methods to disaggregate protein aggregates in a cell comprising contacting the cell with a composition comprising a polynucleotide that binds a nucleic acid-binding polypeptide, wherein the nucleic acid-binding polypeptide has formed one or more aggregates in cells and is associated with a neurodegenerative disease. The nucleic acid-binding polypeptide can be any herein disclosed nucleic acid-binding polypeptide. The polynucleotide can be any herein disclosed polynucleotide, but can also include, in some embodiments, a naturally occurring polynucleotide, or a polynucleotide derived from a natural source (e.g., cleaved from a naturally occurring polynucleotide).

The cell can be any cell in which the nucleic acid-binding polypeptide has formed one or more aggregates (e.g., fibrils, inclusions) within the cell. In some embodiments, the cell is a cell of the nervous system (e.g., a glial cell or a neuronal cell). In some embodiments, the cell is a neuronal cell, optionally a human neuronal cell. In some embodiments, the cell is a muscular, connective, or epithelial cell. In some embodiments, the cell is a laboratory cell line (e.g., human embryonic kidney cells such as HEK293, HeLa cells, and osteosarcoma cells such as U2OS cells). The cell can be comprised within an isolated cell culture, or within a subject.

The method reduces the amount of pre-existing aggregates of the nucleic acid-binding polypeptide in the cell compared to an untreated control. In some further embodiments, the method also reduces the rate of further aggregation of the nucleic acid-binding polypeptide in the cell.

The determined amounts of protein aggregate can be compared to a control. In some embodiments, the amount of protein aggregate in the cell is at least 5% reduced compared to a control. In some embodiments, the amount of protein aggregate in the cell is reduced by at least 10%, at least 25%, at least 30%, at least 40%, at least 50%, at least 60%, at least 70%, at least 80%, at least 90%, at least 95%, at least 98%, or at least 99% reduced compared to a control.

The control can comprise a biological sample, or alternatively, a collection of values used as a standard applied to one or more subjects (e.g., a general number or average that is known and not identified in the method using a sample). In some embodiments, the control can comprise an untreated biological sample of a subject having or suspected of having a neurodegenerative disease (e.g., a baseline sample). In some embodiments, the control can comprise untreated neuronal cells (e.g., from a subject having or suspected of having a neurodegenerative disease). In some embodiments, the control can be a treatment comprising a polynucleotide known not to bind to the nucleic acid-binding polypeptide (a non-targeting polynucleotide). In some embodiments, the control can comprise a scrambled polynucleotide sequence.

In some embodiments, the cell comprises a ratio of nucleic acid-binding polypeptide (e.g., TDP-43, FUS, Tau) to free nucleic acids of at least 1:1, on a weight percent basis. In some embodiments, the cell comprises a ratio of nucleic acid-binding polypeptide to free nucleic acids of from 1:1 to 100,000:1 or more, on a weight percent basis. In some embodiments, the cell comprises a ratio of nucleic acid-binding polypeptide to free nucleic acids of at least 2:1, at least 3:1, at least 4:1, at least 5:1, at least 10:1, at least 50:1, at least 100:1, at least 500:1, at least 1,000:1, at least 10,000:1, or at least 100,000:1 on a weight percent basis.

In some embodiments, the methods comprise further administering a nuclease inhibitor, such as a RNase inhibitor, a DNase inhibitor, or combinations thereof. The nuclease inhibitor can be administered with the polynucleotide that binds a nucleic acid-binding polypeptide, wherein the nucleic acid-binding polypeptide has formed aggregates in cells and is associated with a neurodegenerative disease.

EXAMPLES

To further illustrate the principles of the present disclosure, the following examples are put forth so as to provide those of ordinary skill in the art with a complete disclosure and description of how the compositions, articles, and methods claimed herein are made and evaluated. They are intended to be purely exemplary of the invention and are not intended to limit the scope of what the inventors regard as their disclosure. These examples are not intended to exclude equivalents and variations of the present invention which are apparent to one skilled in the art. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions.

Example 1. RNA Binding Antagonizes Neurotoxic Phase Transitions of TDP-43

A novel optogenetic-based method to reliably induce TDP-43 proteinopathy with light was developed. The method was used to examine mechanisms that drive the formation of intracellular inclusions. The method demonstrated that light-induced phase separation (LIPS) seeds pathologically-relevant and neurotoxic TDP-43 inclusions. The pathobiology underlying this process was revealed and it was shown that aberrant homo-oligomerization of the TDP-43 LCD mediates intracellular phase separation interactions that can mature into pathological inclusions. Remarkably, the RNA-binding status of TDP-43 drives its homo-oligomerization and RNA treatment prevents TDP-43 aggregation. TDP-43 targeting to SGs, which contain high concentrations of RNA, requires RNA-binding and, in surprising contrast to existing theories, this recruitment prevents the formation of pathological TDP-43 inclusions.
Results
Optogenetic Modulation of TDP-43 Inclusions.

Figure 1A:
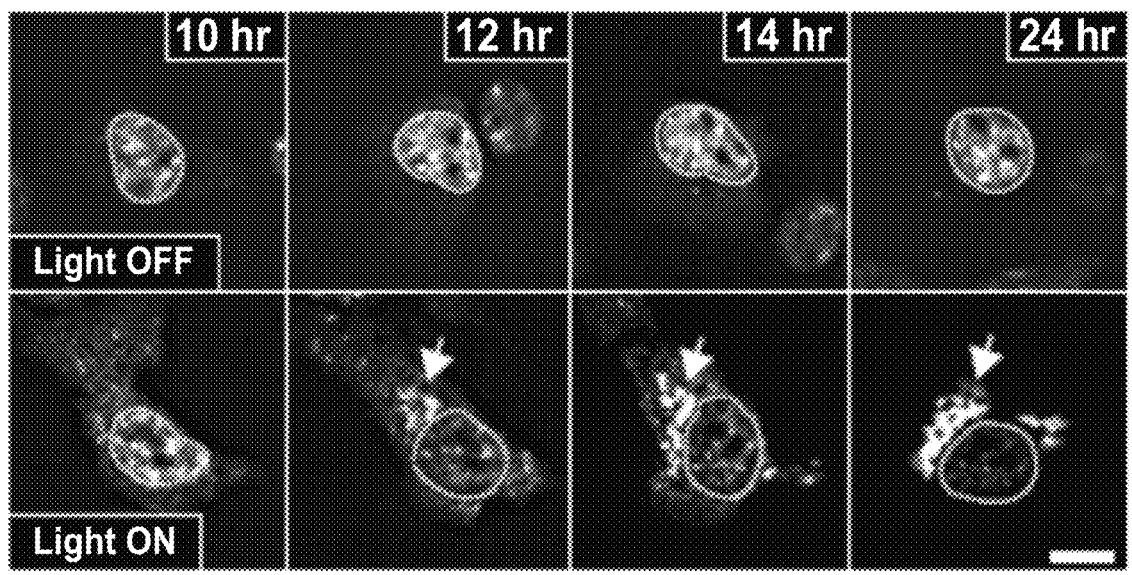
FIG. 1A shows images of HEK293 cells expressing optoTDP43 exposed to blue light stimulation (bottom row) (approximately 0.3 mW/cm$^2$, 465 nm) or darkness (top row). Images were obtained at the indicated time points (from left to right: 10 hrs, 12, hrs, 14 hrs, 24 hrs). Cell nuclei are circled. Arrows indicate optoTDP43 cytoplasmic inclusion formation with light treatment.
Figure 1B:
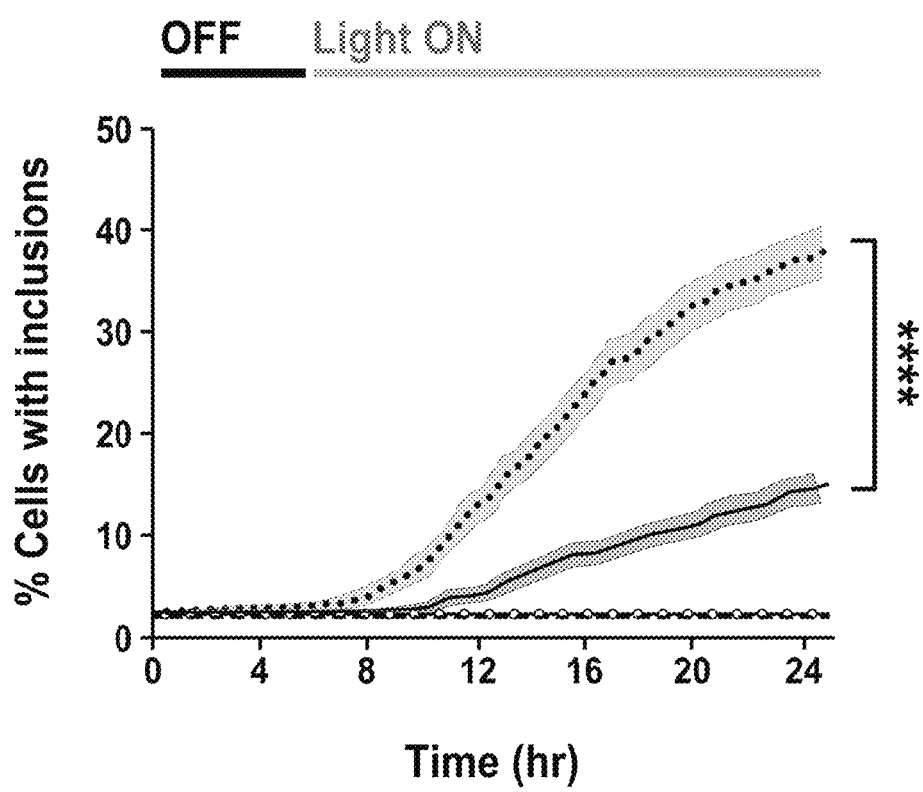
FIG. 1B is a graph showing percentage of cells exhibiting optoTDP43 inclusions over time using automated longitudinal live-imaging. Solid line: optoTDP43 without light; dotted line.

An optogenetic Cry2olig-TDP-43-mCherry expression construct (optoTDP43) was generated to selectively induce TDP-43 proteinopathy under the spatiotemporal control of light stimulation. Cry2olig is a variant of the Photolyase-Homologous Region (PHR) of the Cryptochrome 2 protein from *Arabidopsis thaliana* that undergoes reversible homo-oligomerization (in about 5 min) in response to blue light (Taslimi, et al., (2014), Nat. Commun. 5, 4925). N-terminal oligomerization is important in promoting higher-order assembly and LLPS of TDP-43 (Afroz, et al. (2017), Nat. Commun. 8, 45; Chang, et al., (2012), Biochem. Biophys. Res. Commun. 425, 219-224; Mompean, et al., (2017), J. Biol. Chem. 292, 11992-12006; Wang, et al., (2018), EMBO J. 37). Thus, the Cry2olig domain was positioned on the N-terminus of the full-length TDP-43 protein. It was first tested whether Cry2olig-mediated increases in focal concentrations of optoTDP43 protein leads to intracellular TDP-43 proteinopathy upon light exposure. To monitor this event, automated epifluorescence imaging was performed on live HEK293 cells expressing the mCherry-tagged optoTDP43 protein. Cells were intermittently imaged during a persistent blue light treatment using a 96-well LED array positioned within a stage-top incubator. optoTDP43-expressing cells exposed to blue light showed a progressive depletion of nuclear optoTDP43 signal and developed significantly more cytoplasmic inclusions relative to optoTDP43-expressing cells kept in the dark over a 24 hr live-imaging session (FIG. 1A and FIG. 1B). TDP-43 was not mislocalized in cells expressing Cry2olig-mCh alone with or without light exposure, as assessed by immunofluorescence and subcellular fractionation/western blotting. TDP-43 inclusions were absent from TDP-43-mCh-expressing cells with or without light exposure during the imaging period indicating that optoTDP43 inclusion formation is selectively driven by light-induced oligomerization of TDP-43 and not TDP-43 overexpression (FIG. 1B). Consistent with this observation, size-exclusion chromatography confirmed that light treatment induced the formation of higher-order optoTDP43 protein oligomers. Together, these data show that light treatment initiates intracellular oligomerization of the optoTDP43 protein independent of overexpression-induced aggregation.

It was next evaluated whether the features of optoTDP43 inclusions recapitulate the biochemical and neuropathological hallmarks of TDP-43 proteinopathy seen in patient tissue, including detergent-insolubility, N-terminal cleavage, C-terminal hyperphosphorylation, p62 co-localization, and the formation of ubiquitin-enriched inclusions (Al-Sarraj, et al., (2011), Acta Neuropathol. 122, 691-702; Scotter, et al., (2015), Neurotherapeutics 12, 352-363). Fluorescence recovery after photo-bleaching (FRAP) analysis of light-induced optoTDP43 inclusions was performed to first assess the material state of light-induced optoTDP43 inclusions. While the Cry2-mCh signal recovered immediately, the optoTDP43 inclusions exhibited minimal signal recovery following photobleaching, showing the formation of immobile intracellular protein assemblies. In addition, detergent-solubility fractionation and immunoblotting for TDP-43 and mCherry proteins showed that light induced a dramatic shift in optoTDP43 to the insoluble fraction and promoted N-terminal cleavage, mimicking the biochemical profile observed in ALS/FTLD patient tissue. TDP-43-mCh-expressing cells did not display a similar shift in solubility or cleavage in the presence or absence of light when examined at the same timepoint. Endogenous TDP-43 was also detected in the insoluble fraction and exhibited enhanced N-terminal cleavage in optoTDP43-expressing cells exposed to light. Size-exclusion chromatography similarly revealed a shift of endogenous TDP-43 species to heavier fractions relative to cells in the dark. These combined data show that optoTDP43 sequesters non-optogenetic TDP-43 proteins into light-induced insoluble fraction. This phenomenon is likely due to TDP-43-specific interactions, as Cry2olig-mCh expression did not affect endogenous TDP-43 solubility or cleavage regardless of light exposure.

The ability of optoTDP43 to directly recruit other non-optogenetic TDP-43 species into light-induced inclusions was next confirmed by co-expressing an EGFP-tagged TDP-43 construct along with optoTDP43 or Cry2-mCh alone. It was found that EGFP-TDP-43 co-localized with the light activated optoTDP43 inclusions, while no such co-localization was observed with Cry2-mCh. Furthermore, optoTDP43 inclusions are p62-positive (82.9%), hyperphosphorylated in the C-terminal domain (85.7%), and colocalized with ubiquitin, as seen in patient tissue. Together, these data show that light-activated optoTDP43 inclusions exhibited the biochemical and pathological hallmarks of TDP-43 proteinopathy and could seed endogenous TDP-43 aggregation.

Aberrant LCD Phase Transitions Drives the Formation of TDP-43 Inclusions.

Studies indicate that low complexity domains (LCDs) mediate the homo- and hetero-oligomerization of LCD-containing proteins through liquid-liquid phase separation (LLPS) (Elbaum-Garfinkle, et al., (2015), Proc. Natl. Acad. Sci. USA 112, 7189-7194; Molliex, et al., (2015), Cell 163, 123-133; Nott, et al., (2015), Mol. Cell 57, 936-947) and aberrant interactions between these low-complexity regions are hypothesized to promote the maturation/fibrillization of phase-separated droplets (Harrison, et al., (2017), Biochem. J. 474, 1417-1438). To determine whether the TDP-43 LCD mediates the formation of optoTDP43 inclusions, the opto-Droplet approach (Shin, et al., (2017), Cell 168, 159-171.e14) was employed to study intracellular TDP-43 LCD phase separation behavior using the WT Cry2 PHR domain (Cry2 PHR). This photoreceptor has a higher saturation concentration as compared to the lower-threshold, and more potent, Cry2olig photoreceptor used to produce optoTDP43 inclusions, and facilitates detection of subtle changes in droplet properties. An optogenetic construct was generated containing the Cry2 PHR photoreceptor fused to the TDP-43 LCD (optoLCD). optoLCD proteins readily underwent reversible light-induced phase separation (LIPS) in response to brief pulses of blue light in HEK293 cells. These findings are consistent with studies reporting that purified TDP-43 LCD protein undergoes LLPS in vitro (Conicella, et al., (2016), Structure 24, 1537-1549; Sun, et al., (2017), Biochemistry 56, 809-823). Light-induced clustering of the Cry2 PHR photoreceptor alone did not induce droplet formation, showing that the TDP-43 LCD drives LIPS. Light-activated optoLCD granules also displayed classical properties of phase-separated liquid-like protein droplets (Brangwynne, et al., (2009), Science 324, 1729-1732; Brangwynne, et al., (2015), Nat. Phys. 11, 899-904), undergoing fusion upon granule contact and exhibiting concentration- (wherein a plot of fluorescence vs. number of granules per cell had a concentration-dependent $r^2$ of 0.902) and light-dependent droplet formation. These data are consistent with light-activated optoDroplet formation of the LCDs of other RNA-binding proteins, including FUS, HNRNPA1 and DDX4 (Shin, et al., (2017), Cell 168, 159-171.e14).

To determine whether aberrant LCD interactions promote the formation of intracellular inclusions, the effects of repetitive and chronic LIPS on optoLCD droplet dynamics were examined in live cells. The examined proteins included wildtype TDP-43 LCD and optoLCD proteins containing three ALS-causing mutations (M337V, Q331K, A321V), which alter LLPS properties and promote aggregation of TDP-43 in diverse in vitro and cellular models (Gopal, et al., (2017), *Proc. Natl. Acad. Sci. USA* 114, E2466-E2475; Johnson, et al., (2009), J. Biol. Chem. 284, 20329-20339; Schmidt, et al., (2016), Cell Rep. 16, 1228-1236). Using a 10-minute cycling blue light stimulation protocol to induce repetitive LIPS of the LCD, gradual maturation of optoLCD granules was observed over successive cycles of droplet formation (FIG. 2). optoLCD droplets exhibited a progressive increase in the number of persistent, irreversible optoLCD granules with each successive cycle, an effect that was exacerbated by ALS-linked mutations (FIG. 2). Mutant optoLCD proteins displayed more rapid conversion to stable droplets upon successive LIPS, as determined by an increased number and size of persistent granules, compared to WT optoLCD droplets despite similar protein level as determined by Western blot analysis. A chronic blue light stimulation paradigm was then used to investigate whether the WT optoLCD droplets matured into pathologically-relevant inclusions with prolonged LCD oligomerization. Interestingly, a 4 hr chronic blue light stimulation resulted in hyperphosphorylated and p62-positive optoLCD inclusions that were immobile as evaluated by quantitative FRAP analysis. These results show that TDP-43 LCD undergoes intracellular phase separation upon self-oligomerization and that maturation of LCD droplets, either through repetitive/chronic phase transitions or ALS-linked mutations, drives LCD inclusion formation.

RNA-Binding Inhibits TDP-43 LCD Homo-Oligomerization.

While the TDP-43 LCD underwent intracellular LIPS with acute blue light treatment, the same light stimulation paradigm did not induce a phase transition of full-length optoTDP43, even when fused to the more potent homo-oligomerizing Cry2 photoreceptor domain (Cry2olig) (Taslimi, et al., (2014), Nat. Commun. 5, 4925). Given the ability of full-length purified TDP-43 to undergo rapid LLPS (McGurk, et al., (2018), Mol. Cell 71, 703-717.e9; Molliex, et al., (2015), Cell 163, 123-133; Wang, et al., (2018), EMBO J. 37), it was suspected there may be components within the intracellular environment which oppose TDP-43 LLPS in the model. In view of the presence of the prominent TDP-43 RNA-binding domains (or RNA-recognition motifs, RRMs), and along with reports of an increased aggregation propensity of C-terminal cleavage products lacking these domains (Zhang, et al., (2009), Proc. Natl. Acad. Sci. USA 106, 7607-7612), it was examined whether RNA-binding inhibits the ability of the full-length optoTDP43 protein to homo-oligomerize via its LCD.

Figure 3A:
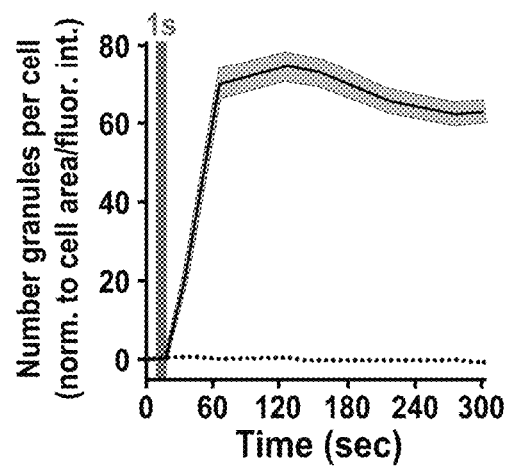
Figure 3B:
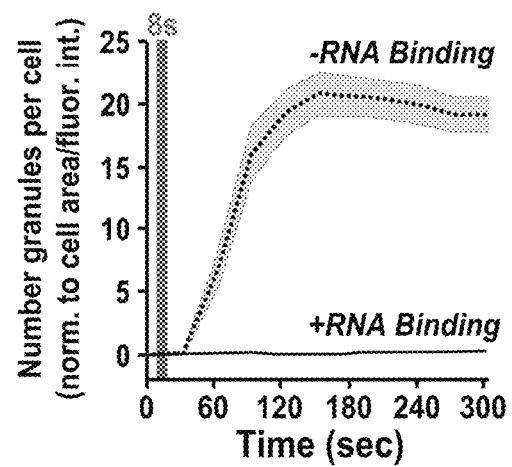
Figure 3C:
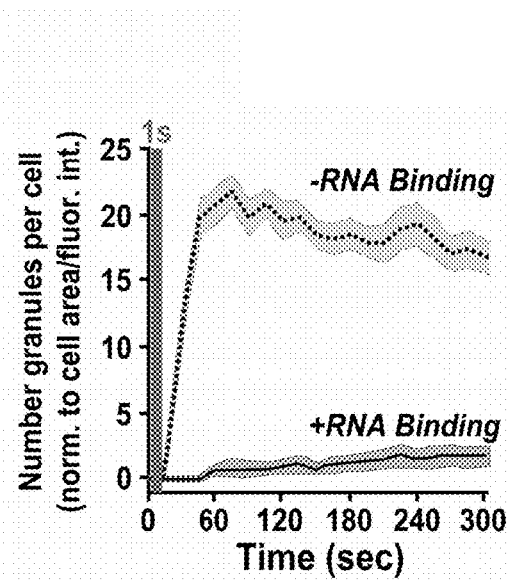

To test this notion, the Cry2olig photoreceptor domain was fused to the TDP-43 RRMs and the ability of the RRM domains to oligomerize in response to light was examined. The enhanced homo-oligomerization of the Cry2olig photoreceptor domain helped ensure that any observed inhibition of LIPS was likely a result of endogenous TDP-43 properties and not due to insufficient Cry2 activation. While the TDP-43 LCD fused to Cry2olig domain (Cry2olig-LCD) underwent LIPS in response to blue light and mimicked the droplet-like properties seen with optoLCD assemblies, light treatment did not stimulate TDP-43 RRM phase separation (FIG. 3A). Next, fusion proteins were generated containing both the TDP-43 RRMs and Cry2olig-LCD (RRMs+LCD WT) to test whether the RRM domains affect TDP-43 LCD LIPS. Strikingly, the RRMs completely inhibited LIPS of the LCD, even when the potent Cry2olig photoreceptor was employed (FIG. 3B). To test whether RNA binding to the RRMs inhibits TDP-43 LCD oligomerization, five point phenylalanine to leucine mutations were introduced within the RRM domains (5FL), which were previously shown to significantly impair, but not abolish, TDP-43 RNA-binding (RRMs+LCD 5FL) (Elden, et al., (2010), Nature 466, 1069-1075). Remarkably, robust induction of LIPS was observed following light stimulation (FIG. 3B). Since Cry2olig fusion proteins containing mutated RRMs alone (RRMs 5FL) did not show any light-induced droplet formation, recovery of LIPS in the RNA-binding deficient construct was mediated by the LCD. To ensure that RNA-binding activity, and not a conformational change in the construct, inhibited LIPS, it was assessed whether the TDP-43 LCD could drive phase separation of the FUS RNA-binding protein RRM (fusRRM WT+LCD). Like the TDP-43 RRMs, the FUS RRM fusion to the TDP-43 LCD failed to undergo LIPS (FIG. 3C). However, when similar phenylalanine to leucine point mutations that compromise the RNA-binding ability of the FUS RRM were introduced (Daigle, et al., (2013), Hum. Mol. Genet. 22, 1193-1205) (fusRRM 4FL+LCD), the FUS RRM+TDP-43 LCD fusion protein underwent rapid LIPS (FIG. 3C). These data show that RNA-binding dictates the ability of the TDP-43 LCD to homo-oligomerize and drive LIPS.

To determine whether RNA-binding also plays a role in the formation of pathological inclusions of full-length TDP- 43, RNA fluorescent in situ hybridization (FISH) was performed using an RNA dye to assess whether RNA resides within the light-induced optoTDP43 inclusions. Interestingly, RNA was absent in light-induced optoTDP43 inclusions. Supporting the notion that RNA-binding dictates the ability of the LCD to drive pathological oligomerization of TDP-43, longitudinal imaging also revealed that RNA-deficient optoTDP43 5FL formed inclusions at a significantly enhanced rate and frequency than the RNA-binding competent optoTDP43 in live cells.

Figure 3D:
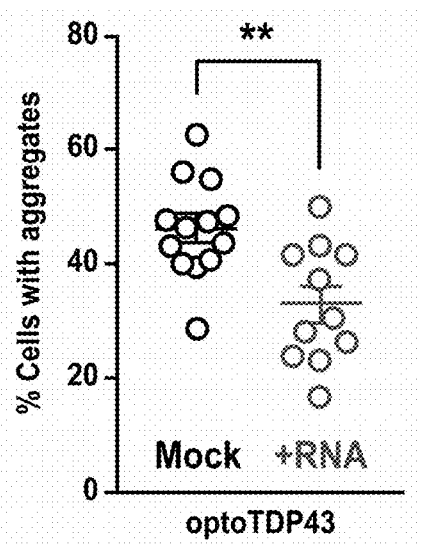

Since the obtained data showed that RNA-binding inhibits LCD-driven phase-transitions of TDP-43, it was tested whether addition of exogenous RNA substrates inhibit optoTDP43 inclusion formation. optoTDP43-expressing HEK293 cells were treated with blue light for 16 hr to induce inclusions and transfected cells with total HEK293 cell RNA 4 hr after illumination. Surprisingly, there was a measurable reduction (28%) of optoTDP43 inclusion formation in cells treated with purified RNA, as compared to mock-treated cells, following light stimulation (FIG. 3D). To determine whether mRNA colocalized with TDP-43 inclusions in patients, RNA FISH was performed using a poly-T probe in ALS/FTLD patient tissue and TDP-43/mRNA colocalization was examined. TDP-43 inclusions lacked mRNA signal in both sporadic ALS (sALS) spinal cord and FTLD hippocampus. Taken together, RNA-binding to the TDP-43 RRM domains inhibited LCD:LCD interactions, thus blocking aberrant TDP-43 phase transitions and the formation of pathological inclusions.

Next, purified WT TDP-43 and a TDP-43 protein with identical RRM point mutations (TDP-43 5FL, henceforth referred to as RNA-binding deficient TDP-43) were used to examine whether RNA-binding altered TDP-43 LLPS and aggregation in vitro. In the absence of RNA, C-terminal MBP-tagged TDP-43 WT and 5FL formed liquid-like droplets at physiological salt concentrations that did not form in the presence of 1,6 hexanediol, which disrupts weak contacts between LCDs that drive LLPS (Gopal, et al., (2017), Proc. Natl. Acad. Sci. USA 114, E2466-E2475; Patel, et al., (2007), Cell 129, 83-96). However, in the presence of increasing concentrations of total RNA, WT TDP-43 LLPS was inhibited in a dose-dependent manner (FIG. 4A). In contrast, the RNA-binding deficient TDP-43 5FL species was unaffected by exogenous RNA (FIG. 4A). Upon selective cleavage of the MBP tag with TEV protease, TDP-43 WT and 5FL formed solid-phase aggregates. While WT and RNA-binding-deficient TDP-43 displayed similar aggregation kinetics in the absence of RNA, the addition of RNA completely inhibited WT TDP-43 aggregation (FIG. 4B). The aggregation kinetics of TDP-43 5FL was initially delayed in the presence of RNA, likely due to residual RNA-binding (FIG. 4B). However, the final extent of aggregation was identical to TDP-43 in the absence of RNA upon further incubation (FIG. 4B). Moreover, the addition of RNase A (2.5 µg) 90 min after TEV cleavage reversed the initial inhibition of WT TDP-43 aggregation conferred by RNA addition (FIG. 4C).

If RNA-binding prevented aberrant phase separation and TDP-43 inclusion formation, then RNA-binding deficient protein expression should generate TDP-43 proteinopathy. Thus, non-optogenetic EGFP-tagged TDP-43 constructs containing wildtype or RNA-binding-reduced (5FL) RRM domains were expressed in HEK293 cells. Mere expression of the RNA-binding-deficient TDP-43 protein (EGFP-TDP43 5FL) generated large nuclear inclusions that were hyperphosphorylated and p62-positive. When the protein's NLS was mutated (EGFP-TDP43cyto 5FL), the RNA-binding-deficient protein localized to the cytoplasm and formed hyperphosphorylated and p62-positive inclusions that resembled the neuropathology observed in ALS/FTLD. This finding showed that cytoplasmic mislocalization is an upstream event preceding formation of RNA-deficient cytoplasmic inclusions. FRAP analysis revealed that RNA-deficient TDP-43 inclusions in both the nucleus and cytoplasm did not recover from photo-bleaching. Nuclear RNA-binding deficient TDP-43 inclusions also exhibited slightly enhanced fluorescence recovery after photo-bleaching compared to the cytoplasmic RNA-deficient TDP-43. This may be due to the abundance of accessible RNA species in the nucleus whereas RNAs destined for the cytoplasm are pre-assembled into heterogenous RNP complexes (Köhler, et al., (2007), Nat. Rev. Mol. Cell Biol. 8, 761-773). These findings show that RNA-binding dictates the propensity for TDP-43 to form pathologically-relevant inclusions.

Impaired SG Recruitment Promotes Aberrant TDP-43 Phase Transitions.

SG components are modifiers of toxicity and pathological aggregation associated with TDP-43-overexpression in yeast, fly, and mouse models (Becker, et al., (2017), Nature 544, 367-371; Elden, et al., (2010), Nature 466, 1069-1075; Kim, et al., (2014), Nat. Genet. 46, 152-160). SGs are composed of high concentrations of LCD-containing proteins and form through LLPS (Shin, et al., (2017), Science 357), and maturation of TDP-43-containing SGs may seed pathological inclusions (Harrison, et al., (2017), Biochem. J. 474, 1417-1438). Since RNA-binding dictates the ability of TDP-43 to undergo LLPS and inclusion formation, it was determined whether reducing the RNA-binding ability of TDP-43 would confer enhanced SG recruitment and subsequent maturation into insoluble inclusions. Because cytoplasmic mislocalization is required for TDP-43 recruitment to SGs (Bentmann, et al., (2012), J. Biol. Chem. 287, 23079-23094), SG formation was first induced in cells expressing cytoplasmic TDP-43 (EGFP-TDP43cyto) with functional (WT) or RNA-binding deficient (5FL) RRMs. Co-localization with known SG markers was examined. Notably, RNA-binding-deficient TDP-43 (TDP43cyto 5FL) was essentially completely excluded from endogenous SGs upon heat shock or sodium arsenite-induced cell stress, whereas about 70% of RNA-binding-competent TDP-43 was recruited to SGs under both stressors. However, during this analysis a subset (about 30%) of cytoplasmic WT TDP-43 granules was found which formed under stress conditions and did not co-localize with SG markers. Further investigation revealed that these TDP-43 granules (SG−granules) lacked mRNA and were enlarged by about 3-4 fold mean granule area. In contrast, cytoplasmic TDP-43 recruited to SGs (SG+) co-localized with mRNA signal. FRAP analysis of these two subsets of cytoplasmic TDP-43 granules in live cells similarly revealed that TDP-43 recruited to RNA-containing stress granules (SG+) remained dynamic, whereas the excluded TDP-43 species (SG−) were static. Furthermore, TDP-43 residing in SG− inclusions were hyperphosphorylated and p62-positive, thus exhibiting pathological hallmarks of TDP-43 proteinopathy. This result shows that TDP-43 recruitment to SGs required RNA binding and that localization to acutely-formed, RNA-rich SGs promoted TDP-43 solubility, whereas TDP-43 outside of these RNA-containing assemblies were insoluble.

In support, TDP-43 5FL inclusions did not co-localize with SG proteins in the nucleus or in the cytoplasm in HEK293 cells, likely due to RNA-binding deficiencies. Furthermore, although optoTDP43 proteins were recruited to SGs upon sodium arsenite treatment, optoTDP43 inclusions of all sizes were devoid of key stress granule components (Boeynaems, et al., (2016), Acta Neuropathol. 132, 159-173) after illumination. Neuropathological analysis of ALS/FTLD patient tissue similarly revealed an absence of co-localization between TDP-43 inclusions and G3BP1/ATXN2.

Figure 5A:
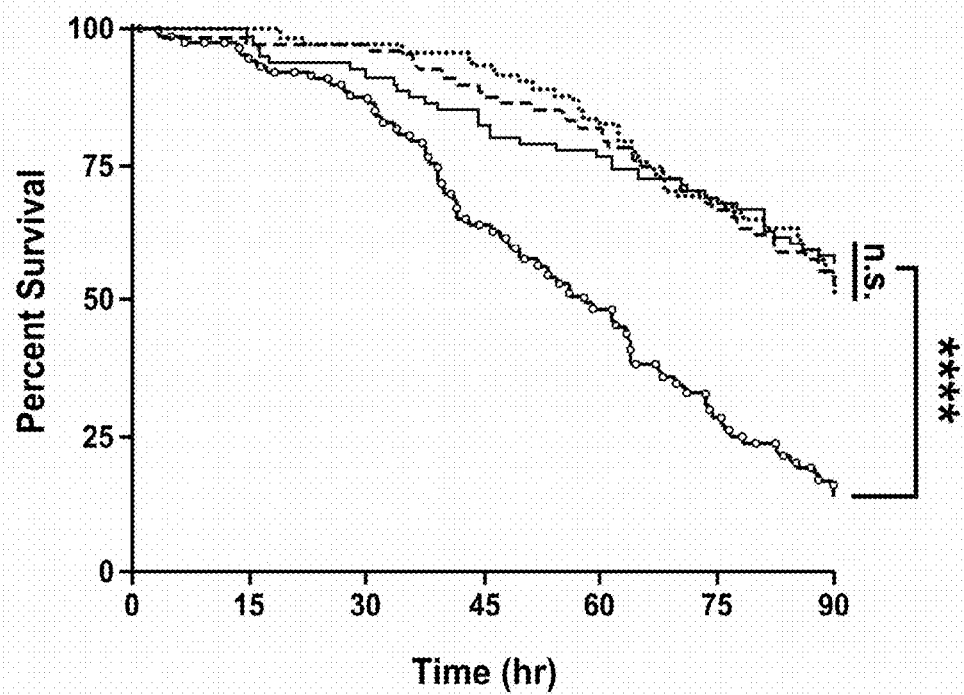
Figure 5B:
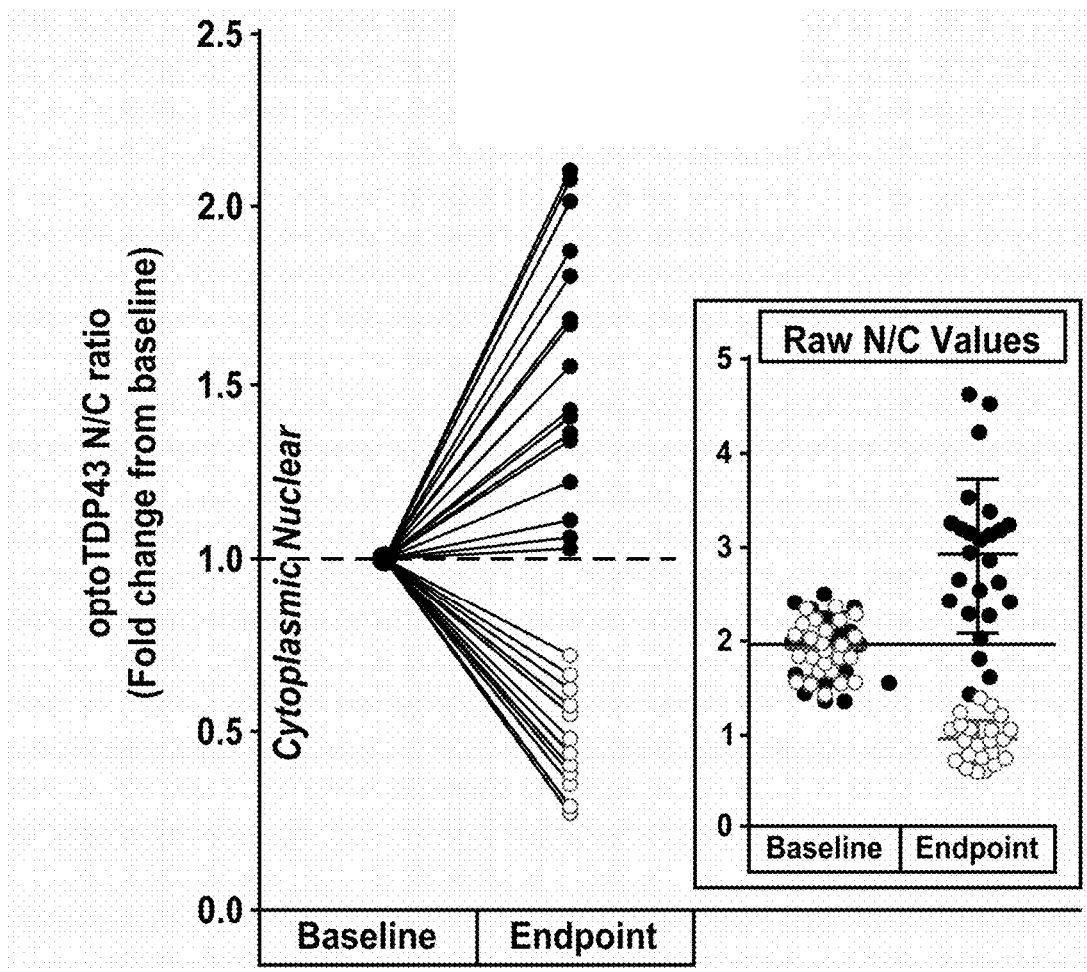
Figure 5C:
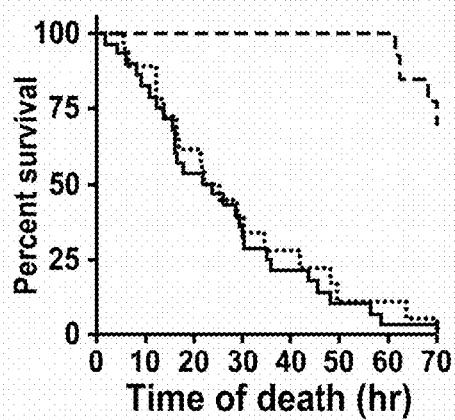
Figure 5D:
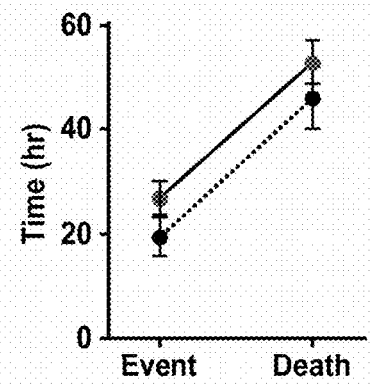

Bait Oligonucleotides Rescue Aberrant TDP-43 Phase Transitions and Neurotoxicity TDP-43 proteinopathy correlates with regions of neurodegeneration in ALS/FTD patients (Mackenzie, et al., (2013), Acta Neuropathol. 126, 859-879). To determine whether the formation of TDP-43 inclusions is toxic to human neurons, human ReNcell VM neural progenitor cells were differentiated into cortical-like neurons and obtained highly enriched neuronal cultures (Donato, et al., (2007), BMC Neurosci. 8, 36). A lentiviral expression system was used to selectively express optoTDP43 and a far-red fluorescent reporter (iRFP670) in human ReNcell cortical neuron cultures under the control of the human synapsin promoter (hSyn) prior to induction of optoTDP43 inclusion formation with chronic light stimulation. Longitudinal live-imaging at 30 min intervals revealed no significant neuronal loss in optoTDP43-expressing neurons kept in the dark (FIG. 5A). However, optoTDP43 neurons exposed to blue light exhibited progressive blebbing and loss of iRFP670 fluorescent signal in the soma after about 28 hr of light exposure (determined by Chi-Square analysis) (FIG. 5A). At the final 90 hr timepoint, a 4.3-fold increase in cell death in optoTDP43-expressing neurons exposed to light was observed in comparison to those maintained in darkness (FIG. 5A). No significant decrease in cell survival was recorded in neurons expressing the Cry2-mCh photoreceptor alone regardless of light treatment (FIG. 5A). Light stimulation alone also failed to induce alterations in neuron morphology or cell viability, indicating no phototoxicity due to the light exposure. Subsequent analyses revealed a striking cytoplasmic shift of optoTDP43 signal in dying cells about 1 hr before cell death (FIG. 5B) that was followed by formation of either large optoTDP43 inclusions or smaller, more circular assemblies (particles). No significant differences were observed in either the overall survival patterns (FIG. 5C) or the time-to-death following detection of either of these assembly types in individual neurons (Event-Death) (FIG. 5D). Importantly, neurons harboring either optoTDP43 assemblies exhibited reduced survival as compared to those with diffuse nuclear signal throughout the imaging period (FIG. 5C). Immunofluorescence analysis of neurons at the 48 hr timepoint confirmed the presence of hyperphosphorylated and p62-positive optoTDP43 inclusions in the cytoplasm of ReNcell neurons exposed to light. However, examination of the smaller and equally toxic optoTDP43 particles revealed no co-localization with these markers. These observations show that aberrant cytoplasmic phase transitions drive neurodegeneration and exert toxic downstream effects independent of 5409/5410 phosphorylation or p62-colocalization status.

To investigate whether the neurotoxicity associated with aberrant optoTDP43 phase transitions could be mitigated through enhanced RNA binding, a 2'OMe-modified RNA oligonucleotide was designed based on a well-characterized TDP-43 binding sequence (Clip_34nt; SEQ ID NO:13) previously shown to exhibit a high affinity for TDP-43 RRMs and a Kd of 112 nM (Ayala, et al., (2011), EMBO J. 30, 277-288; Bhardwaj, et al., (2013), 41, 5062-5074). The Clip_34nt was used to assess the ability of these bait oligonucleotides (bONs) to prevent light-induced optoTDP43 phase transitions in HEK293 cells. Cells expressing optoTDP43 were treated with either Clip_34nt or a scrambled oligonucleotide of equal length and nucleic acid composition prior to an 8 hr light stimulation. Similar to the effect produced by total HEK293 RNA, treatment with the bONs resulted in a dose-dependent reduction in cytoplasmic optoTDP43 assemblies (FIG. 6A), in contrast to the non-targeting scrambled control. To test whether preventing light-induced optoTDP43 phase transitions enhanced neuronal survival, automated longitudinal imaging of optoTDP43-expressing ReNcell cortical neurons was performed following a 4 hr pre-treatment with either Clip_34nt or the control oligonucleotide. optoTDP43 expression was induced for 96 hrs, then the neurons were co-incubated with RNAs for 4 hrs, after which time automated imaging in the presence of blue light occurred over the next 50 hrs. While no significant differences were observed in cumulative risk-of-death, a significant and dose-dependent reduction in neurotoxicity during light treatment following treatment with the bONs was observed (FIG. 6B). Decreased toxicity was associated with similar dose-dependent reductions in light-induced optoTDP43 phase transitions, both inclusions and particles (FIG. 6C), and nuclear-cytoplasmic redistribution of the optoTDP43 protein (FIG. 6D). Consistent with results presented above, these studies show that the neuroprotective effect of a TDP-43-binding oligonucleotide occurs through the prevention of aberrant and neurotoxic cytoplasmic TDP-43 phase transitions.

DISCUSSION

TDP-43 proteinopathy is a pathological hallmark in several neurodegenerative disorders. Modeling this pathology has proven challenging and no standard currently exists to reliably reproduce TDP-43 inclusions in live cells. To address this problem, a photokinetic system was developed to selectively induce TDP-43 proteinopathy that recapitulates pathological features observed in ALS/FTD and other neurodegenerative diseases. This system facilitated the study of intracellular mechanisms driving pathological phase separation. The intracellular phase transitions of TDP-43 are mediated by the LCD, and events which promote homo-oligomerization of the TDP-43 LCD seed neuropathological inclusions. Surprisingly, RNA-binding status dictates TDP-43 LCD-mediated oligomerization and RNA treatment reduces LLPS, aggregation of purified TDP-43, and light-induced optoTDP43 inclusion formation in live cells. Given recent evidence suggesting a role for SGs in seeding TDP-43 inclusions (Fernandes, et al., (2018), Adv. Neurobiol. 20, 173-212), it was hypothesized that the heightened ability of RNA-binding deficient TDP-43 to undergo LLPS and aggregation confers enhanced recruitment to phase-separated SGs. Surprisingly, RNA-binding deficient TDP-43 is excluded from acutely-induced SGs and instead found in inclusions devoid of SG components. In contrast, TDP-43 recruited to SGs remained dynamic within these RNA-rich, liquid-like compartments. Since RNA binding inhibits aberrant phase transition of TDP-43, it was tested whether a TDP-43-binding oligonucleotide sequence inhibited a pathogenic event. Remarkably, treatment with the oligonucleotide mitigated the cytoplasmic mislocalization and aberrant phase transition of optoTDP43 in response to light and rescued neurotoxicity.

Therefore, RNA-binding dictates the ability of optoTDP43 to form light-induced inclusions. LCD oligomerization of RNA-bound optoTDP-43 is blocked upon Cry2-mediated increases in local protein concentration while RNA-binding deficient optoTDP43 LCDs associate, thereby promoting inclusion formation. This phenomenon could arise from a conformational change associated with nucleic acid binding, as shown for other RNA-binding proteins (Williamson, J. R. (2000), Nat. Struct. Biol. 7, 834-837). Nucleic acid binding also maintains the TDP-43 dimer and promotes solubility, potentially through an allosteric prevention of LCD:LCD interactions (Afroz, et al. (2017), Nat. Commun. 8, 45; Sun, et al., (2014), Biochemistry 53, 5885-5894). It is also possible that RNA-binding impedes TDP-43 homo-oligomerization through competitive inhibition. While the LCD appears to be dispensable for RNA binding (Buratti, et al., (2001), J. Biol. Chem. 276, 36337-36343), it contains an RGG motif that can mediate RNA interactions (Conicella, et al., (2016), Structure 24, 1537-1549). Consistent with this, RNA depletion results in the in vitro oligomerization and aggregation of a C-terminal TDP-43 cleavage product lacking RRM1 and a portion of RRM2 (TDP-25) (Kitamura, et al., (2016), Sci. Rep. 6, 19230). Contacts within the TDP-43 RRMs themselves may also cooperate and play a distinct role in the TDP-43 aggregation process, as both RRM1 and RRM2 can form tetrameric assemblies in vitro (Kuo, et al., (2009), Nucleic Acids Res. 37, 1799-1808), and the RRM2 contains various segments capable of forming amyloid-like conformations (Guenther, et al., (2018), Nat. Struct. Mol. Biol. 25, 311-319). Overall, interactions between these domains and RNA may block regions that mediate aberrant TDP-43 phase transitions. Similarly, FUS protein LLPS is inhibited by the nuclear import receptor Karyopherin-β2 due to competitive interactions within domains that drive self-association (Guo, et al., (2018), Cell 173, 677-692.e20; Yoshizawa, et al., (2018), Cell 173, 693-705.e22).

This work shows that an altered TDP-43:RNA ratio creates an aggregation-prone environment for TDP-43 and serves as an upstream event in TDP-43 proteinopathy. This may occur due to disease causing mutations such as C9orf72 ALS/FTD that disrupt nuclear transport dynamics resulting in elevated cytoplasmic TDP-43 protein (Zhang, et al., (2015b), Nature 525, 56-61) and retention of RNA in the nucleus (Freibaum, et al., (2015), Nature 525, 129-133). Disease-causing mutations in the TDP-43 RRMs that abolish RNA binding have not yet been described. However, disease-associated mutations within the TDP-43 LCD likely promote aberrant phase transitions of RNA-deficient TDP-43 proteins. This RNA-dependent model explains the aggregation of TDP-43 observed in overexpression models, in which insoluble inclusions may result from concentration-dependent phase transitions of cytoplasmic TDP-43 due to a lack of RNA substrates, as well as the cytoplasmic localization of TDP-43 inclusions observed in patient tissue (Scotter, et al., (2015), Neurotherapeutics 12, 352-363). Furthermore, this phenomenon likely serves as the convergence point for a number of pathways proposed to contribute to ALS/FTD including altered TDP-43 expression, half-life and clearance; disrupted nucleocytoplasmic transport; and abnormal RNP assembly and trafficking (Boeynaems, et al., (2016), Acta Neuropathol. 132, 159-173; Gopal, et al., (2017), Proc. Natl. Acad. Sci. USA 114, E2466-E2475; Ling, et al., (2013), Neuron 79, 416-438).

SG-mediated seeding likely underlies the formation of TDP-43 inclusions. For example, the modulation of SG components alleviates TDP-43 inclusion formation and toxicity in overexpression models (Becker, et al., (2017), Nature 544, 367-371; Elden, et al., (2010), Nature 466, 1069-1075; Kim, et al., (2014), Nat. Genet. 46, 152-160). While previous studies show that both the TDP-43 RRMs and LCD are necessary for SG targeting (Colombrita, et al., (2009), J. Neurochem. 111, 1051-1061), it is shown herein that TDP-43 RNA binding facilitates SG localization. Furthermore, it was observed that cytoplasmic TDP-43 excluded from acute SGs forms pathological inclusions lacking mRNA, whereas TDP-43 recruited to SGs is dynamic and mobile. This is likely due to the abundance of RNA and other LCD-containing RBPs within SGs. These dynamic protein:protein, protein:RNA, and RNA:RNA interactions within SGs likely contribute to the liquid-like properties of these structures and may convey a diminished propensity to initiate pathological maturation/fibrillization as compared to a more homogenous, protein-rich granule. Therefore, these findings delineate between normal, physiological LLPS interactions, specifically in the formation of heterogeneously-composed membraneless organelles, and pathological homogeneous LLPS interactions prone to seed disease-associated protein inclusions.

It is unclear whether aberrant phase transitions or inclusions themselves are inherently neurotoxic and/or capable of driving neurodegeneration. ALS-linked mutations in TDP-43 that increase aggregation propensity result in enhanced toxicity in a variety of in vitro and in vivo models (Janssens, et al., (2013), Hum. Mol. Genet. 22, R77-87). In contrast, neurodegeneration has also been characterized prior to significant accumulation of detergent-insoluble TDP-43 species in other systems (Arnold, et al., (2013), Proc. Natl. Acad. Sci. USA 110, E736-45). TDP-43 sequestration within artificial inclusions recapitulates loss-of-function phenotypes (Prpar Mihevc, et al., (2016), Sci. Rep. 6, 33996) and TDP-43 knockout is embryonic lethal while conditional knockdown models produce ALS-like phenotypes in vivo (Xu, et al., (2014), Rare Dis. 2, e944443). This suggests that perturbations in TDP-43 function may also drive neurotoxicity. Data disclosed herein show that cytoplasmic mislocalization precedes light-induced TDP-43 particle or inclusion formation and neuronal death, while neuroprotective oligonucleotide treatment delays/prevents these events. Thus, it is possible that cytoplasmic sequestration in the form of aberrant TDP-43 assemblies may produce neurodegeneration through both gain- and loss-of-function mechanisms.

In sum, disclosed herein is an optogenetic-based method to induce controlled TDP-43 proteinopathy in live cells, and it is established that RNA regulates the formation of TDP-43 inclusions. These studies show that aberrant phase transitions are toxic to human cortical-like neuronal cells. Finally, these data show bONs or bait nucleic acid (bNA) strategies can inhibit aberrant phase transitions of TDP-43, providing a therapeutic approach to disrupt pathological DNA/RNA binding protein inclusions.

Supplemental Information

Chronic Blue Light Stimulation Alone does not Induce Mislocalization of Endogenous TDP-43.

HEK293 cells expressing Cry2olig-mCh were exposed to chronic blue light stimulation (16 h, ~0.3 mW/cm$^2$, 465 nm) and analyzed for mislocalization of endogenous TDP-43. Cells exposed to chronic blue light stimulation or darkness both showed no cytoplasmic mislocalization of endogenous TDP-43 by immunofluorescence. Cell nuclei were identified.

Cell lysates were collected following chronic blue light stimulation or darkness and separated into nuclear and cytoplasmic fractions. Western blot analysis of endogenous TDP-43 showed no cytoplasmic mislocalization of TDP-43 with or without blue light stimulation. Chronic blue light stimulation promotes the formation of high-molecularweight optoTDP43 oligomers and recruitment of non-optogenetic TDP-43 to inclusions.

Cell lysates from HEK293 cells expressing optoTDP43 were collected and analyzed by size exclusion chromatography. Samples were collected from cells either exposed to stimulation with blue light (16 h, ~0.3 mW/cm$^2$, 465 nm, bottom) or kept in darkness. The void volume of the column was determined with blue dextran (2000 kDa). Column fractions were subjected to SDS-PAGE and western blot analysis for TDP-43. The elution peak of column size standards (232 kDa and 60 kDa) were identified. optoTDP43 proteins exposed to blue light stimulation demonstrated a shift towards higher-molecular weight species, indicating light-induced oligomerization.

Lysates from optoTDP43-expressing cells exposed to chronic blue light treatment (16 h, ~0.3 mW/cm$^2$, 465 nm) or darkness were collected and separated into detergent-soluble and RIPA-insoluble, urea-soluble fractions. Western blot analysis of mCherry proteins showed an enhanced shift of full-length and n-terminal cleaved optoTDP43 products in the detergent-insoluble fraction.

ALS/FTLD patient tissue from the hippocampus and spinal cord was separated into detergent-soluble and RIPA-insoluble, urea-soluble fractions prior to western blot analysis of TDP-43.

Cell lysates collected from Cry2-mCh-expressing cells following chronic blue light stimulation or darkness were separated into detergent-soluble and RIPA-insoluble, urea-soluble fractions. Western blot analysis probing for endogenous TDP-43 showed no recruitment of TDP-43 to the insoluble fraction with or without chronic blue light stimulation. To confirm the ability of optoTDP43 to recruit non-optogenetic TDP-43 species into light-induced inclusions, HEK293 cells were co-transfected with either optoTDP43 or the photoreceptor-only control Cry2olig-mCh and EGFP-TDP43. optoTDP43-expressing cells exposed to chronic blue light stimulation (16 h, approximately 0.3 mW/cm$^2$, 465 nm) showed co-localization of light-induced inclusions with EGFP-TDP43. Light-induced Cry2olig-mCh clusters showed no co-localization with EGFP-TDP43 signal, indicating a TDP-43:TDP-43 interaction-dependence of recruitment to induced optoTDP43 inclusions. Cell nuclei were identified.

Cells expressing optoTDP43 were exposed to chronic blue light stimulation (16 h, ~0.3 mW/cm$^2$, 465 nm) or darkness and immunostained for ubiquitin. Light-induced optoTDP43 inclusions strongly co-localized with ubiquitin signal. Cell nuclei were identified.

optoLCD Granules Display Properties of Phase-Separated Droplets and Full-Length optoTDP43 does not Form opto-Droplets.

Images of individual optoLCD granules showing fusion events following acute blue light stimulation (1 sec, 1% laser power, 488 nm) were obtained. optoLCD granules underwent fusion and subsequent relaxation upon granule:granule contact, showing a liquid-like state of light-induced LCD granules.

Images of optoLCD particle formation following acute blue light stimulation (1 sec, 1% laser power, 488 nm) in cells expressing increasing concentrations of optoLCD proteins (as determined by relative fluorescence intensity) were obtained. As more protein was expressed, more optoLCD particle formation was observed.

Cells expressing optoLCD were exposed to acute blue light stimulation of increasing laser intensity (1 sec, 1-10% as indicated, 488 nm) and normalized granule number per cell was tracked over time. optoLCD proteins displayed enhanced phase transition responses following acute blue light stimulation of increasing light input, showing a tunable property of light-induced LCD phase transitions as a function of activated photoreceptor molecules.

Western blot analysis of WT and mutant optoLCD protein expression levels showed roughly comparable levels of expression for each protein.

Full-length optoTDP43 was expressed in HEK293 cells exposed to acute blue light stimulation (1 sec, 10% laser power, 488 nm) to determine whether full-length TDP-43 could undergo LIPS. No optoTDP43 granule formation was observed in response to acute blue light stimulation.

Cry2Olig-LCD Confers an Enhanced Phase Separation Response to Light.

HEK293 cells expressing either optoLCD or the Cry2olig modified photoreceptive domain fused to the TDP-43 LCD (Cry2olig-LCD) were subjected to acute blue light stimulation (1 sec, 1% laser power, 488 nm) and granule formation was tracked over time.

Quantification of normalized granules per cell over time showed an enhanced phase transition response to light when the TDP-43 LCD is fused to the Cry2olig domain versus the WT Cry2 PHR domain.

Images of individual Cry2olig-LCD granules undergoing fusion events following acute blue light stimulation (1 sec, 1% laser power, 488 nm) were obtained. As was observed with optoLCD droplets, Cry2olig-LCD granules underwent fusion and relaxation upon granule:granule contact.

A Pearson's correlation was executed to analyze the protein concentration-dependence of Cry2olig-LCD phase transitions in response to acute blue light stimulation (1 sec, 10% laser power, 488 nm). Baseline fluorescence intensity was plotted against maximum granule number per cell during the imaging period. The Cry2olig-LCD concentration-dependence correlation had an r$^2$ of 0.874.

Cry2olig-LCD-expressing cells were exposed to acute blue light stimulation of increasing laser intensity (1 sec, 1-10% as indicated, 488 nm) and normalized granule number per cell was quantified post-stimulation. Again, an enhanced phase separation response was observed following blue light stimulation of increasing intensity.

Cells expressing a protein containing the TDP-43 RRMs with RNA-binding mutations fused to the Cry2olig photoreceptor (RRMs 5FL) were exposed to acute blue light stimulation (1 sec, 10% laser power, 488 nm). No droplet formation was observed following light stimulation, showing the TDP-43 LCD facilitates LIPS behavior.

TDP-43 Inclusions in Patient Tissue and optoTDP43 System Show an Absence of RNA.

optoTDP43 was expressed in HEK293 cells that were exposed to chronic blue light stimulation (16 h, approximately 0.3 mW/cm$^2$, 465 nm) to induce optoTDP43 inclusion formation. Cells were fixed in ice-cold methanol and stained with SYTO RNAselect non-selective RNA dye to determine whether optoTDP43 inclusions contained any RNA species, in addition to mRNA. optoTDP43 inclusions did not co-stain with SYTO RNAselect dye, showing there were no RNA species contained within inclusions.

HEK293 cells expressing WT optoTDP43, RNA-binding-deficient optoTDP43 5FL, or non-optogenetic TDP43-mCh were chronically stimulated with blue light (approximately 0.3 mW/cm$^2$, 465 nm) and simultaneously imaged over time in an automated microscopy screen to assess whether RNA-binding affects full-length TDP-43 inclusion formation. Quantification of percentage of cells with inclusions over time showed a significantly increased rate of light-induced inclusion formation with reduced RNA-binding efficiency (optoTDP43 5FL).

Additional representative images of mRNA FISH analysis of ALS/FTLD patient tissue. Hippocampal and spinal cord sections from two FTLD cases (C9ORF72-FTLD and FTLD-TDP43) and one ALS case (sporadic ALS) were examined by immunohistochemistry and RNA FISH. In all cases, no co-localization was observed between mRNA and pTDP-43 signal.

RNA-Deficient TDP-43 Inclusions do not Co-Localize with Stress Granule Components.

HEK293 cells expressing EGFP-TDP43cyto were immunostained for hyperphosphorylated TDP-43 or p62 and G3BP1 following sodium arsenite treatment, and representative images were obtained.

Images of cells containing TDP-43 5FL and TDP-43cyto 5FL inclusions immunostained for stress granule proteins G3BP1 and eIF4G were obtained.

HEK293 cells expressing optoTDP43 were subjected to sodium arsenite treatment, chronic blue light stimulation (16 hr, approximately 0.3 mW/cm$^2$, 465 nm), or darkness and immunostained for known stress granule components G3BP1 and eIF4G or ATXN2 and TIAR, and representative images were obtained.

Cells treated with sodium arsenite showed that optoTDP43 could be recruited to stress granules through the activation of endogenous cellular stress pathways. However, optoTDP43 inclusions induced with blue light stimulation did not co-localize with any of the tested stress granule markers.

Representative images were obtained of neuropathological examination of TDP-43 inclusions and SG component proteins (G3BP1; ATXN2) in FTLD-TDP and ALS/FTLD hippocampal sections. Co-localization between SG components and TDP-43 inclusions was observed.

ReNcell VM Cortical Differentiation Yields a Highly Neuronally-Enriched Culture.

The ReNcell VM neuronal differentiation protocol schematic included a neurosphere preparation beginning on day −10. On day −4, neursphere dissociation occurred, and proliferation began on proliferation media (DMEM/F12+Glut, B27, Heparin (2 ng/mL), bFGF (20 µg/mL), and hEGF (20 µg/mL)). On day 0, neuronal differentiation occurred on Stage 1 Media (DMEM/F12+Glut, B27, GDNF (2 ng/mL), d,b,cAMP (1 mM)). On day 6, neuronal maintenance began on Stage II Media (DMEM/F12+Glut, B27, GDNF (2 ng/mL)).

Immunofluorescence images were obtained of ReNcell VM neurons (differentiation day 18) following the differentiation protocol described in the immediately preceding paragraph. MAP2 and βIII-tubulin were identified at 20× and 60× magnification.

The percentage of MAP2/β111-tubulin double-labeled cells was quantified and showed a highly enriched (about 75%) neuronal population following the differentiation protocol.

ReNcell neurons were exposed to chronic blue light stimulation (48 hr, approximately 0.3 mW/cm$^2$, 465 nm) or darkness prior to examination of neuronal morphology and cell viability, as assessed by measurements of ATP levels (CellTiter-Glo, Promega). No differences in morphology or cell viability were observed between neurons in blue light or darkness conditions. Treatment with 0.1% Triton X-100 served as a positive death control.

STAR Methods
Experimental Model and Subject Details
Cell Culture

HEK293 cells were maintained in DMEM (Thermo Fisher Scientific) supplemented with 10% HyClone Bovine Growth Serum (GE Healthcare Life Sciences) and 1× GlutaMAX (Thermo Fisher Scientific) at 37° C. and 5% $CO_2$. Cells were seeded onto coverslips or plates coated with collagen (50 µg/mL, Gibco) and allowed to incubate overnight prior to transfections (Lipofectamine 3000, Thermo Fisher Scientific) with 100 ng of DNA performed according to manufacturer's instructions. Cells were plated on collagen-coated glass bottom plates for live-cell imaging, high throughput screening, and FRAP analysis. All manipulations of cells expressing optogenetic constructs were performed under red lamp illumination to avoid ambient light exposure.
Neuronal Progenitor Maintenance and Differentiation ReNcell VM (Millipore) were maintained and differentiated according to previously described protocols but with minor modifications (Donato, et al., (2007), BMC Neurosci. 8, 36). In brief, cells were maintained in proliferation media (DMEM/F-12, 1× GlutaMAX™ supplemented with 1× B27 (Gibco), 2 ng/mL heparin (Sigma), 20 µg/mL bFGF (Millipore) and 20 µg/mL hEGF (Millipore). Differentiation was initiated by plating ReNcell VM onto low attachment plates in proliferation media in order to establish neurosphere production. Neurospheres were then mechanically dissociated and grown to full confluency. Cells were further differentiated in DMEM/F-12, supplemented with 1× GlutaMAX™, 1×B27, 2 ng/mL GDNF (PeproTech) and 1 mM diburtyrl-cAMP (Tocris) for one week and then maintained in DMEM/F-12 supplemented with 1× GlutaMAX™, 1×B27, and 2 ng/mL GDNF.
Lentiviral Production and Transduction Lentiviral transfer vectors encoding optoTDP43, Cry2-mCh or iRFP670 were co-transfected with packaging plasmids (OriGene) into HEK293T cells using the Turbofectin transfection reagent (OriGene) according to manufacturer's instructions. Following an initial media change, lentiviral supernatant was collected at 24 and 48 hr post-transfection prior to filtration and overnight incubation at 4° C. with 1× Lentivirus concentration solution (OriGene). The following day, concentrated lentiviral supernatant was centrifuged at 3,500×g for 25 min at 4° C. The resulting pellet was recentrifuged at 3,500×g for 5 min prior to re-suspension in ice-cold, sterile PBS. Pellets were then allowed to dissolve for 1-2 days at 4° C. Resuspended lentiviral particles were then aliquoted and titers were determined utilizing the One-Wash Lentivirus Titer Kit, HIV-1 p24 ELISA (OriGene). Neuron transductions were performed by diluting lentiviral particles at an MOI of 5 in neuronal differentiation media. Media changes were performed after 48 hr of incubation and all experiments were initiated at 96 hr post-transduction.
Stress Treatments Sodium arsenite (0.5 mM, 30 min) and heat shock (43° C., 45 min) treatment were used to induce stress granule formation where indicated.
Blue Light Treatments Blue light stimulation was performed in 24-well or 6-well plates using custom-built LED arrays designed to fit plate dimensions and withstand common temperature/humidity requirements of cell culture incubators. Individual LED diodes were positioned ~3.0 cm above the culture surface to provide a range of about 0.1-0.3 mW/cm$^2$ of 465 nm light stimulation to the cultured cells.
RNA and Oligonucleotide Treatments Total HEK293 RNA was extracted utilizing the miRNeasy RNA isolation kit (Qiagen) according to manufacturer's instructions. RNA oligonucleotides with 2'OMe modifications were synthesized by GenScript. For experiments utilizing HEK293 cells, total RNA (2.5 µg) or RNA oligonucleotides (200 nM-1 µM as indicated) were transfected into cells using the Lipofectamine RNAiMAX reagent (Thermo Fisher) according to manufacturer's instructions. For ReNcell neuron experiments, oligonucleotides were diluted into normal differentiation medium at the indicated concentrations prior to direct addition to cells.

Bacterial Growth and Protein Expression

For purification of MBP-tagged TDP-43 WT and 5FL proteins, BL21 (DE3) *E. coli* cell cultures were grown at 37° C. to an OD600 of 0.6-0.9 as previously reported (Wang, et al., (2018), EMBO J. 37). Protein expression was induced by IPTG (1 mM) prior to overnight incubation at 16° C. Cells were then harvested by centrifugation.

Method Details

Cloning

All full-length and truncated optoTDP43 plasmids were constructed by inserting PCR-generated fragments at the SmaI restriction enzyme site by Gibson Assembly (HiFi DNA Assembly Master Mix, NEB) of Cry2olig-mCh and Cry2 PHR-mCh base vectors (Plasmids 60032 and 26866, Addgene). TDP43-mCh was generated by inserting full-length TDP-43 CDS (synthesized by Genecopoeia) between the NheI and SmaI restriction enzyme sites of the Cry2olig-mCh backbone. All wild-type optoTDP43 vectors were constructed using the same TDP-43 insert. optoTDP43 constructs containing the TDP43cyto, 5FL and/or M337V point mutations were generated from mutant TDP43 plasmids (Plasmids 84912, 84914, 98674, Addgene). Constructs containing the fusRRM (WT or 4FL) were generated by three-fragment Gibson Assembly, inserting the fusRRM fragment and TDP-43 LCD simultaneously into the Cry2olig-mCh backbone at the SmaI restriction site. The plasmid encoding TDP as a C-terminal MBP-tagged protein (TDP43-MBP-His6) was purchased from Addgene (Plasmid 104480) and the 5FL mutant was generated via QuikChange Multi Site-directed Mutatagenesis (Agilent). EGFP-TDP43 constructs were generated by inserting the wild-type or mutant TDP-43 fragments between the HindIII and KpnI restriction enzyme sites of EGFP-alpha-synuclein vector (Plasmid 40822, Addgene). G3BP1-mCh was generated through the insertion of the full-length G3BP1 CDS (synthesized by Genecopoeia) into the mCherry2-C1 backbone (Plasmid 54563, Addgene) at the SmaI restriction site.

Detergent Solubility Assay

Solubility of TDP-43 was assessed as previously described with minor modifications (van Eersel et al., PLOS ONE, (2011), 6(7):e22850). Cells were washed once with ice-cold PBS, lysed with modified RIPA buffer (25 mM Tris-HCl pH 7.6 (Sigma-Aldrich), 150 mM NaCl (Millipore Sigma), 5 mM EDTA (Sigma-Aldrich), 1% Triton X-100 (Sigma-Aldrich), 1% sodium deoxycholate (Sigma-Aldrich), 0.1% SDS (Fisher Scientific), protease inhibitor cocktail (Sigma-Aldrich), 1 mM PMSF (Thermo Fisher Scientific), phosphatase inhibitor cocktails 2 and 3 (Sigma-Aldrich)) and incubated on ice for 10 min. Following brief sonication on ice, lysates or homogenates were centrifuged for 1 hr at 100,000×g at 4° C. Supernatants were collected as the detergent-soluble fraction. Protein concentrations were determined using the RC DC protein assay (Bio-Rad). Pellets were then resuspended in RIPA buffer and re-sonicated and re-centrifuged. The resulting supernatant was discarded and pellets were resuspended in urea buffer (30 mM Tris pH 8.5 (Sigma-Aldrich), 7 M urea (Sigma-Aldrich), 2 M thiourea (Sigma-Aldrich), 4% CHAPS (Thermo Fisher Scientific), protease inhibitor cocktail (Sigma-Aldrich), 1 mM PMSF (Thermo Fisher Scientific), phosphatase inhibitor cocktails 2 and 3 (Sigma-Aldrich)). Following brief sonication on ice, lysates were centrifuged for 1 hr at 100,000×g at 22° C. This final supernatant was then collected as the detergent-insoluble, urea-soluble fraction. Proteins from each fraction were then separated by SDS-PAGE and analyzed by western blot analysis.

Nuclear/Cytoplasmic Fractionation

Nuclear/cytoplasmic subcellular fractionation was performed utilizing NE-PER Nuclear and Cytoplasmic Extraction Reagents (Thermo Fisher Scientific) according to manufacturer's instructions. Protein concentrations for individual fractions were determined using the Pierce BCA Protein Assay Kit (Thermo Fisher Scientific) and subsequently analyzed by western blot.

Size-Exclusion Chromatography

A 90 mL Sephacryl S-300 column equilibrated in 25 mM Tris pH 7.8, 150 mM NaCl, 5 mM EDTA, 0.5% Triton X-100, 0.5% deoxycholate was calibrated with the size standards Blue Dextran (2000 kDa), Catalase (232 kDa), and Hemoglobin (60 kDa). Lysates from cells expressing optoTDP43 which had been subjected to blue light stimulation or darkness were loaded in a 0.5 mL volume and the column was run at a flow rate of 0.3 mL/min at 4° C. An initial volume of 30 mL was passed through the column, which corresponded to the column void volume, then 2.5 mL fractions were collected. A sample from each fraction was mixed with SDS sample buffer and subjected to SDS-PAGE, followed by western blotting as described below.

SDS-PAGE/Western Blotting

Prior to SDS-PAGE, protein concentrations were determined using the Pierce BCA Protein Assay (Thermo Fisher Scientific) or RC DC Protein Assay (Bio-Rad). Samples were separated by SDS-PAGE (4-20% Mini-PROTEAN TGX Precast Gels, Bio-Rad) and transferred to PVDF membranes (Immobilon-FL, EMD Millipore) using the Trans-Blot Turbo Transfer System (Bio-Rad). Following water and TBS washes, membranes were blocked in Odyssey Blocking Buffer (Li-Cor) for 1 hr at room temperature. Membranes were then washed and incubated with primary antibodies in TBS-T (0.1% Tween) supplemented with 50% blocking buffer overnight at 4° C. Primary antibody dilutions used were as follows: rabbit anti-TDP43 (Proteintech, 1:1000), mouse anti-α-tubulin (Sigma-Aldrich, 1:10000), rabbit anti-Lamin B1 (Abcam, 1:5000), rabbit anti-GAPDH (Sigma-Aldrich, 1:10000), mouse anti-mCherry (Novus Biologicals, 1:1000). Following TBS-T washes, membranes were incubated with secondary antibodies (Li-Cor, IRDye 680/800, 1:10000) for 1 hr at room temperature. Membranes were then washed with TBS-T and bands were visualized using the Odyssey CLx imaging system.

Immunofluorescence

For standard immunofluorescence analysis, cells were then fixed with 4% PFA for 15 min at room temperature following one PBS wash. Following three additional PBS washes, cells were blocked with 5% normal donkey serum (NDS) in 0.3% Triton X-100 for 1 hr at room temperature. Primary antibodies were prepared in 1×PBS supplemented with 0.3% Triton X-100/5% NDS and cells were incubated in antibody solution overnight at 4° C. Primary antibody dilutions used were as follows: mouse anti-SQSTM1/p62 (Abcam, 1:100), rabbit anti-SQSTM1/p62 (Abcam, 1:500), rat anti-phospho TDP-43 (S409/410), Clone 1D3 (EMD Millipore, 1:200), rabbit anti-G3BP1 (Proteintech, 1:500), mouse anti-eIF4G (Santa Cruz, 1:300), rabbit anti-ATXN2 (Proteintech, 1:400), rabbit anti-TIAR (Santa Cruz, 1:300), mouse anti-digoxin (Jackson ImmunoResearch, 1:200), mouse anti-ubiquitin (Santa Cruz, 1:200). Following three PBS washes, secondary antibodies were diluted in 0.3% Triton X-100/5% NDS and incubated with cells for 1-2 hrs at room temperature. Cells were then washed and coverslips were mounted onto slides (ProLong Diamond Antifade Mounting Media with DAPI, Invitrogen) to be visualized by confocal microscopy.

For total RNA staining, cells were fixed in 100% methanol for 15 min at −20° C. Following three PBS washes, cells were incubated in SYTO® RNASelect™ Green Fluorescent Cell Stain (Thermo Fisher Scientific) staining solution (500 nM in PBS) for 20 min at room temperature. Cells were then washed three additional times in PBS prior to blocking and counterstaining as described above.

Immunohistochemistry

Formalin-fixed, paraffin-embedded human hippocampus and cervical spinal cord sections of ALS/FTLD subjects retrieved from the Neurodegenerative Brain Bank at the University of Pittsburgh, following protocols approved by the University of Pittsburgh Committee for Oversight of Research and Clinical Training Involving Decedents (CORID). Following antigen retrieval with Target Retrieval Solution, pH 9 (Dako Agilent), immunofluorescence staining was performed using the following primary antibodies: TIA1 (1:1000, Abcam), Ataxin 2 (1:50, Proteintech), G3BP1 (1:100, Proteintech) and pTDP-43 (1D3, 1:500, provided by Manuela Neumann, Helmholtz Zentrum, Munich, Germany). Immunofluorescence signal was visualized using Alexa Fluor 488 and Cy3 labeled secondary antibodies (both 1:200, Jackson ImmunoResearch) and DAPI nuclear counterstain (1:1000, Thermo Scientific).

RNA Fluorescent In Situ Hybridization (RNA FISH)

RNA-FISH using PolyT (TTTTTTTTTTTTTTTTTTTTTTTTTVN/3Dig_N SEQ ID NO. 122) (Exiqon) or scramble control (5DigN/GTGTAACACGTCTATACGCCCA) (SEQ ID NO. 123) (Batch 233334, Exiqon) probes was conducted as previously described but with minor modifications (Zhang, et al., (2015b), Nature 525, 56-61). In short, cells were fixed in 3.2% PFA (Electron Microscopy Science), permeabilized for 10 min in 0.3% Triton X-100 (Sigma-Aldrich), equilibrated for 10 min in 1×SSC (Thermo Fisher Scientific) and then incubated in 40% formamide (Sigma-Aldrich) at 55° C. for 10 min. Hybridization buffer (100% formamide, 1 mg/mL BSA Fraction V (Fisher Scientific), 20 mM ribonucleoside vanadyl complex (Sigma-Aldrich), 0.1M NaPO$_4$, 20×SSC) and then probe mixture (10 g/L salmon sperm (Thermo Fisher Scientific), 20 mg/mL E. coli tRNA (Thermo Fisher Scientific), 80% formamide, 25 μM RNA-Probe preheated to 85° C.) were added to the cells for 2 hrs at 55° C. Next, the cells were washed with 40% formamide, 1×SSC, TBS-50 pH 7.4, 5M NaCl (Thermo Fisher Scientific Scientific) 1M Tris pH 7 (Thermo Fisher Scientific), 1M Tris, pH 8 (Thermo Fisher Scientific Scientific)), and then 1×PBS. Following a cross-linking step with 3.2% PFA and 0.3% Triton X-100, the cells were immunostained and washed with IF Buffer (TBS-50, 0.5 g BSA Fraction V, Protease-free BSA (Fisher Scientific)) and then incubated in blocking buffer (TBS-50, BSA Fraction V, 5% Normal Donkey Serum). Finally, the cells were incubated with primary antibodies at 4° C. overnight, and the following day were washed with IF buffer and incubated with secondary antibodies for 1 hr at room temperature. Additional washes with IF Buffer, TBS-50, MgCl$_2$, and 1×PBS were performed prior to mounting coverslips with ProLong Diamond Antifade Mounting Media and visualized by confocal microscopy.

Cell Viability Assays

Analysis of cell viability was performed utilizing the CellTiter Glo Luminescent Cell Viability Assay (Promega) according to manufacturer's instructions. Treatment of cells with 0.1% Triton X-100 for 1 hr served as negative viability controls. Raw luminescence values were normalized to control group means and compared across experimental conditions.

Microscopy

Live-Cell Imaging

All live-cell imaging experiments were performed on a Nikon A1 laser-scanning confocal microscope system outfitted with a Tokai HIT stagetop incubator utilizing 40× and/or 60× oil immersion objectives (CFI Plan Apo Lambda 60× Oil, Nikon; CFI Plan Fluor 40× Oil, Nikon). Following transfections and/or treatments, medium was changed to phenol red-free growth medium (Gibco) and cells were allowed to equilibrate on the preheated (37° C. and 5% CO$_2$) stagetop incubator for 10 min prior to imaging. Acute blue light stimulation was achieved by utilizing the 488 nm laser line and the stimulation module within Nikon Elements imaging software. Activation duration varied from 1-8 sec and laser power ranged from 1-20% as indicated in different experiments. Stimulation regions of interest (ROIs) were drawn over fields of view prior to image acquisition. Following 2-5 baseline images, laser stimulation was performed and cells were imaged for up to 1 hr post-activation.

Fluorescence Recovery after Photo-Bleaching (FRAP) Imaging

Initially, granules or inclusions were identified using a 60× oil immersion objective by confocal microscopy and a 2×2 μm$^2$ bleaching ROIs were drawn over objects of interest. Reference ROIs of the same size were drawn in adjacent, non-bleached cells to control for photo-bleaching. Following 2-5 baseline images, objects were bleached for 500 ms using 50% laser power (488 nm or 594 nm laser lines) and cells were imaged for up to 5 min post-bleaching without delay.

High-Throughput LED Screening

Following transfection or transduction, plates were placed into a pre-warmed Tokai HIT stage-top incubator and allowed to equilibrate for 30 min prior to imaging. Custom 96-well LED arrays were positioned above wells to provide blue light stimulation (~0.3 mW, 465 nm) and were interfaced with Nikon Elements imaging software to cooperate with imaging protocols. Communication between the LED array and microscope occurred through a 5 V analog output transmitted from a Texas Instruments BNC-2110 triggering device. Voltage signals were interpreted by a microcontroller by taking real-time voltage measurements corresponding to a specific light group combination. Through the use of a map function, the software was able to assign a value to each light group and turn the group on or off following the reading of the corresponding value by the microcontroller. Automated imaging protocols were designed and executed utilizing the Jobs module within Nikon Elements imaging software. The microscope was programmed to perform three sequential baseline plate scans prior to light exposure. Epifluorescent images were acquired with a Prime 95B CMOS camera (Photometrics) using the ET-dsRED filter set (Chroma). Nine fields of view were imaged over time per well in duplicate per experiment per condition. Baseline images were acquired every 10 min for 30 min in total. This was followed by simultaneous blue light stimulation and image acquisition for up to 24 hrs. Every 10 min during the stimulation period, LED diodes were programmed to sequentially switch off and allow for image acquisition.

Following completion of imaging within wells, LED diodes were programmed to switch back on to resume light stimulation and a subsequent set of diodes was programmed to turn off to allow for imaging. This pattern was repeated throughout the remainder of the imaged wells to complete the plate scan.

Recombinant Protein Purification

MBP-tagged TDP-43 WT and 5FL proteins were purified as previously reported (Wang, et al., (2018), EMBO J. 37). Cells were harvested by centrifugation, resuspended in TDP-43 binding buffer (20 mM Tris-Cl pH 8.0, 1 M NaCl, 10 mM imidazole, 10% (v/v) glycerol, 1 mM DTT), supplemented with complete EDTA-free protease inhibitor cocktail, and lysed via sonication. The protein was purified over Ni-NTA agarose beads (Qiagen) and eluted from the beads using 20 mM Tris-Cl pH 8.0, 1 M NaCl, 300 mM imidazole, 10% (v/v) glycerol, 1 mM DTT. The eluate was further purified over amylose resin (NEB) and eluted using 20 mM Tris-Cl pH 8.0, 1 M NaCl, 10 mM maltose, 10% (v/v) glycerol, 1 mM DTT. The protein was concentrated, flash frozen in liquid $N_2$, and stored as aliquots in $-80°$ C. until further use.

In Vitro Phase Separation and Aggregation Assays

To induce formation of droplets, the proteins were first buffer exchanged into 20 mM HEPES (pH 7.4), 150 mM NaCl, and 1 mM DTT using a Micro Bio-Spin P-6 Gel column (Bio-Rad). The protein was then centrifuged at 16,000 rpm for 10 min to remove any preformed aggregates and the protein concentration was measured via a Bradford assay. LLPS was initiated with the addition of 10% dextran (final buffer conditions of 5 µM TDP43, 15 mM Hepes (pH 7.4), 150 mM NaCl, and 1 mM DTT with the indicated amounts of total yeast RNA) and droplets were imaged using DIC microscopy.

To measure aggregation kinetics, TDP-43 was thawed and centrifuged at 16,000 rpm for 10 min. Protein concentration was measured via Bradford and TDP-43 WT or 5FL were diluted to a final concentration of 5 µM (in 20 mM Hepes (pH 7.0), 150 mM NaCl, 1 mM DTT, with indicated quantities of RNA). Aggregation was initiated by cleavage of the MBP tag using 5 µg/mL TEV protease and monitored via turbidity measurements using a TECAN M1000 plate reader.

Electron Microscopy

Transmission electron microscopy (TEM) of purified TDP-43 WT and 5FL aggregates was performed as described previously (Guo, et al., (2018), Cell 173, 677-692.e20). Following the aggregation assays described above, 10 µL of each sample was adsorbed onto 300-mesh Formvar/carbon-coated copper grids (Electron Microscopy Sciences, Hatfield, PA) and stained with 2% (w/v) uranyl acetate. Excess uranyl acetate solution was removed prior to drying of the grids. Samples were then imaged using a JEOL-1010T12 transmission electron microscope.

Quantification and Statistical Analysis

Image Quantification and Analysis

All image visualization and quantification was performed with Nikon Elements Imaging Software and analyses were performed in a double-blind fashion. For fixed-cell image quantification of stress granule co-localization and granule size, 4-5 fields of view were analyzed per condition. EGFP-TDP43 granules were examined and percentages of granules co-localizing with stress granule markers (G3BP1, eIF4G) were calculated. Maximum intensity projections for each field of view were generated and granule area was determined using automated object detection.

For FRAP imaging experiments, mean fluorescence intensity was tracked within bleaching ROIs over time. Intensity values were corrected for photo-bleaching utilizing reference ROIs drawn within adjacent, non-bleached cells in the imaging field. Fluorescence intensity values were converted to percentages of baseline (pre-bleach) fluorescence intensity means, with minimum fluorescence intensity values collected throughout the imaging period set to 0%, and percentage fluorescence recovery to baseline values was plotted over time.

Time-lapse image sequences acquired during high-throughput LED screening were analyzed utilizing automated object recognition to identify intracellular optoTDP43 particles and inclusions. Objects were defined by fluorescence intensity and object area thresholding. The number of cells containing detected objects were tracked over time and divided by the total number of cells within the imaging field to generate percentage of cells with inclusions for each timepoint within the imaging sequence. Analysis of neuronal survival in longitudinal imaging datasets was performed through monitoring of the far-red iRFP670 fluorescent reporter. Cell death was defined by somatic rounding, neurite retraction/blebbing and loss of fluorescence signal. Times-of-death were recorded as the last timepoint at which neurons were observed to be alive and were used to generate Kaplan-Meier survival curves.

Quantification of light-induced granule formation and dissociation was performed using the spot detection function within Nikon Elements imaging software. Granules were identified according to size and contrast thresholding. Granule number per cell was monitored over time in pre-identified cells that were labeled by an ROI. Raw granule number per cell values were first normalized to baseline values per cell over time. In order to calculate normalized granule number per cell over time, a weighted baseline intensity and cell area was determined. Baseline cell fluorescence intensity and area were determined from the image acquired prior to light stimulation and from this means were calculated across all experimental groups to control for differences in protein concentration and cell size. Total group baseline mean fluorescence intensity and cell area were then used to weight granule number values per cell by dividing individual cell values by total group means. For granule dissociation rate quantification, raw granule number per cell values were first normalized to baseline values. Normalized granule number values were then converted to percentages of each individual cell's maximum granule number per stimulation cycle. Mean percentages of cell maximum granule number were then plotted over time for each stimulation cycle.

Statistics

Statistical significance was calculated by Graphpad Prism software (Version 7.03) and resulting P values less than or equal to 0.05 were deemed to be significant. Unpaired Student's t-tests were used to determine statistical significance in data sets comparing two variables. Two-way ANOVAs with Sidak Post-hoc analysis was used for comparisons of FRAP and granule formation/intracellular inclusion screening curves. Pearson's correlations were performed to determine $r^2$ values between data sets. Exponential decay nonlinear regression analysis was performed to compare optoLCD dissociation curves across groups. For survival analysis, Kaplan-Meier estimates were used to generate survival curves and Gehan-Breslow-Wilcoxon tests were used to compare across groups. Cumulative risk-of-death curves were generated as described previously (Malik et al., Elife, (2018), 7:e35977) using custom scripts in RStudio.

Example 2. Poly-UG Nucleic Acid Substrates Prevent Formation of TDP-43 Inclusions Live imaging was performed on HEK cells transfected with optoTDP-43 and exposed to blue light stimulation. At four hours into light stimulation, a synthesized UG RNA sequence repeated 12 times was added ("$UG_{12}$"; SEQ ID NO:10). Using automated quantitative analysis to identify cells with optoTDP-43 inclusions at each timepoint, FIG. 7 shows 50 nM $UG_{12}$ RNA prevented formation of optoTDP-43 inclusions at each timepoint and the percent of cells without optoTDP-43 inclusions at the final timepoint was reduced by about 50% compared to mock control RNA.

Example 3. Modified, Designed DNA Substrates Prevent Formation of TDP-43 Inclusions A modified 2'OMe DNA oligonucleotide (SEQ ID NO: 11) was designed to bind TDP-43 based on other targeting 3'UTR RNA sequences. 2'-O-methylation (2'OMe) modifications enhance stability of oligonucleotides. HEK cells expressing full-length optoTDP43 (Cry2olig-TDP43-mCherry) were plated in 96-well plates and remained in the dark (light −) or exposed to blue light (light +) 8 hrs after transfection for 32 hours. HEK cell viability/health was determined using the CellTiter-Glo® assay to quantify intracellular ATP (energy production) as a function of relative luminescence (RLU). Cells expressing optoTDP-43 but pretreated with the TDP-43 targeting/binding oligonucleotide Stem Loop TG24 (SL_TG24; SEQ ID NO: 11) exhibited a complete rescue of cell viability at 50 nM and 100 nM pretreatment in a dose-dependent manner (FIG. 8). Oligonucleotides consisting of 12 repeating adenine-cytosine (AC) motifs with a 2'OMe modified backbone fused to the same stem structure as SL_TG24 (AC24; SEQ ID NO:120) did not bind TDP-43 and failed to rescue TDP-43 inclusions-induced cytotoxicity at 50 nM and 100 nM pretreatment. For statistical analysis, a one-way ANOVA was performed with a Tukey's multiple comparisons posthoc. (*, $p<0.05$; , $p<0.01$, **, $p<0.0001$). These results show that modified DNA inhibitors can prevent formation of TDP-43 inclusions.

Example 4. OptoTDP43 Model Comprising V5 Tag and VVD Light-Inducible Dimerization Protein An additional optoTDP43 model construct was constructed in which full-length TDP-43 was used. A V5 tag (GKPIPNPLLGLDST (SEQ ID NO:124); an amino acid sequence of viral RNA polymerase commonly used for tagging recombinant proteins) was N-terminally fused to full-length TDP-43. The C-terminal end of TDP-43 was fused to the about 64 kDa Vivid (VVD) protein, a *Neurospora crassa* fungal photoreceptor which dimerizes in response to blue light. VVD has been used as a light-inducible dimerization domain fused to target proteins to induce dimerization (Zoltowski, Biochemistry, (2008), 47(27):7012-7019). The V5-TDP43-VVD fusion construct was placed under doxycycline-inducible expression control using a Tet expression cassette. SEQ ID NO:6 is a polynucleotide sequence encoding V5-TDP43-VVD. SEQ ID NO:7 is a polypeptide sequence comprising V5-TDP43-VVD.

HEK293 cells were transfected with a V5-TDP43-VVD construct and incubated for 16 hrs. 100 ng/mL doxycycline were added to the media, and HEK293 cells expressing V5-TDP43-VVD were exposed to 84 h blue light stimulation. Cells were fixed and lysates were collected. Cells showed light-induced assemblies following fixation and immunofluorescence for the n-terminal V5 tag. Further, light-induced V5-TDP43-VVD assemblies also co-localized with phospho-TDP43 signal, resembling the pathological hallmarks of TDP-43 proteinopathy. Co-localization with phospho-TDP43 signal was not observed for cells expressing V5-TDP43-VVD but kept in the dark. Lysates of HEK293 cells exposed to 84 hrs of light or kept in the dark were then separated into detergent-soluble and insoluble fractions prior to SDS-PAGE and immunoblotting for total TDP-43. Cells exposed to blue light exhibited a shift of both exogenous V5-TDP43-VVD and endogenous TDP-43 into the insoluble fraction. These results show that the V5-TDP43-VVD construct inducibly forms aggregates and recapitulates TDP-43 proteinopathies in neurodegenerative disease.

An additional optoTDP43 model construct was constructed in which full-length TDP-43 was N-terminally fused with VVD protein and C-terminally fused with a V5 tag (henceforth, "VVD-TDP43-V5"), and placed under doxycycline-inducible expression control using a Tet expression cassette. SEQ ID NO:8 is a polynucleotide sequence encoding VVD-TDP43-V5. SEQ ID NO:9 is a polypeptide sequence comprising VVD-TDP43-V5.

HEK293 cells were transfected with a VVD-TDP43-V5 construct and incubated for 16 hrs. 100 ng/mL doxycycline were added to the media, and HEK293 cells expressing VVD-TDP43-V5 were exposed to 24 h of blue light stimulation. Cells were fixed and lysates were collected. After only 24 hrs of blue light exposure, cells showed light-induced assemblies following fixation and immunofluorescence for the n-terminal V5 tag. Quantification of normalized aggregation area demonstrated a significant induction of VVD-TDP43-V5 inclusion formation following blue light exposure compared to cells kept in darkness (FIG. 9). A dose-dependent effect was also observed between low doxycycline treatments (10 ng/mL) and high doxycycline treatment (1000 ng/mL), producing relatively low and high levels of protein expression respectively during light stimulation. Further, light-induced VVD-TDP43-V5 assemblies also co-localized with phospho-TDP43 signal, resembling the pathological hallmarks of TDP-43 proteinopathy. Co-localization with phospho-TDP43 signal was not observed for cells expressing VVD-TDP43-V5 but kept in the dark. These results show that the VVD-TDP43-V5 construct inducibly forms aggregates and recapitulates TDP-43 proteinopathies in neurodegenerative disease.

Example 5. Prevention of and Disaggregation of FUS Protein Aggregates In Vitro Full-length FUS protein was N-terminally fused with a TEV cysteine protease cleavage recognition sequence from Tobacco Etch Virus nuclear-inclusion-a endopeptidase. A Glutathione S-transferase (GST) tag was also N-terminally fused to the TEV cleavage recognition sequence, resulting in a GST-TEV-FUS construct. Upon expression and purification, GST-TEV-FUS (5 µM) was incubated with TEV protease (to cleave the GST-TEV motif) in the presence or absence of 20 µM specific RNAs known to bind FUS protein (for example, the polynucleotide sequence GGUG is a known FUS-binding RNA sequence motif). RNasin was also used to protect against RNA degradation. Samples were measured for turbidity every minute to assess the extent of aggregation. Turbidity results showed a subset of RNAs which were strong inhibitors of aggregation (FIG. 10A) and a subset of effective but intermediate inhibitors of aggregation (FIG. 10B). Strong RNA inhibitors essentially completely inhibited increases in turbidity while intermediate inhibitors partially inhibited turbidity increases. Strong inhibitors included RNA7 (SEQ ID NO:97), RNA8 (SEQ ID NO:98), RNA15 (SEQ ID NO:96), RNA19 (SEQ ID NO:99), RNA25 (SEQ ID NO:100), RNA26 (SEQ ID NO:101), RNA31 (SEQ ID NO:102), and RNA32 (SEQ ID NO:103). Intermediate inhibitors included RNA1 (SEQ ID NO:104), RNA2 (SEQ ID NO:105), RNA9 (SEQ ID NO:106), RNA10 (SEQ ID NO:107), RNA11 (SEQ ID NO:108), RNA13 (SEQ ID NO:109), RNA14 (SEQ ID NO:110), RNA17 (SEQ ID NO:111), RNA27 (SEQ ID NO:112), RNA28 (SEQ ID NO:113), RNA29 (SEQ ID NO:114), and RNA30 (SEQ ID NO:115).

To determine whether the selected RNA inhibitors could inhibit FUS phase transition, aggregation, or both, GST-TEV-FUS (5 µM) was incubated with TEV protease in the presence or absence of selected RNA inhibitors (20 µM) for 0-90 min. At 0, 30, 60, and 90 minutes, reactions were processed for sedimentation analysis. Pellet and supernatant fractions were resolved by SDS-PAGE and stained with Coomassie Brilliant Blue. The amount of FUS in the pellet fraction was determined by densitometry in comparison to known quantities of FUS. Results showed that RNA9 had little effect on reducing the amount of FUS found in the pellet fraction (representing protein aggregates) by 90 minutes, whereas RNA15 and RNA8 reduced the percentage of FUS in the pellet fraction by about 40% and 60%, respectively, by 90 minutes. RNA19 had intermediate effects (about 50% reduction by 30 minutes but about 10% reduction by 90 minutes) on reducing the amount of FUS found in the pellet fraction.

Fibrillization reactions were performed as described in the immediately preceding paragraph and processed for electron microscopy (EM) at the end of the reaction. Images identified regions of high-density stain that indicated formation of protein phases having high protein concentration. Differential interference contrast (DIC) images of GST-TEV-FUS (5 µM) droplets formed in the presence and absence of the specific RNAs (20 PM) were also obtained. Results showed that RNA8, RNA15, and RNA19 significantly reduced droplet formation, whereas droplet formation in the RNA9 sample was not substantially changed from that of an untreated sample (FIG. 11). These results show that strong RNA inhibitors prevent phase transition and aggregation, while intermediate RNA inhibitors prevent aggregation only.

RNA inhibitors were next evaluated for their ability to disaggregate FUS aggregation and phase transition. GST-TEV-FUS (5 µM) droplets were first formed, and then selected RNA inhibitors were added to the protein droplets. DIC images showed that RNA8, RNA15, and RNA19 (strong inhibitors) essentially eliminated (disaggregated) all FUS protein droplets, whereas RNA9 (an intermediate inhibitor) modestly reduced the size and overall number of FUS protein droplets (FIG. 12). Fibrillization reactions were performed and, at the end of the reaction, water or RNA inhibitors (20 µM) were added to the reactions. Turbidity measurements were taken every minute to assess the extent of disaggregation. Results showed that strong RNA inhibitors RNA7 (SEQ ID NO:97), RNA8 (SEQ ID NO:98), RNA15 (SEQ ID NO:96), RNA19 (SEQ ID NO:99), RNA25 (SEQ ID NO:100), RNA26 (SEQ ID NO:101), RNA31 (SEQ ID NO:102), and RNA32 (SEQ ID NO:103) significantly reduced turbidity of FUS samples. Intermediate RNA inhibitors RNA1 (SEQ ID NO:104), RNA2 (SEQ ID NO:105), RNA9 (SEQ ID NO:106), RNA10 (SEQ ID NO:107), RNA11 (SEQ ID NO:108), RNA13 (SEQ ID NO:109), RNA14 (SEQ ID NO:110), RNA17 (SEQ ID NO:111), RNA27 (SEQ ID NO:112), RNA28 (SEQ ID NO:113), RNA29 (SEQ ID NO:114), and RNA30 (SEQ ID NO:115) also reduced turbidity of FUS samples, although to a lesser degree than strong RNA inhibitors. Disaggregation reactions were also processed for EM imaging at 20 and 120 minutes post-addition of RNA inhibitors. Results showed that RNA8, RNA15, and RNA19 significantly reduced the amount of dark staining in the images, demonstrating reduced FUS protein aggregation.

Figure 13A:
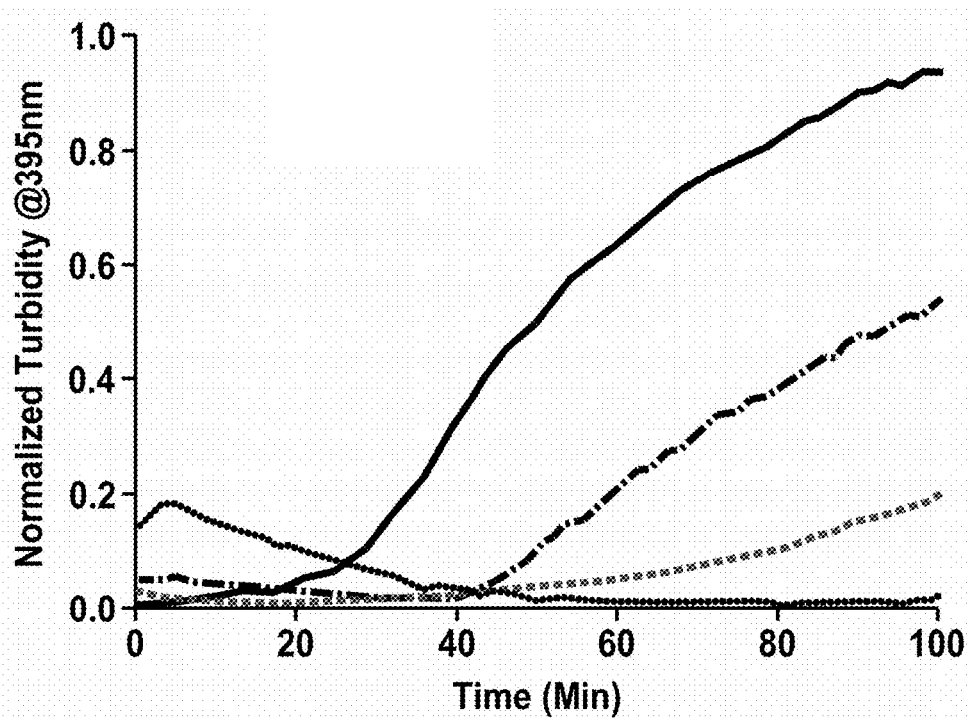
Figure 13B:
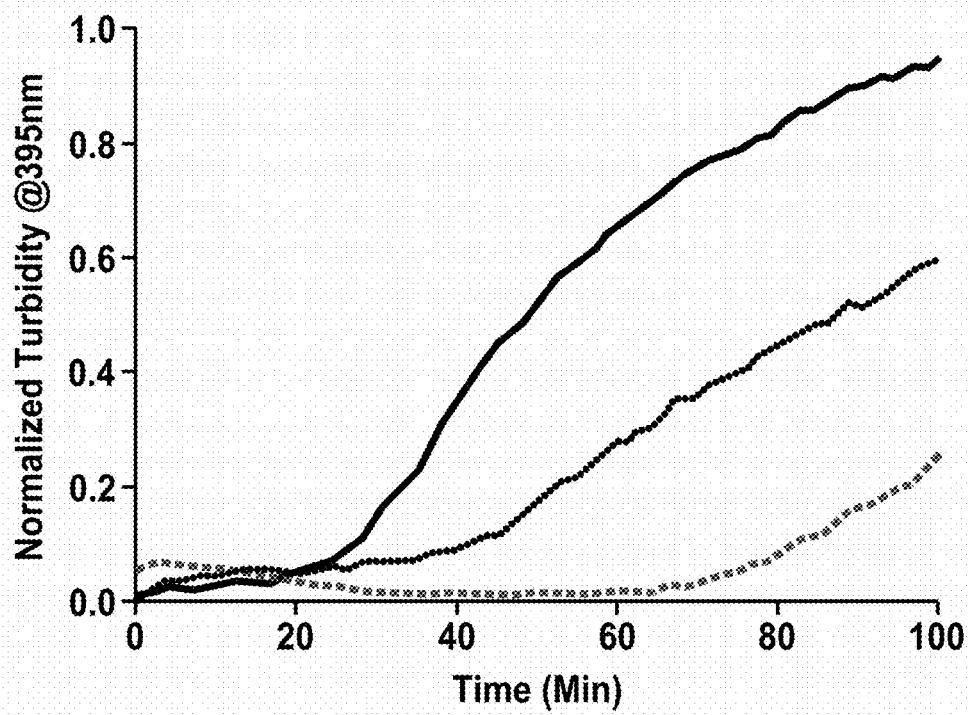

Next, inhibition activity of RNA inhibitors was assessed depending on the length and sequence of the RNA. Fibrillization reactions were performed by incubating GST-TEV-FUS (5 µM) with TEV protease in the presence or absence of selected RNA inhibitors (20 µM) for 0-100 min. Turbidity measurements were taken every minute to assess the extent of aggregation (and prevention thereof). When the strong inhibitor RNA15 (48 nucleotides) was shortened to 24 nucleotides, the shortened RNA became the intermediate inhibitor RNA22 (SEQ ID NO:117; "FUS+RNA15/2") (FIG. 13A). When the length of the intermediate inhibitor RNA9 (24 nucleotides) was doubled to 48 nucleotides, the resultant RNA ("RNA9^2") (SEQ ID NO:119) had increased inhibition activity (FIG. 13B). A single A to U mutation was introduced in RNA22, which also introduced a known FUS binding motif GUGGU into the sequence, resulting in RNA15/2 (A-U) (SEQ ID NO: 118). Interestingly, this single mutation in RNA15/2 (A-U) significantly weakened its inhibition activity compared to RNA22, indicating the specific RNA sequence is important for inhibition activity (FIG. 13A).

Figure 13C:
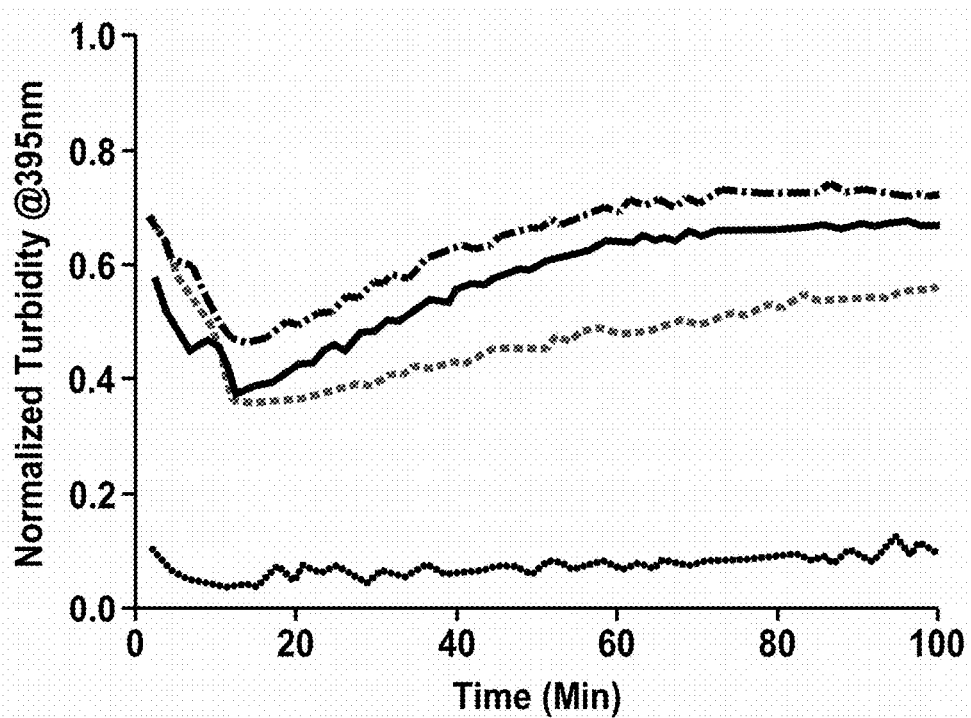
Figure 13D:
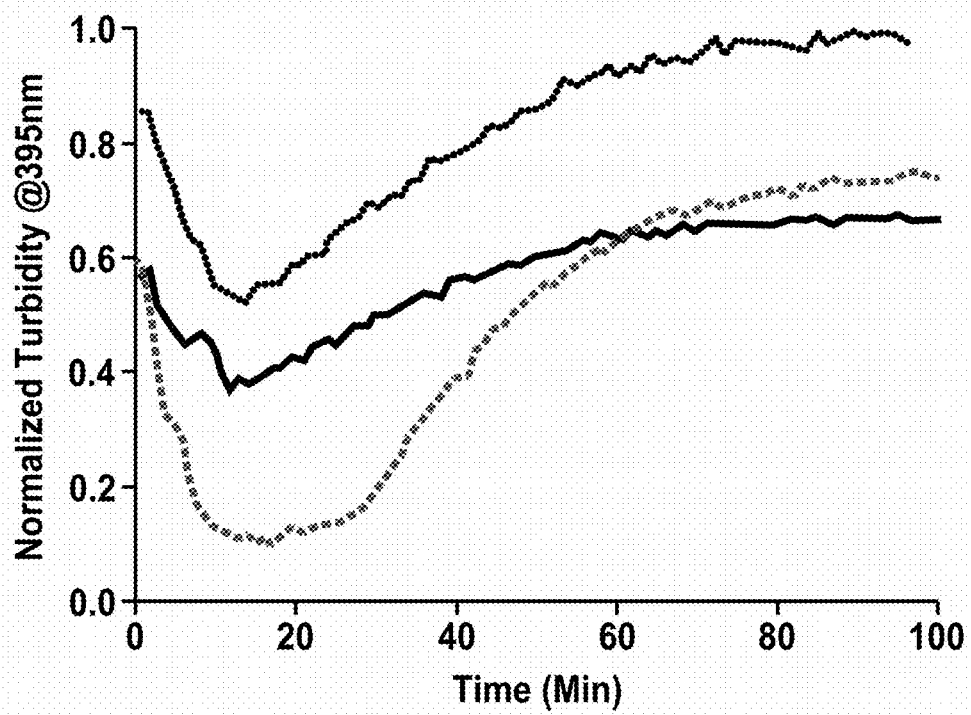

To test disaggregation potential of the RNA inhibitors, fibrillization reactions were repeated and, at the end of the reaction, selected RNA inhibitors (20 µM) were added to the reaction. Turbidity measurements were taken every minute to assess the extent of disaggregation. As with prevention of aggregation, disaggregation activity also depended on the length and sequence of the RNA. For example, RNA15 completely disaggregated pre-formed FUS aggregates, while the shortened version of RNA15 (RNA22) did not show disaggregation activity compared to the control RNAC2 (FIG. 13C). On the other hand, doubling the length of RNA9 (which did not have disaggregating activity) to result in RNA9^2 rendered RNA9^2 able to disaggregate pre-formed FUS aggregates (FIG. 13D). These results showed that RNA inhibitors can disaggregate existing FUS aggregates, but that the length and specific sequence of the RNA determines the extent of disaggregation activity.

Next, RNA inhibitors were assessed for inhibition activity when the RNA Recognition Motif (RRM) of FUS was mutated. Mutations in the FUS RRM reduce the binding affinity between RNA and FUS. Specifically, four phenylalanine (F) to leucine (L) mutations at positions 305, 341, 359, and 368 of FUS (FUS$^{F305L:F341L:F359L:F368L}$; henceforth known as "FUS 4FL") are known to disrupt RNA binding (Daigle et al., Hum. Mol. Genet. (2013), 22(6): 1193-1205). 8 nM fluorescein-labeled RNA inhibitors were combined with varying concentrations of GST-TEV-FUS or GST-TEV-FUS 4FL, and anisotropy of RNA binding was measured. Results showed that mutations in the FUS RRM (FUS 4FL) reduced binding affinity between RNA inhibitors and FUS. For example, the dissociation constant (Kd) for binding to WT FUS vs. FUS 4FL for RNA8 was 40.82±8.32 nM and 113.1±54.36 nM, respectively; for RNA15 was 104.7±9.2 nM and 769.0±281.2 nM, respectively; and for RNA19 was 101.5±28.1 nM and 296.6±132.6 nM, respectively.

To assess the requirement of RNA-binding for prevention of aggregate formation, RNA-binding deficient mutant GST-TEV-FUS 4FL (5 µM) was incubated with TEV protease in the presence or absence of separate strong inhibitors RNA8, RNA15, RNA19, or RNA31 (20 µM each) for 0-180 min. Turbidity measurements were taken every minute to assess the extent of aggregation. Each of the strong inhibitors failed to significantly reduce turbidity of FUS 4FL protein, demonstrating that RNA binding is required to prevent FUS aggregation.

To assess the requirement of RNA-binding for disaggregation, fibrillization reactions were performed and, at the end of the reaction, water or separate RNA inhibitors RNA8, RNA15, RNA19, RNA31, or RNA32 (20 µM each) were added to the reaction. Turbidity measurements were taken every minute to assess the extent of disaggregation. Results showed that RNA8, RNA15, RNA19, RNA31 each failed to disaggregate FUS 4FL (as measured by turbidity reduction) by 100 minutes. RNA32 modestly reduced FUS 4FL aggregation below control RNA RNAC2 and water alone, perhaps indicating some residual binding of this RNA to FUS 4FL. These results demonstrate that RNA binding is required to disaggregate existing FUS aggregates.

Example 6. Construction and Characterization of an optoFUS Inducible Model of FUS Proteinopathy Photoresponsive mCherry (mCh) protein was fused to the N-terminus of full-length FUS protein, and Cry2 was fused to the N-terminus of mCherry. The resultant construct Cry2-mCh-FUS was placed under the inducible control of a doxycycline-responsive Tet expression cassette. HEK293 cells were transfected with the construct and, after 16 hrs of incubation, doxycycline (5 ng/mL) were added to the media. Cells were exposed to blue light or darkness for 8 hrs, then fixed for fluorescence imaging. Significantly more optoFUS assemblies were readily visible in cells exposed to blue light than in cells exposed to darkness. The ratio of nuclear to cytoplasmic optoFUS was quantified and showed that significantly more optoFUS was found in the cytoplasm than the nucleus of cells exposed to light, as compared to cells maintained in darkness (FIG. 14A). Further, cells exposed to light showed a significantly increased proportion of transfected cells with optoFUS assemblies (FIG. 14B).

To test whether light-induced optoFUS assemblies were insoluble inclusions in cells, HEK293 cells expressing optoFUS were exposed to 8 h of darkness or blue light prior to fluorescence recovery after photobleaching (FRAP) analysis of optoFUS assemblies. Light-induced optoFUS assemblies show extremely little fluorescence recovery following bleaching, showing formation of static, immobile inclusions (FIG. 14C). To the contrary, cells exposed to darkness exhibited extensive fluorescence recovery following bleaching, showing dynamic assemblies. HEK293 cells expressing optoFUS were then exposed to 16 h of darkness or blue light prior to fractionation into soluble supernatant and insoluble pellet fractions. Extracts were then separated on a Western blot and probed using anti-mCh or an anti-FUS antibodies. Cells treated with blue light showed dose-dependent increases in optoFUS protein present within sarkosyl-insoluble, urea-soluble fractions at low (10 ng/mL) and high (100 ng/mL) doxycycline concentrations. Increases in endogenous FUS protein were similarly observed within sarkosyl-insoluble fractions in cells treated with high doxycycline and blue light. However, the majority of optoFUS protein and endogenous FUS protein in cells exposed to darkness remained in the soluble supernatant. These results show that light-induced optoFUS assemblies are insoluble inclusions similar to those found in FUS proteinopathy.

To test whether optoFUS inclusions recapitulate ALS-like pathologies, HEK293 cells expressing optoFUS were exposed to 8 h of darkness or blue light prior to immunofluorescence analysis of pathological hallmarks of FUS proteinopathy observed in ALS and FTLD. optoFUS inclusions were negative for FET family protein markers TAF15 and EWSR1, which are commonly found in FTLD, but not ALS, patient tissue inclusions. Further, fluorescence image analysis also showed co-localization of optoFUS inclusions with the 9G6 methylated FUS antibody, indicating an ALS-like methylation-status of optoFUS inclusions. These results show optoFUS inclusions recapitulate ALS-like pathological hallmarks.

Example 7. RNA Inhibits optoFUS Proteinopathy in Cells optoFUS was shown to form aggregates resembling those of FUS-related proteinopathy, and RNA inhibitors were shown to both prevent and disaggregate such optoFUS aggregates. As such, the model was examined in live cells to determine whether bait RNA oligonucleotides (bONs) could prevent and disaggregate optoFUS inclusions.

A 25-nucleotide bait RNA referred to as RNAS1 (SEQ ID NO:98) was constructed for cellular experiments. RNAS1 contains a known FUS binding motif GGUG polynucleotide sequence. A 24-nucleotide control RNA (SEQ ID NO:121) was also constructed and used for cellular experiments. HEK293 cells were transfected with the optoFUS construct, incubated for 16 hrs, and then doxycycline (5 ng/mL) and 500 nM, 1 µM, or 2.5 µM of either bait RNAS1 or control RNA were added to the media. Cells were then incubated under either blue light or darkness for 8 hrs and then fixed for analysis. Cells were fluorescently imaged and quantified for amount of aggregation observed. While no significant changes in optoFUS inclusion formation were observed following treatment with control RNA oligonucleotides, treatment with bait S1 oligonucleotides resulted in a dose-dependent inhibition of optoFUS inclusion formation (FIG. 15). These results show that bONs can prevent optoFUS inclusions in cells.

It was then tested whether modified RNAs could also prevent optoFUS inclusion formation in cells. Thus, experiments were repeated using the additional bONs RNA2'S1 (SEQ ID NO: 116), which contained 2'OMe (a methyl group covalently linked to the 2' hydroxyl of the ribose moiety) modifications at each nucleotide, and RNAPS-2'S1 (SEQ ID NO: 116; identical to RNA2'S1 but containing both phosphorothioate bonds (PS) and 2'OMe modifications at each nucleotide). Both RNA2'S1, RNAPS-2'S1 contained the same nucleotide sequence as RNAS1 (with the exception of the noted modifications). HEK293 cells were transfected with the optoFUS construct, incubated for 16 hrs, and then doxycycline (5 ng/mL) and 500 nM, 1 µM, or 2.5 µM of either bait RNAS1, RNA2'S1, RNAPS-2'S1, or control RNA were added to the media. Cells were then incubated under either blue light or darkness for 8 hrs and then fixed for immunofluorescence analysis. Cells were fluorescently imaged and quantified for amount of aggregation observed. Results showed that HEK293 cells expressing optoFUS pre-treated with RNAS1 and RNA2'S1 exhibited significant inhibition of optoFUS inclusion formation, whereas control RNA and RNAPS-2'S1 oligonucleotides showed little inhibitory effect (FIG. 16A). Cells were then lysed and lysates were collected and separated into RIPA-soluble, and RIPA-insoluble, urea soluble fractions prior to SDS-PAGE and immunoblotting for optoFUS. Densitometry analysis of Western blots showed that a much greater percentage of RNAS1- and RNA2'S1-treated samples had soluble opto-FUS protein compared to control RNA-treated samples (FIG. 16B). These results show that bONs can prevent optoFUS inclusion formation in cells.

It was then tested whether modified RNAs could also disaggregate existing optoFUS inclusions in cells. The bait oligonucleotides (bONs) RNAS1 (SEQ ID NO:98) and RNA2'S1 (SEQ ID NO:116), as well as control RNA, were used in experiments. HEK293 cells were transfected with the optoFUS construct, incubated for 24 hrs, and then doxycycline (5 ng/mL) and AraC (to slow cell proliferation, thereby inhibiting exogenously expressed optoFUS) were added to the media. Cells were then incubated under either blue light or darkness for 16 hrs. 1 µM of either RNAS1, RNA2'S1, or control RNA were then added to cells, and a sample of cells were fixed for immunofluorescence analysis. The remainder of the cells treated with light were then incubated in darkness for 6 hrs (16 hrs light/6 hrs darkness), and then fixed for immunofluorescence analysis. Cells were fluorescently imaged and quantified for amount of aggregation observed. Quantification of aggregation normalized to untreated (no RNA) controls showed treatment with both RNAS1 and RNA2'S1 significant increased optoFUS inclusion clearance compared to control RNA treatment, demonstrating enhanced disassembly of pre-formed optoFUS inclusions (FIG. 17). These results show that bONs can disaggregate optoFUS inclusions in cells.

In the disclosed sequences, the term "m" appearing after any nucleotide in a sequences refers to 2'OMe modification of that nucleotide. While all disclosed polynucleotide sequences of polynucleotides that binds a nucleic acid-binding polypeptide can be used singly or repeated one or more times in a sequence, the polynucleotide sequences of SEQ ID NO:33-56 are well-suited for use singly or as repeated motifs in a polynucleotide that binds a nucleic acid-binding polypeptide.

Publications cited herein are hereby specifically incorporated by reference in their entireties and at least for the material for which they are cited.

It should be understood that while the present disclosure has been provided in detail with respect to certain illustrative and specific aspects thereof, it should not be considered limited to such, as numerous modifications are possible without departing from the broad spirit and scope of the present disclosure as defined in the appended claims. It is, therefore, intended that the appended claims cover all such equivalent variations as fall within the true spirit and scope of the invention.

What is claimed is:

1. A method to inhibit nucleic acid-binding polypeptide aggregation in a neuronal cell comprising contacting the neuronal cell with a composition comprising a polynucleotide that binds the nucleic acid-binding polypeptide, wherein the nucleic acid-binding polypeptide aggregates in the neuronal cell and is associated with a neurodegenerative disease, wherein the nucleic acid-binding polypeptide is Fused in Sarcoma RNA binding protein (FUS), and wherein the neurodegenerative disease is selected from Multisystem Proteinopathy, Amyotrophic Lateral Sclerosis, Frontotemporal Dementia, Alzheimer's Disease, Chronic Traumatic Encephalopathy, Traumatic Brain Injury, Cortical Basal Degeneration, and Huntington's Disease, wherein the polynucleotide comprises SEQ ID NO: 96.

2. The method of claim 1, wherein the neurodegenerative disease is Amyotrophic Lateral Sclerosis or Frontotemporal Dementia.

3. The method of claim 1, wherein the method reduces a rate of aggregation of the nucleic acid-binding polypeptide or an amount of aggregate of the nucleic acid-binding polypeptide in the neuronal cell compared to an untreated control.

4. A method to inhibit nucleic acid-binding polypeptide aggregation in a neuronal cell comprising contacting the neuronal cell with a composition comprising a polynucleotide that binds the nucleic acid-binding polypeptide, wherein the nucleic acid-binding polypeptide aggregates in the neuronal cell and is associated with a neurodegenerative disease, wherein the nucleic acid-binding polypeptide is FUS, and wherein the neurodegenerative disease is selected from Multisystem Proteinopathy, Amyotrophic Lateral Sclerosis, Frontotemporal Dementia, Alzheimer's Disease, Chronic Traumatic Encephalopathy, Traumatic Brain Injury, Cortical Basal Degeneration, and Huntington's Disease, wherein the polynucleotide comprises SEQ ID NO: 97.

5. The method of claim 4, wherein the neurodegenerative disease is Amyotrophic Lateral Sclerosis or Frontotemporal Dementia.

6. The method of claim 4, wherein the method reduces a rate of aggregation of the nucleic acid-binding polypeptide or an amount of aggregate of the nucleic acid-binding polypeptide in the neuronal cell compared to an untreated control.

7. A method to inhibit nucleic acid-binding polypeptide aggregation in a neuronal cell comprising contacting the neuronal cell with a composition comprising a polynucleotide that binds the nucleic acid-binding polypeptide, wherein the nucleic acid-binding polypeptide aggregates in the neuronal cell and is associated with a neurodegenerative disease, wherein the nucleic acid-binding polypeptide is FUS, and wherein the neurodegenerative disease is selected from Multisystem Proteinopathy, Amyotrophic Lateral Sclerosis, Frontotemporal Dementia, Alzheimer's Disease, Chronic Traumatic Encephalopathy, Traumatic Brain Injury, Cortical Basal Degeneration, and Huntington's Disease, wherein the polynucleotide comprises SEQ ID NO: 98.

8. The method of claim 7, wherein the neurodegenerative disease is Amyotrophic Lateral Sclerosis or Frontotemporal Dementia.

9. The method of claim 7, wherein the method reduces a rate of aggregation of the nucleic acid-binding polypeptide or an amount of aggregate of the nucleic acid-binding polypeptide in the neuronal cell compared to an untreated control.

10. A method to inhibit nucleic acid-binding polypeptide aggregation in a neuronal cell comprising contacting the neuronal cell with a composition comprising a polynucleotide that binds the nucleic acid-binding polypeptide, wherein the nucleic acid-binding polypeptide aggregates in the neuronal cell and is associated with a neurodegenerative disease, wherein the nucleic acid-binding polypeptide is FUS, and wherein the neurodegenerative disease is selected from Multisystem Proteinopathy, Amyotrophic Lateral Sclerosis, Frontotemporal Dementia, Alzheimer's Disease, Chronic Traumatic Encephalopathy, Traumatic Brain Injury, Cortical Basal Degeneration, and Huntington's Disease, wherein the polynucleotide comprises SEQ ID NO: 99.

11. The method of claim 10, wherein the neurodegenerative disease is Amyotrophic Lateral Sclerosis or Frontotemporal Dementia.

12. The method of claim 10, wherein the method reduces a rate of aggregation of the nucleic acid-binding polypeptide or an amount of aggregate of the nucleic acid-binding polypeptide in the neuronal cell compared to an untreated control.

13. A method to inhibit nucleic acid-binding polypeptide aggregation in a neuronal cell comprising contacting the neuronal cell with a composition comprising a polynucleotide that binds the nucleic acid-binding polypeptide, wherein the nucleic acid-binding polypeptide aggregates in the neuronal cell and is associated with a neurodegenerative disease, wherein the nucleic acid-binding polypeptide is FUS, and wherein the neurodegenerative disease is selected from Multisystem Proteinopathy, Amyotrophic Lateral Sclerosis, Frontotemporal Dementia, Alzheimer's Disease, Chronic Traumatic Encephalopathy, Traumatic Brain Injury, Cortical Basal Degeneration, and Huntington's Disease, wherein the polynucleotide comprises SEQ ID NO: 100.

14. The method of claim 13, wherein the neurodegenerative disease is Amyotrophic Lateral Sclerosis or Frontotemporal Dementia.

15. The method of claim 13, wherein the method reduces a rate of aggregation of the nucleic acid-binding polypeptide or an amount of aggregate of the nucleic acid-binding polypeptide in the neuronal cell compared to an untreated control.

16. A method to inhibit nucleic acid-binding polypeptide aggregation in a neuronal cell comprising contacting the neuronal cell with a composition comprising a polynucleotide that binds the nucleic acid-binding polypeptide, wherein the nucleic acid-binding polypeptide aggregates in the neuronal cell and is associated with a neurodegenerative disease, wherein the nucleic acid-binding polypeptide is FUS, and wherein the neurodegenerative disease is selected from Multisystem Proteinopathy, Amyotrophic Lateral Sclerosis, Frontotemporal Dementia, Alzheimer's Disease, Chronic Traumatic Encephalopathy, Traumatic Brain Injury, Cortical Basal Degeneration, and Huntington's Disease, wherein the polynucleotide comprises SEQ ID NO: 101.

17. The method of claim 16, wherein the neurodegenerative disease is Amyotrophic Lateral Sclerosis or Frontotemporal Dementia.

18. The method of claim 16, wherein the method reduces a rate of aggregation of the nucleic acid-binding polypeptide or an amount of aggregate of the nucleic acid-binding polypeptide in the neuronal cell compared to an untreated control.

* * * * *

SEQUENCE LISTING

```
<160> NUMBER OF SEQ ID NOS: 124

<210> SEQ ID NO 1
<211> LENGTH: 414
<212> TYPE: PRT
<213> ORGANISM: Homo sapiens

<400> SEQUENCE: 1

Met Ser Glu Tyr Ile Arg Val Thr Glu Asp Glu Asn Asp Glu Pro Ile
1               5                   10                  15

Glu Ile Pro Ser Glu Asp Asp Gly Thr Val Leu Leu Ser Thr Val Thr
            20                  25                  30

Ala Gln Phe Pro Gly Ala Cys Gly Leu Arg Tyr Arg Asn Pro Val Ser
        35                  40                  45

Gln Cys Met Arg Gly Val Arg Leu Val Glu Gly Ile Leu His Ala Pro
    50                  55                  60

Asp Ala Gly Trp Gly Asn Leu Val Tyr Val Val Asn Tyr Pro Lys Asp
65                  70                  75                  80

Asn Lys Arg Lys Met Asp Glu Thr Asp Ala Ser Ser Ala Val Lys Val
                85                  90                  95

Lys Arg Ala Val Gln Lys Thr Ser Asp Leu Ile Val Leu Gly Leu Pro
            100                 105                 110

Trp Lys Thr Thr Glu Gln Asp Leu Lys Glu Tyr Phe Ser Thr Phe Gly
        115                 120                 125

Glu Val Leu Met Val Gln Val Lys Lys Asp Leu Lys Thr Gly His Ser
    130                 135                 140

Lys Gly Phe Gly Phe Val Arg Phe Thr Glu Tyr Glu Thr Gln Val Lys
145                 150                 155                 160

Val Met Ser Gln Arg His Met Ile Asp Gly Arg Trp Cys Asp Cys Lys
                165                 170                 175

Leu Pro Asn Ser Lys Gln Ser Gln Asp Glu Pro Leu Arg Ser Arg Lys
```

```
            180                 185                 190
    Val Phe Val Gly Arg Cys Thr Glu Asp Met Thr Glu Asp Glu Leu Arg
                    195                 200                 205
    Glu Phe Phe Ser Gln Tyr Gly Asp Val Met Asp Val Phe Ile Pro Lys
                    210                 215                 220
    Pro Phe Arg Ala Phe Ala Phe Val Thr Phe Ala Asp Asp Gln Ile Ala
    225                 230                 235                 240
    Gln Ser Leu Cys Gly Glu Asp Leu Ile Ile Lys Gly Ile Ser Val His
                    245                 250                 255
    Ile Ser Asn Ala Glu Pro Lys His Asn Ser Asn Arg Gln Leu Glu Arg
                    260                 265                 270
    Ser Gly Arg Phe Gly Gly Asn Pro Gly Gly Phe Gly Asn Gln Gly Gly
                    275                 280                 285
    Phe Gly Asn Ser Arg Gly Gly Gly Ala Gly Leu Gly Asn Asn Gln Gly
                    290                 295                 300
    Ser Asn Met Gly Gly Gly Met Asn Phe Gly Ala Phe Ser Ile Asn Pro
    305                 310                 315                 320
    Ala Met Met Ala Ala Ala Gln Ala Ala Leu Gln Ser Ser Trp Gly Met
                    325                 330                 335
    Met Gly Met Leu Ala Ser Gln Gln Asn Gln Ser Gly Pro Ser Gly Asn
                    340                 345                 350
    Asn Gln Asn Gln Gly Asn Met Gln Arg Glu Pro Asn Gln Ala Phe Gly
                    355                 360                 365
    Ser Gly Asn Asn Ser Tyr Ser Gly Ser Asn Ser Gly Ala Ala Ile Gly
                    370                 375                 380
    Trp Gly Ser Ala Ser Asn Ala Gly Ser Gly Ser Gly Phe Asn Gly Gly
    385                 390                 395                 400
    Phe Gly Ser Ser Met Asp Ser Lys Ser Ser Gly Trp Gly Met
                    405                 410

<210> SEQ ID NO 2
<211> LENGTH: 526
<212> TYPE: PRT
<213> ORGANISM: Homo sapiens

<400> SEQUENCE: 2

Met Ala Ser Asn Asp Tyr Thr Gln Gln Ala Thr Gln Ser Tyr Gly Ala
    1               5                   10                  15
    Tyr Pro Thr Gln Pro Gly Gln Gly Tyr Ser Gln Gln Ser Ser Gln Pro
                    20                  25                  30
    Tyr Gly Gln Gln Ser Tyr Ser Gly Tyr Ser Gln Ser Thr Asp Thr Ser
                    35                  40                  45
    Gly Tyr Gly Gln Ser Ser Tyr Ser Ser Tyr Gly Gln Ser Gln Asn Thr
    50                  55                  60
    Gly Tyr Gly Thr Gln Ser Thr Pro Gln Gly Tyr Gly Ser Thr Gly Gly
    65                  70                  75                  80
    Tyr Gly Ser Ser Gln Ser Ser Gln Ser Ser Tyr Gly Gln Gln Ser Ser
                    85                  90                  95
    Tyr Pro Gly Tyr Gly Gln Gln Pro Ala Pro Ser Ser Thr Ser Gly Ser
                    100                 105                 110
    Tyr Gly Ser Ser Ser Gln Ser Ser Ser Tyr Gly Gln Pro Gln Ser Gly
                    115                 120                 125
    Ser Tyr Ser Gln Gln Pro Ser Tyr Gly Gly Gln Gln Ser Ser Tyr Gly
                    130                 135                 140
```

Gln Gln Gln Ser Tyr Asn Pro Pro Gln Gly Tyr Gly Gln Gln Asn Gln
145                 150                 155                 160

Tyr Asn Ser Ser Ser Gly Gly Gly Gly Gly Gly Gly Gly Gly Gly Asn
                165                 170                 175

Tyr Gly Gln Asp Gln Ser Ser Met Ser Ser Gly Gly Gly Ser Gly Gly
                180                 185                 190

Gly Tyr Gly Asn Gln Asp Gln Ser Gly Gly Gly Gly Ser Gly Gly Tyr
                195                 200                 205

Gly Gln Gln Asp Arg Gly Gly Arg Gly Arg Gly Gly Ser Gly Gly Gly
210                 215                 220

Gly Gly Gly Gly Gly Gly Gly Tyr Asn Arg Ser Ser Gly Gly Tyr Glu
225                 230                 235                 240

Pro Arg Gly Arg Gly Gly Gly Arg Gly Gly Arg Gly Gly Met Gly Gly
                245                 250                 255

Ser Asp Arg Gly Gly Phe Asn Lys Phe Gly Gly Pro Arg Asp Gln Gly
                260                 265                 270

Ser Arg His Asp Ser Glu Gln Asp Asn Ser Asp Asn Asn Thr Ile Phe
                275                 280                 285

Val Gln Gly Leu Gly Glu Asn Val Thr Ile Glu Ser Val Ala Asp Tyr
290                 295                 300

Phe Lys Gln Ile Gly Ile Ile Lys Thr Asn Lys Lys Thr Gly Gln Pro
305                 310                 315                 320

Met Ile Asn Leu Tyr Thr Asp Arg Glu Thr Gly Lys Leu Lys Gly Glu
                325                 330                 335

Ala Thr Val Ser Phe Asp Asp Pro Pro Ser Ala Lys Ala Ala Ile Asp
                340                 345                 350

Trp Phe Asp Gly Lys Glu Phe Ser Gly Asn Pro Ile Lys Val Ser Phe
                355                 360                 365

Ala Thr Arg Arg Ala Asp Phe Asn Arg Gly Gly Gly Asn Gly Arg Gly
                370                 375                 380

Gly Arg Gly Arg Gly Gly Pro Met Gly Arg Gly Gly Tyr Gly Gly Gly
385                 390                 395                 400

Gly Ser Gly Gly Gly Gly Arg Gly Gly Phe Pro Ser Gly Gly Gly Gly
                405                 410                 415

Gly Gly Gly Gln Gln Arg Ala Gly Asp Trp Lys Cys Pro Asn Pro Thr
                420                 425                 430

Cys Glu Asn Met Asn Phe Ser Trp Arg Asn Glu Cys Asn Gln Cys Lys
                435                 440                 445

Ala Pro Lys Pro Asp Gly Pro Gly Gly Pro Gly Gly Ser His Met
                450                 455                 460

Gly Gly Asn Tyr Gly Asp Asp Arg Arg Gly Gly Arg Gly Gly Tyr Asp
465                 470                 475                 480

Arg Gly Gly Tyr Arg Gly Arg Gly Gly Asp Arg Gly Gly Phe Arg Gly
                485                 490                 495

Gly Arg Gly Gly Gly Asp Arg Gly Gly Phe Gly Pro Gly Lys Met Asp
                500                 505                 510

Ser Arg Gly Glu His Arg Gln Asp Arg Arg Glu Arg Pro Tyr
                515                 520                 525

<210> SEQ ID NO 3
<211> LENGTH: 758
<212> TYPE: PRT
<213> ORGANISM: Homo sapiens

<400> SEQUENCE: 3

```
Met Ala Glu Pro Arg Gln Phe Glu Val Met Glu Asp His Ala Gly
1               5                   10                  15

Thr Tyr Gly Leu Gly Asp Arg Lys Asp Gln Gly Gly Tyr Thr Met His
            20                  25                  30

Gln Asp Gln Glu Gly Asp Thr Asp Ala Gly Leu Lys Glu Ser Pro Leu
        35                  40                  45

Gln Thr Pro Thr Glu Asp Gly Ser Glu Glu Pro Gly Ser Glu Thr Ser
    50                  55                  60

Asp Ala Lys Ser Thr Pro Thr Ala Glu Asp Val Thr Ala Pro Leu Val
65                  70                  75                  80

Asp Glu Gly Ala Pro Gly Lys Gln Ala Ala Gln Pro His Thr Glu
                85                  90                  95

Ile Pro Glu Gly Thr Thr Ala Glu Glu Ala Gly Ile Gly Asp Thr Pro
                100                 105                 110

Ser Leu Glu Asp Glu Ala Ala Gly His Val Thr Gln Glu Pro Glu Ser
            115                 120                 125

Gly Lys Val Val Gln Glu Gly Phe Leu Arg Glu Pro Gly Pro Pro Gly
    130                 135                 140

Leu Ser His Gln Leu Met Ser Gly Met Pro Gly Ala Pro Leu Leu Pro
145                 150                 155                 160

Glu Gly Pro Arg Glu Ala Thr Arg Gln Pro Ser Gly Thr Gly Pro Glu
                165                 170                 175

Asp Thr Glu Gly Gly Arg His Ala Pro Glu Leu Leu Lys His Gln Leu
            180                 185                 190

Leu Gly Asp Leu His Gln Glu Gly Pro Pro Leu Lys Gly Ala Gly Gly
        195                 200                 205

Lys Glu Arg Pro Gly Ser Lys Glu Glu Val Asp Glu Asp Arg Asp Val
210                 215                 220

Asp Glu Ser Ser Pro Gln Asp Ser Pro Ser Lys Ala Ser Pro Ala
225                 230                 235                 240

Gln Asp Gly Arg Pro Pro Gln Thr Ala Ala Arg Glu Ala Thr Ser Ile
                245                 250                 255

Pro Gly Phe Pro Ala Glu Gly Ala Ile Pro Leu Pro Val Asp Phe Leu
            260                 265                 270

Ser Lys Val Ser Thr Glu Ile Pro Ala Ser Glu Pro Asp Gly Pro Ser
        275                 280                 285

Val Gly Arg Ala Lys Gly Gln Asp Ala Pro Leu Glu Phe Thr Phe His
    290                 295                 300

Val Glu Ile Thr Pro Asn Val Gln Lys Glu Gln Ala His Ser Glu Glu
305                 310                 315                 320

His Leu Gly Arg Ala Ala Phe Pro Gly Ala Pro Gly Glu Gly Pro Glu
                325                 330                 335

Ala Arg Gly Pro Ser Leu Gly Glu Asp Thr Lys Glu Ala Asp Leu Pro
            340                 345                 350

Glu Pro Ser Glu Lys Gln Pro Ala Ala Ala Pro Arg Gly Lys Pro Val
        355                 360                 365

Ser Arg Val Pro Gln Leu Lys Ala Arg Met Val Ser Lys Ser Lys Asp
    370                 375                 380

Gly Thr Gly Ser Asp Asp Lys Lys Ala Lys Thr Ser Thr Arg Ser Ser
385                 390                 395                 400

Ala Lys Thr Leu Lys Asn Arg Pro Cys Leu Ser Pro Lys His Pro Thr
                405                 410                 415
```

-continued

```
Pro Gly Ser Ser Asp Pro Leu Ile Gln Pro Ser Pro Ala Val Cys
            420                 425                 430

Pro Glu Pro Pro Ser Ser Pro Lys Tyr Val Ser Val Thr Ser Arg
        435                 440                 445

Thr Gly Ser Ser Gly Ala Lys Glu Met Lys Leu Lys Gly Ala Asp Gly
    450                 455                 460

Lys Thr Lys Ile Ala Thr Pro Arg Gly Ala Ala Pro Pro Gly Gln Lys
465                 470                 475                 480

Gly Gln Ala Asn Ala Thr Arg Ile Pro Ala Lys Thr Pro Pro Ala Pro
                485                 490                 495

Lys Thr Pro Pro Ser Ser Gly Glu Pro Pro Lys Ser Gly Asp Arg Ser
            500                 505                 510

Gly Tyr Ser Ser Pro Gly Ser Pro Gly Thr Pro Gly Ser Arg Ser Arg
        515                 520                 525

Thr Pro Ser Leu Pro Thr Pro Pro Thr Arg Glu Pro Lys Lys Val Ala
    530                 535                 540

Val Val Arg Thr Pro Pro Lys Ser Pro Ser Ala Lys Ser Arg Leu
545                 550                 555                 560

Gln Thr Ala Pro Val Pro Met Pro Asp Leu Lys Asn Val Lys Ser Lys
                565                 570                 575

Ile Gly Ser Thr Glu Asn Leu Lys His Gln Pro Gly Gly Gly Lys Val
            580                 585                 590

Gln Ile Ile Asn Lys Lys Leu Asp Leu Ser Asn Val Gln Ser Lys Cys
        595                 600                 605

Gly Ser Lys Asp Asn Ile Lys His Val Pro Gly Gly Gly Ser Val Gln
    610                 615                 620

Ile Val Tyr Lys Pro Val Asp Leu Ser Lys Val Thr Ser Lys Cys Gly
625                 630                 635                 640

Ser Leu Gly Asn Ile His His Lys Pro Gly Gly Gln Val Glu Val
                645                 650                 655

Lys Ser Glu Lys Leu Asp Phe Lys Asp Arg Val Gln Ser Lys Ile Gly
            660                 665                 670

Ser Leu Asp Asn Ile Thr His Val Pro Gly Gly Gly Asn Lys Lys Ile
        675                 680                 685

Glu Thr His Lys Leu Thr Phe Arg Glu Asn Ala Lys Ala Lys Thr Asp
    690                 695                 700

His Gly Ala Glu Ile Val Tyr Lys Ser Pro Val Val Ser Gly Asp Thr
705                 710                 715                 720

Ser Pro Arg His Leu Ser Asn Val Ser Ser Thr Gly Ser Ile Asp Met
                725                 730                 735

Val Asp Ser Pro Gln Leu Ala Thr Leu Ala Asp Glu Val Ser Ala Ser
            740                 745                 750

Leu Ala Lys Gln Gly Leu
        755
```

<210> SEQ ID NO 4
<211> LENGTH: 3789
<212> TYPE: DNA
<213> ORGANISM: Artificial Sequence
<220> FEATURE:
<223> OTHER INFORMATION: Synthetic construct

<400> SEQUENCE: 4

```
atgaagatgg acaaaaagac tatagtttgg tttagaagag acctaaggat tgaggataat      60
cctgcattag cagcagctgc tcacgaagga tctgttttc ctgtcttcat tggtgtcct      120
```

```
gaagaagaag gacagttttta tcctggaaga gcttcaagat ggtggatgaa acaatcactt    180
gctcacttat ctcaatcctt gaaggctctt ggatctgacc tcactttaat caaaacccac    240
aacacgattt cagcgatctt ggattgtatc cgcgttaccg gtgctacaaa agtcgtcttt    300
aaccacctct atgatcctgt ttcgttagtt cgggaccata ccgtaaagga gaagctggtg    360
gaacgtggga tctctgtgca aagctacaat ggagatctat tgtatgaacc gtgggagata    420
tactgcgaaa agggcaaacc ttttacgagt ttcaattctt actggaagaa atgcttagat    480
atgtcgattg aatccgttat gcttcctcct ccttggcggt tgatgccaat aactgcagcg    540
gctgaagcga tttgggcgtg ttcgattgaa gaactagggc tggagaatga ggccgagaaa    600
ccgagcaatg cgttgttaac tagagcttgg tctccaggat ggagcaatgc tgataagtta    660
ctaaatgagt tcatcgagaa gcagttgata gattatgcaa agaacagcaa gaaagttgtt    720
gggaattcta cttcactact ttctccgtat ctccatttcg gggaaataag cgtcagacac    780
gttttccagt gtgcccggat gaaacaaatt atatgggcaa gagataagaa cagtgaagga    840
gaagaaagtg cagatctttt tcttagggga atcggtttaa gagagtattc tcggtatata    900
tgtttcaact tcccgtttac tcacgagcaa tcgttgttga gtcatcttcg gttttttccct   960 tgggatgctg atgttgataa gttcaaggcc tggagacaag gcaggaccgg ttatccgttg   1020
gtggatgccg gaatgagaga gctttgggct accggatgga tgcataacag aataagagtg   1080
attgtttcaa gctttgctgt gaagtttctt ctccttccat ggaaatgggg aatgaagtat   1140
ttctgggata cacttttgga tgctgatttg gaatgtgaca tccttggctg gcagtatatc   1200
tctgggagta tccccgatgg ccacgagctt gatcgcttgg acaatcccgc gttacaaggc   1260
gccaaatatg acccagaagg tgagtacata aggcaatggc ttcccgagct tgcgagattg   1320
ccaactgaat ggatccatca tccatgggac gctcctttaa ccgtactcaa agcttctggt   1380
gtggaactcg gaacaaacta tgcgaaaccc attgtagaca tcgacacagc tcgtgagcta   1440
ctagctaaag ctatttcaag aacccgtgga gcacagatca tgatcggagc agcagccctc   1500
atggtgagca agggcgagga ggataacatg gccatcatca aggagttcat gcgcttcaag   1560
gtgcacatgg agggctccgt gaacggccac gagttcgaga tcgagggcga gggcgagggc   1620
cgcccctacg agggcaccca gaccgccaag ctgaaggtga ccaagggtgg ccccctgccc   1680
ttcgcctggg acatcctgtc ccctcagttc atgtacggct ccaaggccta cgtgaagcac   1740
cccgccgaca tccccgacta cttgaagctg tccttccccg agggcttcaa gtgggagcgc   1800
gtgatgaact tcgaggacgg cggcgtggtg accgtgaccc aggactcctc cctgcaggac   1860
ggcgagttca tctacaaggt gaagctgcgc ggcaccaact tcccctccga cggccccgta   1920
atgcagaaga gaccatgggc tgggaggcc tcctccgagc ggatgtaccc cgaggacggc   1980
gccctgaagg gcgagatcaa gcagaggctg aagctgaagg acggcggcca ctacgacgct   2040
gaggtcaaga ccacctacaa ggccaagaag cccgtgcagc tgcccggcgc ctacaacgtc   2100
aacatcaagt tggacatcac ctcccacaac gaggactaca ccatcgtgga acagtacgaa   2160
cgcgccgagg ccgccactc caccggcggc atggacgagc tgtacaagat ggcctcaaac   2220
gattataccc aacaagcaac ccaaagctat ggggcctacc ccacccagcc cgggcagggc   2280
tattcccagc agagcagtca gccctacgga cagcagagtt acagtggtta tagccagtcc   2340
acggacactt caggctatgg ccagagcagc tattcttctt atggccagag ccagaacaca   2400
ggctatggaa ctcagtcaac tcccccaggga tatggctcga ctggcggcta tggtagtagc   2460
```

-continued

```
cagagctccc aatcgtctta cgggcagcag tcctcctatc ctggctatgg ccagcagcca    2520
gctcccagca gcacctcggg aagttacggt agcagttctc agagcagcag ctatgggcag    2580
ccccagagtg ggagctacag ccagcagcct agctatggtg gacagcagca aagctatgga    2640
cagcagcaaa gctataatcc ccctcagggc tatggacagc agaaccagta caacagcagc    2700
agtggtggtg gaggtggagg tggaggtgga ggtaactatg ccaagatca atcctccatg    2760 agtagtggtg gtggcagtgg tggcggttat ggcaatcaag accagagtgg tgaaggtggc    2820
agcggtggct atggacagca ggaccgtgga ggccgcggca ggggtggcag tggtggcggc    2880
ggcggcggcg gcggtggtgg ttacaaccgc agcagtggtg gctatgaacc cagaggtcgt    2940
ggaggtggcc gtggaggcag aggtggcatg ggcggaagtg accgtggtgg cttcaataaa    3000
tttggtggcc ctcgggacca aggatcacgt catgactccg aacaggataa ttcagacaac    3060
aacaccatct ttgtgcaagg cctgggtgag aatgttacaa ttgagtctgt ggctgattac    3120
ttcaagcaga ttggtattat taagacaaac aagaaaacgg gacagcccat gattaatttg    3180
tacacagaca gggaaactgg caagctgaag ggagaggcaa cggtctcttt tgatgaccca    3240
ccttcagcta aagcagctat tgactggttt gatggtaaag aattctccgg aaatcctatc    3300
aaggtctcat ttgctactcg ccgggcagac tttaatcggg tggtggcaa tggtcgtgga    3360 ggccgagggc gaggaggacc catgggccgt ggaggctatg gaggtggtgg cagtggtggt    3420
ggtggccgag gaggatttcc cagtggaggt ggtggcggtg gaggacagca gcgagctggt    3480
gactggaagt gtcctaatcc cacctgtgag aatatgaact tctcttggag gaatgaatgc    3540
aaccagtgta aggcccctaa accagatggc ccaggagggg gaccaggtgg ctctcacatg    3600
gggggtaact acggggatga tcgtcgtggt ggcagaggag gctatgatcg aggcggctac    3660
cggggccgcg gcggggaccg tggaggcttc cgaggggcc gggtggtgg ggacagaggt    3720 ggctttggcc ctggcaagat ggattccagg ggtgagcaca gacaggatcg caggagagg    3780 ccgtattaa                                                            3789
```

<210> SEQ ID NO 5
<211> LENGTH: 1262
<212> TYPE: PRT
<213> ORGANISM: Artificial Sequence
<220> FEATURE:
<223> OTHER INFORMATION: Synthetic construct

<400> SEQUENCE: 5

```
Met Lys Met Asp Lys Lys Thr Ile Val Trp Phe Arg Arg Asp Leu Arg
1               5                   10                  15

Ile Glu Asp Asn Pro Ala Leu Ala Ala Ala His Glu Gly Ser Val
            20                  25                  30

Phe Pro Val Phe Ile Trp Cys Pro Glu Glu Gly Gln Phe Tyr Pro
        35                  40                  45

Gly Arg Ala Ser Arg Trp Trp Met Lys Gln Ser Leu Ala His Leu Ser
    50                  55                  60

Gln Ser Leu Lys Ala Leu Gly Ser Asp Leu Thr Leu Ile Lys Thr His
65                  70                  75                  80

Asn Thr Ile Ser Ala Ile Leu Asp Cys Ile Arg Val Thr Gly Ala Thr
                85                  90                  95

Lys Val Val Phe Asn His Leu Tyr Asp Pro Val Ser Leu Val Arg Asp
            100                 105                 110

His Thr Val Lys Glu Lys Leu Val Glu Arg Gly Ile Ser Val Gln Ser
        115                 120                 125
```

-continued

```
Tyr Asn Gly Asp Leu Leu Tyr Glu Pro Trp Glu Ile Tyr Cys Glu Lys
            130                 135                 140

Gly Lys Pro Phe Thr Ser Phe Asn Ser Tyr Trp Lys Lys Cys Leu Asp
145                 150                 155                 160

Met Ser Ile Glu Ser Val Met Leu Pro Pro Trp Arg Leu Met Pro
                165                 170                 175

Ile Thr Ala Ala Ala Glu Ala Ile Trp Ala Cys Ser Ile Glu Glu Leu
                180                 185                 190

Gly Leu Glu Asn Glu Ala Glu Lys Pro Ser Asn Ala Leu Leu Thr Arg
            195                 200                 205

Ala Trp Ser Pro Gly Trp Ser Asn Ala Asp Lys Leu Leu Asn Glu Phe
            210                 215                 220

Ile Glu Lys Gln Leu Ile Asp Tyr Ala Lys Asn Ser Lys Lys Val Val
225                 230                 235                 240

Gly Asn Ser Thr Ser Leu Leu Ser Pro Tyr Leu His Phe Gly Glu Ile
                245                 250                 255

Ser Val Arg His Val Phe Gln Cys Ala Arg Met Lys Gln Ile Ile Trp
            260                 265                 270

Ala Arg Asp Lys Asn Ser Glu Gly Glu Ser Ala Asp Leu Phe Leu
            275                 280                 285

Arg Gly Ile Gly Leu Arg Glu Tyr Ser Arg Tyr Ile Cys Phe Asn Phe
290                 295                 300

Pro Phe Thr His Glu Gln Ser Leu Leu Ser His Leu Arg Phe Phe Pro
305                 310                 315                 320

Trp Asp Ala Asp Val Asp Lys Phe Lys Ala Trp Arg Gln Gly Arg Thr
                325                 330                 335

Gly Tyr Pro Leu Val Asp Ala Gly Met Arg Glu Leu Trp Ala Thr Gly
                340                 345                 350

Trp Met His Asn Arg Ile Arg Val Ile Val Ser Ser Phe Ala Val Lys
            355                 360                 365

Phe Leu Leu Leu Pro Trp Lys Trp Gly Met Lys Tyr Phe Trp Asp Thr
370                 375                 380

Leu Leu Asp Ala Asp Leu Glu Cys Asp Ile Leu Gly Trp Gln Tyr Ile
385                 390                 395                 400

Ser Gly Ser Ile Pro Asp Gly His Glu Leu Asp Arg Leu Asp Asn Pro
                405                 410                 415

Ala Leu Gln Gly Ala Lys Tyr Asp Pro Glu Gly Glu Tyr Ile Arg Gln
            420                 425                 430

Trp Leu Pro Glu Leu Ala Arg Leu Pro Thr Glu Trp Ile His His Pro
            435                 440                 445

Trp Asp Ala Pro Leu Thr Val Leu Lys Ala Ser Gly Val Glu Leu Gly
450                 455                 460

Thr Asn Tyr Ala Lys Pro Ile Val Asp Ile Asp Thr Ala Arg Glu Leu
465                 470                 475                 480

Leu Ala Lys Ala Ile Ser Arg Thr Arg Gly Ala Gln Ile Met Ile Gly
                485                 490                 495

Ala Ala Ala Leu Met Val Ser Lys Gly Glu Glu Asp Asn Met Ala Ile
                500                 505                 510

Ile Lys Glu Phe Met Arg Phe Lys Val His Met Glu Gly Ser Val Asn
            515                 520                 525

Gly His Glu Phe Glu Ile Glu Gly Glu Gly Glu Gly Arg Pro Tyr Glu
530                 535                 540
```

```
Gly Thr Gln Thr Ala Lys Leu Lys Val Thr Lys Gly Gly Pro Leu Pro
545                 550                 555                 560

Phe Ala Trp Asp Ile Leu Ser Pro Gln Phe Met Tyr Gly Ser Lys Ala
                565                 570                 575

Tyr Val Lys His Pro Ala Asp Ile Pro Asp Tyr Leu Lys Leu Ser Phe
            580                 585                 590

Pro Glu Gly Phe Lys Trp Glu Arg Val Met Asn Phe Glu Asp Gly Gly
        595                 600                 605

Val Val Thr Val Thr Gln Asp Ser Ser Leu Gln Asp Gly Glu Phe Ile
    610                 615                 620

Tyr Lys Val Lys Leu Arg Gly Thr Asn Phe Pro Ser Asp Gly Pro Val
625                 630                 635                 640

Met Gln Lys Lys Thr Met Gly Trp Glu Ala Ser Ser Glu Arg Met Tyr
                645                 650                 655

Pro Glu Asp Gly Ala Leu Lys Gly Glu Ile Lys Gln Arg Leu Lys Leu
            660                 665                 670

Lys Asp Gly Gly His Tyr Asp Ala Glu Val Lys Thr Thr Tyr Lys Ala
        675                 680                 685

Lys Lys Pro Val Gln Leu Pro Gly Ala Tyr Asn Val Asn Ile Lys Leu
    690                 695                 700

Asp Ile Thr Ser His Asn Glu Asp Tyr Thr Ile Val Glu Gln Tyr Glu
705                 710                 715                 720

Arg Ala Glu Gly Arg His Ser Thr Gly Gly Met Asp Glu Leu Tyr Lys
                725                 730                 735

Met Ala Ser Asn Asp Tyr Thr Gln Gln Ala Thr Gln Ser Tyr Gly Ala
            740                 745                 750

Tyr Pro Thr Gln Pro Gly Gln Gly Tyr Ser Gln Gln Ser Ser Gln Pro
    755                 760                 765

Tyr Gly Gln Gln Ser Tyr Ser Gly Tyr Ser Gln Ser Thr Asp Thr Ser
    770                 775                 780

Gly Tyr Gly Gln Ser Ser Tyr Ser Ser Tyr Gly Gln Ser Gln Asn Thr
785                 790                 795                 800

Gly Tyr Gly Thr Gln Ser Thr Pro Gln Gly Tyr Gly Ser Thr Gly Gly
                805                 810                 815

Tyr Gly Ser Ser Gln Ser Ser Gln Ser Ser Tyr Gly Gln Gln Ser Ser
            820                 825                 830

Tyr Pro Gly Tyr Gly Gln Gln Pro Ala Pro Ser Ser Thr Ser Gly Ser
    835                 840                 845

Tyr Gly Ser Ser Gln Ser Ser Ser Tyr Gly Gln Pro Gln Ser Gly Ser
    850                 855                 860

Ser Tyr Ser Gln Gln Pro Ser Tyr Gly Gly Gln Gln Ser Ser Tyr Gly
865                 870                 875                 880

Gln Gln Gln Ser Tyr Asn Pro Pro Gln Gly Tyr Gly Gln Gln Asn Gln
                885                 890                 895

Tyr Asn Ser Ser Ser Gly Gly Gly Gly Gly Gly Gly Gly Gly Gly Asn
            900                 905                 910

Tyr Gly Gln Asp Gln Ser Ser Met Ser Ser Gly Gly Gly Ser Gly Gly
        915                 920                 925

Gly Tyr Gly Asn Gln Asp Gln Ser Gly Gly Gly Gly Ser Gly Gly Tyr
    930                 935                 940

Gly Gln Gln Asp Arg Gly Gly Arg Gly Arg Gly Gly Ser Gly Gly Gly
945                 950                 955                 960

Gly Gly Gly Gly Gly Gly Gly Tyr Asn Arg Ser Ser Gly Gly Tyr Glu
```

```
              965                 970                 975
Pro Arg Gly Arg Gly Gly Arg Gly Gly Arg Gly Gly Met Gly Gly
                980                 985                 990
Ser Asp Arg Gly Gly Phe Asn Lys  Phe Gly Gly Pro Arg  Asp Gln Gly
             995                 1000                 1005
Ser Arg  His Asp Ser Glu Gln  Asp Asn Ser Asp Asn  Asn Thr Ile
     1010                 1015                 1020
Phe Val  Gln Gly Leu Gly Glu  Asn Val Thr Ile Glu  Ser Val Ala
     1025                 1030                 1035
Asp Tyr  Phe Lys Gln Ile Gly  Ile Ile Lys Thr Asn  Lys Lys Thr
     1040                 1045                 1050
Gly Gln  Pro Met Ile Asn Leu  Tyr Thr Asp Arg Glu   Thr Gly Lys
     1055                 1060                 1065
Leu Lys  Gly Glu Ala Thr Val  Ser Phe Asp Pro  Pro Ser Ala
     1070                 1075                 1080
Lys Ala  Ala Ile Asp Trp Phe  Asp Gly Lys Glu Phe  Ser Gly Asn
     1085                 1090                 1095
Pro Ile  Lys Val Ser Phe Ala  Thr Arg Arg Ala Asp  Phe Asn Arg
     1100                 1105                 1110
Gly Gly  Gly Asn Gly Arg Gly  Gly Arg Gly Arg Gly  Gly Pro Met
     1115                 1120                 1125
Gly Arg  Gly Gly Tyr Gly Gly  Gly Gly Ser Gly Gly  Gly Gly Arg
     1130                 1135                 1140
Gly Gly  Phe Pro Ser Gly Gly  Gly Gly Gly Gly  Gln Gln Arg
     1145                 1150                 1155
Ala Gly  Asp Trp Lys Cys Pro  Asn Pro Thr Cys Glu  Asn Met Asn
     1160                 1165                 1170
Phe Ser  Trp Arg Asn Glu Cys  Asn Gln Cys Lys Ala  Pro Lys Pro
     1175                 1180                 1185
Asp Gly  Pro Gly Gly Pro  Gly Gly Ser His Met  Gly Gly Asn
     1190                 1195                 1200
Tyr Gly  Asp Asp Arg Arg Gly  Gly Arg Gly Gly Tyr  Asp Arg Gly
     1205                 1210                 1215
Gly Tyr  Arg Gly Arg Gly Gly  Asp Arg Gly Gly Phe  Arg Gly Gly
     1220                 1225                 1230
Arg Gly  Gly Gly Asp Arg Gly  Gly Phe Gly Pro Gly  Lys Met Asp
     1235                 1240                 1245
Ser Arg  Gly Glu His Arg Gln  Asp Arg Arg Glu Arg  Pro Tyr
     1250                 1255                 1260

<210> SEQ ID NO 6
<211> LENGTH: 1770
<212> TYPE: DNA
<213> ORGANISM: Artificial Sequence
<220> FEATURE:
<223> OTHER INFORMATION: Synthetic construct

<400> SEQUENCE: 6
atgggtaagc ctatccctaa ccctctcctc ggtctcgatt caacaagttt gatgtctgaa      60
tatattcggg taaccgaaga tgagaacgat gagcccattg aaataccatc ggaagacgat     120
gggacggtgc tgctctccac ggttacagcc cagtttccag gggcgtgtgg gcttcgctac     180
aggaatccag tgtctcagtg tatgagaggt gtccggctgg tagaaggaat tctgcatgcc     240
ccagatgctg gctgggggaaa tctggtgtat gttgtcaact atccaaaaga taacaaaaga     300
```

```
aaaatggatg agacagatgc ttcatcagca gtgaaagtga aaagagcagt ccagaaaaca    360
tccgatttaa tagtgttggg tctcccatgg aaaacaaccg aacaggacct gaaagagtat    420
tttagtacct ttggagaagt tcttatggtg caggtcaaga aagatcttaa gactggtcat    480
tcaaaggggt ttggctttgt tcgttttacg gaatatgaaa cacaagtgaa agtaatgtca    540
cagcgacata tgatagatgg acgatggtgt gactgcaaac ttcctaattc taagcaaagc    600
caagatgagc ctttgagaag cagaaaagtg tttgtggggc gctgtacaga ggacatgact    660
gaggatgagc tgcgggagtt cttctctcag tacggggatg tgatggatgt cttcatcccc    720
aagccattca gggcctttgc ctttgttaca tttgcagatg atcagattgc gcagtctctt    780
tgtggagagg acttgatcat taaggaatc agcgttcata tatccaatgc cgaacctaag    840
cacaatagca atagacagtt agaaagaagt ggaagatttg gtggtaatcc aggtggcttt    900
gggaatcagg gtggatttgg taatagcaga gggggtggag ctggtttggg aaacaatcaa    960
ggtagtaata tgggtggtgg gatgaacttt ggtgcgttca gcattaatcc agccatgatg   1020
gctgccgccc aggcagcact acagagcagt tggggtatga tgggcatgtt agccagccag   1080
cagaaccagt caggcccatc gggtaataac caaaaccaag caacatgca gagggagcca   1140
aaccaggcct tcggttctgg aaataactct tatagtggct ctaattctgg tgcagcaatt   1200
ggttggggat cagcatccaa tgcagggtcg ggcagtggtt ttaatggagg ctttggctca   1260
agcatggatt ctaagtcttc tggctgggga atgggcagtt caggatcatc cgggcacact   1320
ctctacgccc caggcgggta cgatattatg ggctggctga tccagatcat gaacaggccc   1380
aatccccagg tcgagctggg acccgtggat acttcatgtg cactggtgct gtgcgacctg   1440
aagcagaagg ataccccgt ggtgtacgca tccgaagcgt tcctctacat gaccgggtac   1500
tcgaacgcgg aggtgctggg tcgcaactgc cggttcctgc agagccccga cggaatggtc   1560
aagcccaagt ccactcggaa atacgtggat tccaacacca tcaatactat gaggaaggct   1620
atcgatagga acgcggaagt ccaagtggag gtggtgaact tcaagaagaa tggccagaga   1680
ttcgtcaatt tccttaccat gatccctgtg cgcgatgaga ctggagagta ccgatactca   1740
atgggcttcc agtgtgaaac cgagtgttaa                                    1770
```

<210> SEQ ID NO 7
<211> LENGTH: 589
<212> TYPE: PRT
<213> ORGANISM: Artificial Sequence
<220> FEATURE:
<223> OTHER INFORMATION: Synthetic construct

<400> SEQUENCE: 7

```
Met Gly Lys Pro Ile Pro Asn Pro Leu Leu Gly Leu Asp Ser Thr Ser
1               5                   10                  15

Leu Met Ser Glu Tyr Ile Arg Val Thr Glu Asp Glu Asn Asp Glu Pro
            20                  25                  30

Ile Glu Ile Pro Ser Glu Asp Asp Gly Thr Val Leu Leu Ser Thr Val
        35                  40                  45

Thr Ala Gln Phe Pro Gly Ala Cys Gly Leu Arg Tyr Arg Asn Pro Val
    50                  55                  60

Ser Gln Cys Met Arg Gly Val Arg Leu Val Gly Ile Leu His Ala
65                  70                  75                  80

Pro Asp Ala Gly Trp Gly Asn Leu Val Tyr Val Asn Tyr Pro Lys
            85                  90                  95

Asp Asn Lys Arg Lys Met Asp Glu Thr Asp Ala Ser Ser Ala Val Lys
```

```
            100             105             110
Val Lys Arg Ala Val Gln Lys Thr Ser Asp Leu Ile Val Leu Gly Leu
            115             120             125

Pro Trp Lys Thr Thr Glu Gln Asp Leu Lys Glu Tyr Phe Ser Thr Phe
130             135             140

Gly Glu Val Leu Met Val Gln Val Lys Lys Asp Leu Lys Thr Gly His
145             150             155             160

Ser Lys Gly Phe Gly Phe Val Arg Phe Thr Glu Tyr Glu Thr Gln Val
                165             170             175

Lys Val Met Ser Gln Arg His Met Ile Asp Gly Arg Trp Cys Asp Cys
            180             185             190

Lys Leu Pro Asn Ser Lys Gln Ser Gln Asp Glu Pro Leu Arg Ser Arg
            195             200             205

Lys Val Phe Val Gly Arg Cys Thr Glu Asp Met Thr Glu Asp Glu Leu
            210             215             220

Arg Glu Phe Phe Ser Gln Tyr Gly Asp Val Met Asp Val Phe Ile Pro
225             230             235             240

Lys Pro Phe Arg Ala Phe Ala Phe Val Thr Phe Ala Asp Asp Gln Ile
                245             250             255

Ala Gln Ser Leu Cys Gly Glu Asp Leu Ile Ile Lys Gly Ile Ser Val
            260             265             270

His Ile Ser Asn Ala Glu Pro Lys His Asn Ser Asn Arg Gln Leu Glu
            275             280             285

Arg Ser Gly Arg Phe Gly Gly Asn Pro Gly Gly Phe Gly Asn Gln Gly
            290             295             300

Gly Phe Gly Asn Ser Arg Gly Gly Ala Gly Leu Gly Asn Asn Gln
305             310             315             320

Gly Ser Asn Met Gly Gly Met Asn Phe Gly Ala Phe Ser Ile Asn
                325             330             335

Pro Ala Met Met Ala Ala Ala Gln Ala Ala Leu Gln Ser Ser Trp Gly
            340             345             350

Met Met Gly Met Leu Ala Ser Gln Gln Asn Gln Ser Gly Pro Ser Gly
            355             360             365

Asn Asn Gln Asn Gln Gly Asn Met Gln Arg Glu Pro Asn Gln Ala Phe
            370             375             380

Gly Ser Gly Asn Asn Ser Tyr Ser Gly Ser Asn Ser Gly Ala Ala Ile
385             390             395             400

Gly Trp Gly Ser Ala Ser Asn Ala Gly Ser Gly Ser Gly Phe Asn Gly
                405             410             415

Gly Phe Gly Ser Ser Met Asp Ser Lys Ser Ser Gly Trp Gly Met Gly
                420             425             430

Ser Ser Gly Ser Ser Gly His Thr Leu Tyr Ala Pro Gly Gly Tyr Asp
            435             440             445

Ile Met Gly Trp Leu Ile Gln Ile Met Asn Arg Pro Asn Pro Gln Val
            450             455             460

Glu Leu Gly Pro Val Asp Thr Ser Cys Ala Leu Val Leu Cys Asp Leu
465             470             475             480

Lys Gln Lys Asp Thr Pro Val Val Tyr Ala Ser Glu Ala Phe Leu Tyr
                485             490             495

Met Thr Gly Tyr Ser Asn Ala Glu Val Leu Gly Arg Asn Cys Arg Phe
            500             505             510

Leu Gln Ser Pro Asp Gly Met Val Lys Pro Lys Ser Thr Arg Lys Tyr
            515             520             525
```

Val Asp Ser Asn Thr Ile Asn Thr Met Arg Lys Ala Ile Asp Arg Asn
           530                 535                 540

Ala Glu Val Gln Val Glu Val Val Asn Phe Lys Lys Asn Gly Gln Arg
545                 550                 555                 560

Phe Val Asn Phe Leu Thr Met Ile Pro Val Arg Asp Glu Thr Gly Glu
                565                 570                 575

Tyr Arg Tyr Ser Met Gly Phe Gln Cys Glu Thr Glu Cys
                580                 585

<210> SEQ ID NO 8
<211> LENGTH: 1824
<212> TYPE: DNA
<213> ORGANISM: Artificial Sequence
<220> FEATURE:
<223> OTHER INFORMATION: Synthetic construct

<400> SEQUENCE: 8

```
atgcacactc tctacgcccc aggcgggtac gatattatgg gctggctgat ccagatcatg    60
aacaggccca atccccaggt cgagctggga cccgtggata cttcatgtgc actggtgctg   120 tgtgaccttta gcagaagga cacccctgtg gtgtacgcct ccgaagcatt cctgtacatg   180
accgggtact cgaacgccga agtgctggga cggaactgcc gcttcctgca atccccggat   240
ggaatggtga agcctaagtc aacccgcaaa tacgtggact ccaacactat caacaccatg   300
cgcaaggcca ttgaccgcaa tgctgaggtg caagtggaag tggtgaactt caagaagaac   360
ggacagcgct tcgtcaactt cctgactatg attcccgtgc gggacgaaac cggcgaatac   420
cggtacagca tggggtttca gtgcgagact gagggctccg gcggcagcgg tggctccgga   480
ggcagcggag gtaccggcgg cagtggaggg tctggtggca gcggaatgtc tgaatatatt   540
cgggtaaccg aagatgagaa cgatgagccc attgaaatac atcggaaga cgatgggacg   600 gtgctgctct ccacggttac agcccagttt ccaggggcgt gtgggcttcg ctacaggaat   660
ccagtgtctc agtgtatgag aggtgtccgg ctggtagaag gaattctgca tgccccagat   720
gctggctggg gaaatctggt gtatgttgtc aactatccaa aagataacaa agaaaaatg    780 gatgagacag atgcttcatc agcagtgaaa gtgaaaagag cagtccagaa acatccgat    840 ttaatagtgt tgggtctccc atggaaaaca accgaacagg acctgaaaga gtattttagt   900
acctttggag aagttcttat ggtgcaggtc aagaaagatc ttaagactgg tcattcaaag   960
gggtttggct tgttcgtttt acggaatat gaaacacaag tgaaagtaat gtcacagcga   1020
catatgatag atggacgatg gtgtgactgc aaacttccta attctaagca aagccaagat   1080
gagcctttga aagcagaaa agtgtttgtg gggcgctgta cagaggacat gactgaggat   1140
gagctgcggg agttcttctc tcagtacggg atgtgatgg atgtcttcat ccccaagcca   1200
ttcagggcct ttgcctttgt tacatttgca gatgatcaga ttgcgcagtc tctttgtgga   1260
gaggacttga tcattaaagg aatcagcgtt catatatcca atgccgaacc taagcacaat   1320
agcaatagac agttagaaag aagtggaaga tttggtggta atccaggtgg ctttgggaat   1380
cagggtggat ttggtaatag cagaggggt ggagctggtt tgggaaacaa tcaaggtagt   1440
aatatgggtg gtgggatgaa ctttggtgcg ttcagcatta atccagccat gatggctgcc   1500
gcccaggcag cactacagag cagttgggggt atgatgggca tgttagccag ccagcagaac   1560
cagtcaggcc atcgggtaa taaccaaaac caaggcaaca tgcagaggga gccaaaccag   1620
gccttcggtt ctggaaataa ctcttatagt ggctctaatt ctggtgcagc aattggttgg   1680
```

```
ggatcagcat ccaatgcagg gtcgggcagt ggttttaatg gaggctttgg ctcaagcatg   1740
gattctaagt cttctggctg gggaatgctt ggtaccatgg gtaagcctat ccctaaccct   1800
ctcctcggtc tcgattcaac ataa                                          1824
```

<210> SEQ ID NO 9
<211> LENGTH: 607
<212> TYPE: PRT
<213> ORGANISM: Artificial Sequence
<220> FEATURE:
<223> OTHER INFORMATION: Synthetic construct

<400> SEQUENCE: 9

```
Met His Thr Leu Tyr Ala Pro Gly Gly Tyr Asp Ile Met Gly Trp Leu
1               5                   10                  15

Ile Gln Ile Met Asn Arg Pro Asn Pro Gln Val Glu Leu Gly Pro Val
            20                  25                  30

Asp Thr Ser Cys Ala Leu Val Leu Cys Asp Leu Lys Gln Lys Asp Thr
        35                  40                  45

Pro Val Val Tyr Ala Ser Glu Ala Phe Leu Tyr Met Thr Gly Tyr Ser
    50                  55                  60

Asn Ala Glu Val Leu Gly Arg Asn Cys Arg Phe Leu Gln Ser Pro Asp
65                  70                  75                  80

Gly Met Val Lys Pro Lys Ser Thr Arg Lys Tyr Val Asp Ser Asn Thr
                85                  90                  95

Ile Asn Thr Met Arg Lys Ala Ile Asp Arg Asn Ala Glu Val Gln Val
            100                 105                 110

Glu Val Val Asn Phe Lys Lys Asn Gly Gln Arg Phe Val Asn Phe Leu
        115                 120                 125

Thr Met Ile Pro Val Arg Asp Glu Thr Gly Glu Tyr Arg Tyr Ser Met
    130                 135                 140

Gly Phe Gln Cys Glu Thr Glu Gly Ser Gly Gly Ser Gly Gly Ser Gly
145                 150                 155                 160

Gly Ser Gly Gly Thr Gly Gly Ser Gly Gly Ser Gly Gly Ser Gly Met
                165                 170                 175

Ser Glu Tyr Ile Arg Val Thr Glu Asp Glu Asn Asp Glu Pro Ile Glu
            180                 185                 190

Ile Pro Ser Glu Asp Asp Gly Thr Val Leu Leu Ser Thr Val Thr Ala
        195                 200                 205

Gln Phe Pro Gly Ala Cys Gly Leu Arg Tyr Arg Asn Pro Val Ser Gln
    210                 215                 220

Cys Met Arg Gly Val Arg Leu Val Glu Gly Ile Leu His Ala Pro Asp
225                 230                 235                 240

Ala Gly Trp Gly Asn Leu Val Tyr Val Val Asn Tyr Pro Lys Asp Asn
                245                 250                 255

Lys Arg Lys Met Asp Glu Thr Asp Ala Ser Ser Ala Val Lys Val Lys
            260                 265                 270

Arg Ala Val Gln Lys Thr Ser Asp Leu Ile Val Leu Gly Leu Pro Trp
        275                 280                 285

Lys Thr Thr Glu Gln Asp Leu Lys Glu Tyr Phe Ser Thr Phe Gly Glu
    290                 295                 300

Val Leu Met Val Gln Val Lys Lys Asp Leu Lys Thr Gly His Ser Lys
305                 310                 315                 320

Gly Phe Gly Phe Val Arg Phe Thr Glu Tyr Glu Thr Gln Val Lys Val
                325                 330                 335
```

Met Ser Gln Arg His Met Ile Asp Gly Arg Trp Cys Asp Cys Lys Leu
            340                 345                 350

Pro Asn Ser Lys Gln Ser Gln Asp Glu Pro Leu Arg Ser Arg Lys Val
        355                 360                 365

Phe Val Gly Arg Cys Thr Glu Asp Met Thr Glu Asp Glu Leu Arg Glu
    370                 375                 380

Phe Phe Ser Gln Tyr Gly Asp Val Met Asp Val Phe Ile Pro Lys Pro
385                 390                 395                 400

Phe Arg Ala Phe Ala Phe Val Thr Phe Ala Asp Asp Gln Ile Ala Gln
                405                 410                 415

Ser Leu Cys Gly Glu Asp Leu Ile Ile Lys Gly Ile Ser Val His Ile
            420                 425                 430

Ser Asn Ala Glu Pro Lys His Asn Ser Asn Arg Gln Leu Glu Arg Ser
        435                 440                 445

Gly Arg Phe Gly Gly Asn Pro Gly Gly Phe Gly Asn Gln Gly Gly Phe
    450                 455                 460

Gly Asn Ser Arg Gly Gly Gly Ala Gly Leu Gly Asn Asn Gln Gly Ser
465                 470                 475                 480

Asn Met Gly Gly Gly Met Asn Phe Gly Ala Phe Ser Ile Asn Pro Ala
                485                 490                 495

Met Met Ala Ala Ala Gln Ala Ala Leu Gln Ser Ser Trp Gly Met Met
            500                 505                 510

Gly Met Leu Ala Ser Gln Gln Asn Gln Ser Gly Pro Ser Gly Asn Asn
        515                 520                 525

Gln Asn Gln Gly Asn Met Gln Arg Glu Pro Asn Gln Ala Phe Gly Ser
    530                 535                 540

Gly Asn Asn Ser Tyr Ser Gly Ser Asn Ser Gly Ala Ala Ile Gly Trp
545                 550                 555                 560

Gly Ser Ala Ser Asn Ala Gly Ser Gly Ser Gly Phe Asn Gly Phe
                565                 570                 575

Gly Ser Ser Met Asp Ser Lys Ser Ser Gly Trp Gly Met Leu Gly Thr
            580                 585                 590

Met Gly Lys Pro Ile Pro Asn Pro Leu Leu Gly Leu Asp Ser Thr
        595                 600                 605

<210> SEQ ID NO 10
<211> LENGTH: 24
<212> TYPE: RNA
<213> ORGANISM: Artificial Sequence
<220> FEATURE:
<223> OTHER INFORMATION: Synthetic construct

<400> SEQUENCE: 10
ugugugugug ugugugugug ugug                                          24

<210> SEQ ID NO 11
<211> LENGTH: 112
<212> TYPE: DNA
<213> ORGANISM: Artificial Sequence
<220> FEATURE:
<223> OTHER INFORMATION: Synthetic construct

<400> SEQUENCE: 11
cmgmcmgmcm gmcmgmcmgm cmgmcmgmcm gmtmgmtmgm tmgmtmgmtm gmtmgmtmgm      60
tmgmtmgmtm gmtmgmtmgm cmgmcmgmcm gmcmgmcmgm cmgmcmgmcm gm            112

<210> SEQ ID NO 12

```
<211> LENGTH: 56
<212> TYPE: RNA
<213> ORGANISM: Artificial Sequence
<220> FEATURE:
<223> OTHER INFORMATION: Synthetic construct

<400> SEQUENCE: 12
cgcgcgcgcg cgcgcgugug ugugugugug ugugugugug cgcgcgcgcg cgcgcg          56

<210> SEQ ID NO 13
<211> LENGTH: 68
<212> TYPE: RNA
<213> ORGANISM: Artificial Sequence
<220> FEATURE:
<223> OTHER INFORMATION: Synthetic construct

<400> SEQUENCE: 13
gmamgmamgm amgmcmgmcm gmumgmcmam gmamgmamcm umumgmgmum gmgmumgmcm       60 amumamam                                                               68

<210> SEQ ID NO 14
<211> LENGTH: 34
<212> TYPE: RNA
<213> ORGANISM: Artificial Sequence
<220> FEATURE:
<223> OTHER INFORMATION: Synthetic construct

<400> SEQUENCE: 14
gagagagcgc gugugugugu guggguggugc auaa                                 34

<210> SEQ ID NO 15
<211> LENGTH: 29
<212> TYPE: DNA
<213> ORGANISM: Unknown
<220> FEATURE:
<223> OTHER INFORMATION: natural sequence

<400> SEQUENCE: 15
gttcttttgt tttgtttttt aacacttgt                                        29

<210> SEQ ID NO 16
<211> LENGTH: 33
<212> TYPE: DNA
<213> ORGANISM: Unknown
<220> FEATURE:
<223> OTHER INFORMATION: natural sequence

<400> SEQUENCE: 16
ttaagtgagt ttttgttctt agataaccca cat                                   33

<210> SEQ ID NO 17
<211> LENGTH: 25
<212> TYPE: DNA
<213> ORGANISM: Unknown
<220> FEATURE:
<223> OTHER INFORMATION: natural sequence

<400> SEQUENCE: 17
ttgtggtgtg ctttgcagga ggact                                            25

<210> SEQ ID NO 18
<211> LENGTH: 37
<212> TYPE: DNA
<213> ORGANISM: Unknown
<220> FEATURE:
<223> OTHER INFORMATION: natural sequence
```

-continued

<400> SEQUENCE: 18
ttaaataaaa ctgatttaaa taatatgtgt ctttgtt                                    37

<210> SEQ ID NO 19
<211> LENGTH: 29
<212> TYPE: RNA
<213> ORGANISM: Unknown
<220> FEATURE:
<223> OTHER INFORMATION: natural sequence

<400> SEQUENCE: 19 guucuuugu uuuguuuuuu aacacuugu                                              29

<210> SEQ ID NO 20
<211> LENGTH: 33
<212> TYPE: RNA
<213> ORGANISM: Unknown
<220> FEATURE:
<223> OTHER INFORMATION: natural sequence

<400> SEQUENCE: 20
uuaagugagu uuuguucuu agauaaccca cau                                         33

<210> SEQ ID NO 21
<211> LENGTH: 25
<212> TYPE: RNA
<213> ORGANISM: Unknown
<220> FEATURE:
<223> OTHER INFORMATION: natural sequence

<400> SEQUENCE: 21
uuguggugug cuuugcagga ggacu                                                 25

<210> SEQ ID NO 22
<211> LENGTH: 37
<212> TYPE: RNA
<213> ORGANISM: Unknown
<220> FEATURE:
<223> OTHER INFORMATION: natural sequence

<400> SEQUENCE: 22
uuaaauaaaa cugauuuaaa uaauaugugu cuuuguu                                    37

<210> SEQ ID NO 23
<211> LENGTH: 286
<212> TYPE: DNA
<213> ORGANISM: Unknown
<220> FEATURE:
<223> OTHER INFORMATION: natural sequence

<400> SEQUENCE: 23
accccatttt ccttaattat ttcaggaata attctcccga aatcaggtca accccatcac           60
caaccaacca accagttgag ttccagattc tatgtgaatt aaaaagtcaa tatatgtata          120
attctgagat gacttaggtt ggacattcaa tgttgtgcta tgaatttcct ctttatgcag          180
agtatctgtt tgcttgcaga gtggctttct ggcttgctgc cagcctgtgc atggaccacg          240
cttatgagtt caggatctac ggcaatgtga atcattcaga tgttta                        286

<210> SEQ ID NO 24
<211> LENGTH: 35
<212> TYPE: DNA
<213> ORGANISM: Unknown
<220> FEATURE:

<223> OTHER INFORMATION: natural sequence

<400> SEQUENCE: 24
ttggacattc aatgttgtgc tatgaatttc ctctt                                    35

<210> SEQ ID NO 25
<211> LENGTH: 286
<212> TYPE: RNA
<213> ORGANISM: Unknown
<220> FEATURE:
<223> OTHER INFORMATION: natural sequence

<400> SEQUENCE: 25
acccccauuu ccuuaauuau uucaggaaua auucucccga aaucagguca accccaucac         60
caaccaacca accaguugag uuccagauuc uaugugaauu aaaaagucaa uauauguaua        120
auucugagau gacuuagguu ggacauucaa uguugugcua ugaauuccu cuuuaugcag         180 aguaucuguu ugcuugcaga guggcuuucu ggcuugcugc cagccugugc auggaccacg        240
cuuaugaguu caggaucuac ggcaauguga aucauucaga uguuua                      286

<210> SEQ ID NO 26
<211> LENGTH: 35
<212> TYPE: RNA
<213> ORGANISM: Unknown
<220> FEATURE:
<223> OTHER INFORMATION: natural sequence

<400> SEQUENCE: 26
uuggacauuc aauguugugc uaugaauuuc cucuu                                    35

<210> SEQ ID NO 27
<211> LENGTH: 23
<212> TYPE: DNA
<213> ORGANISM: Unknown
<220> FEATURE:
<223> OTHER INFORMATION: natural sequence

<400> SEQUENCE: 27
gattaaaagt tgtgttcccc aat                                                 23

<210> SEQ ID NO 28
<211> LENGTH: 23
<212> TYPE: RNA
<213> ORGANISM: Unknown
<220> FEATURE:
<223> OTHER INFORMATION: natural sequence

<400> SEQUENCE: 28
gauuaaaagu uguguucccc aau                                                 23

<210> SEQ ID NO 29
<211> LENGTH: 46
<212> TYPE: DNA
<213> ORGANISM: Unknown
<220> FEATURE:
<223> OTHER INFORMATION: natural sequence

<400> SEQUENCE: 29
gagacctggt tgtgtgtgtg tgagtggttg accttcctcc atcccc                        46

<210> SEQ ID NO 30
<211> LENGTH: 46
<212> TYPE: RNA
<213> ORGANISM: Unknown

```
<220> FEATURE:
<223> OTHER INFORMATION: natural sequence

<400> SEQUENCE: 30
gagaccuggu ugugugugug ugagugguug accuuccucc auccc              46

<210> SEQ ID NO 31
<211> LENGTH: 28
<212> TYPE: DNA
<213> ORGANISM: Unknown
<220> FEATURE:
<223> OTHER INFORMATION: natural sequence

<400> SEQUENCE: 31
gtgtttgtgt gtgtgcgcgt gtgcgttc                                 28

<210> SEQ ID NO 32
<211> LENGTH: 28
<212> TYPE: RNA
<213> ORGANISM: Unknown
<220> FEATURE:
<223> OTHER INFORMATION: natural sequence

<400> SEQUENCE: 32
guguuugugu gugugcgcgu gugcguuc                                 28

<210> SEQ ID NO 33
<211> LENGTH: 12
<212> TYPE: DNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 33
atgtgtgtgt gt                                                  12

<210> SEQ ID NO 34
<211> LENGTH: 12
<212> TYPE: DNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 34
gtatgtgtgt gt                                                  12

<210> SEQ ID NO 35
<211> LENGTH: 12
<212> TYPE: DNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 35
gtgtatgtgt gt                                                  12

<210> SEQ ID NO 36
<211> LENGTH: 12
```

```
<212> TYPE: DNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 36
gtgtgtatgt gt                                                           12

<210> SEQ ID NO 37
<211> LENGTH: 12
<212> TYPE: DNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 37
gtgtgtgtgt at                                                           12

<210> SEQ ID NO 38
<211> LENGTH: 12
<212> TYPE: DNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 38
tatgtgtgtg tg                                                           12

<210> SEQ ID NO 39
<211> LENGTH: 12
<212> TYPE: DNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 39
tgtatgtgtg tg                                                           12

<210> SEQ ID NO 40
<211> LENGTH: 12
<212> TYPE: DNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 40
tgtgtatgtg tg                                                           12

<210> SEQ ID NO 41
<211> LENGTH: 12
<212> TYPE: DNA
<213> ORGANISM: Artificial Sequence
<220> FEATURE:
<223> OTHER INFORMATION: Synthetic construct
```

```
<220> FEATURE:
<221> NAME/KEY: repeat_unit
<222> LOCATION: (1)..(12)

<400> SEQUENCE: 41
tgtgtatgtg tg                                                             12

<210> SEQ ID NO 42
<211> LENGTH: 12
<212> TYPE: DNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 42
tgtgtgtatg tg                                                             12

<210> SEQ ID NO 43
<211> LENGTH: 12
<212> TYPE: DNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 43
tgtgtgtgta tg                                                             12

<210> SEQ ID NO 44
<211> LENGTH: 12
<212> TYPE: DNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 44
tgtgtgtgtg ta                                                             12

<210> SEQ ID NO 45
<211> LENGTH: 12
<212> TYPE: RNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 45
augugugugu gu                                                             12

<210> SEQ ID NO 46
<211> LENGTH: 12
<212> TYPE: RNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)
```

```
<400> SEQUENCE: 46
guaugugugu gu                                                           12

<210> SEQ ID NO 47
<211> LENGTH: 12
<212> TYPE: RNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 47
guguaugugu gu                                                           12

<210> SEQ ID NO 48
<211> LENGTH: 12
<212> TYPE: RNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 48 gugugugaugu gu                                                          12

<210> SEQ ID NO 49
<211> LENGTH: 12
<212> TYPE: RNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 49
gugugugugu au                                                           12

<210> SEQ ID NO 50
<211> LENGTH: 12
<212> TYPE: RNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 50
uaugugugug ug                                                           12

<210> SEQ ID NO 51
<211> LENGTH: 12
<212> TYPE: RNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 51
uguaugugug ug                                                           12
```

```
<210> SEQ ID NO 52
<211> LENGTH: 12
<212> TYPE: RNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 52
uguguaugug ug                                                          12

<210> SEQ ID NO 53
<211> LENGTH: 12
<212> TYPE: RNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 53
uguguaugug ug                                                          12

<210> SEQ ID NO 54
<211> LENGTH: 12
<212> TYPE: RNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 54
uguguguaug ug                                                          12

<210> SEQ ID NO 55
<211> LENGTH: 12
<212> TYPE: RNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 55
ugugugugua ug                                                          12

<210> SEQ ID NO 56
<211> LENGTH: 12
<212> TYPE: RNA
<213> ORGANISM: Artificial Sequence
<220> FEATURE:
<223> OTHER INFORMATION: Synthetic construct
<220> FEATURE:
<221> NAME/KEY: repeat_unit
<222> LOCATION: (1)..(12)

<400> SEQUENCE: 56
ugugugugug ua                                                          12

<210> SEQ ID NO 57
<211> LENGTH: 70
<212> TYPE: DNA
```

```
<213> ORGANISM: Unknown
<220> FEATURE:
<223> OTHER INFORMATION: natural sequence

<400> SEQUENCE: 57
ggtccagaag cgtgtgtgtg tatgtgtgtg tgtgtgtgtg tgtgtgtgtg      60
tgtttgtgtg                                                  70

<210> SEQ ID NO 58
<211> LENGTH: 70
<212> TYPE: RNA
<213> ORGANISM: Unknown
<220> FEATURE:
<223> OTHER INFORMATION: natural sequence

<400> SEQUENCE: 58
gguccagaag cgugugugug uaugugugug ugugugugug ugugugugug      60
uguuugugug                                                  70

<210> SEQ ID NO 59
<211> LENGTH: 34
<212> TYPE: RNA
<213> ORGANISM: Unknown
<220> FEATURE:
<223> OTHER INFORMATION: natural sequence

<400> SEQUENCE: 59
gagagagcgc gugcagagac uuggguggugc auaa                      34

<210> SEQ ID NO 60
<211> LENGTH: 34
<212> TYPE: RNA
<213> ORGANISM: Unknown
<220> FEATURE:
<223> OTHER INFORMATION: natural sequence

<400> SEQUENCE: 60
uaggaggguc agaacugaga gugguacauc gcgg                       34

<210> SEQ ID NO 61
<211> LENGTH: 56
<212> TYPE: DNA
<213> ORGANISM: Artificial Sequence
<220> FEATURE:
<223> OTHER INFORMATION: Synthetic construct

<400> SEQUENCE: 61
cgcgcgcgcg cgcgcgtgtg tgtgtgtgtg tgtgtgtgtg cgcgcgcgcg cgcgcg     56

<210> SEQ ID NO 62
<211> LENGTH: 20
<212> TYPE: DNA
<213> ORGANISM: Artificial Sequence
<220> FEATURE:
<223> OTHER INFORMATION: Synthetic construct

<400> SEQUENCE: 62
tgaatgtgtg tgtgtgttgt                                       20

<210> SEQ ID NO 63
<211> LENGTH: 20
<212> TYPE: RNA
<213> ORGANISM: Artificial Sequence
<220> FEATURE:
<223> OTHER INFORMATION: Synthetic construct
```

<400> SEQUENCE: 63
ugaaugugug uguguguugu                                        20

<210> SEQ ID NO 64
<211> LENGTH: 36
<212> TYPE: RNA
<213> ORGANISM: Artificial Sequence
<220> FEATURE:
<223> OTHER INFORMATION: Synthetic construct

<400> SEQUENCE: 64
ugugugugug ugugugugug ugugugugug ugugug                      36

<210> SEQ ID NO 65
<211> LENGTH: 32
<212> TYPE: RNA
<213> ORGANISM: Artificial Sequence
<220> FEATURE:
<223> OTHER INFORMATION: Synthetic construct

<400> SEQUENCE: 65
ugugugugug ugugugugug ugugugugug ug                          32

<210> SEQ ID NO 66
<211> LENGTH: 28
<212> TYPE: RNA
<213> ORGANISM: Artificial Sequence
<220> FEATURE:
<223> OTHER INFORMATION: Synthetic construct

<400> SEQUENCE: 66
ugugugugug ugugugugug ugugugug                               28

<210> SEQ ID NO 67
<211> LENGTH: 22
<212> TYPE: RNA
<213> ORGANISM: Artificial Sequence
<220> FEATURE:
<223> OTHER INFORMATION: Synthetic construct

<400> SEQUENCE: 67
ugugugugug ugugugugug ug                                     22

<210> SEQ ID NO 68
<211> LENGTH: 20
<212> TYPE: RNA
<213> ORGANISM: Artificial Sequence
<220> FEATURE:
<223> OTHER INFORMATION: Synthetic construct

<400> SEQUENCE: 68
ugugugugug ugugugugug                                        20

<210> SEQ ID NO 69
<211> LENGTH: 18
<212> TYPE: RNA
<213> ORGANISM: Artificial Sequence
<220> FEATURE:
<223> OTHER INFORMATION: Synthetic construct

<400> SEQUENCE: 69
ugugugugug ugugugug                                          18

<210> SEQ ID NO 70

```
<211> LENGTH: 16
<212> TYPE: RNA
<213> ORGANISM: Artificial Sequence
<220> FEATURE:
<223> OTHER INFORMATION: Synthetic construct

<400> SEQUENCE: 70
ugugugugug ugugug                                                     16

<210> SEQ ID NO 71
<211> LENGTH: 14
<212> TYPE: RNA
<213> ORGANISM: Artificial Sequence
<220> FEATURE:
<223> OTHER INFORMATION: Synthetic construct

<400> SEQUENCE: 71
ugugugugug ugug                                                       14

<210> SEQ ID NO 72
<211> LENGTH: 12
<212> TYPE: RNA
<213> ORGANISM: Artificial Sequence
<220> FEATURE:
<223> OTHER INFORMATION: Synthetic construct

<400> SEQUENCE: 72
ugugugugug ug                                                         12

<210> SEQ ID NO 73
<211> LENGTH: 10
<212> TYPE: RNA
<213> ORGANISM: Artificial Sequence
<220> FEATURE:
<223> OTHER INFORMATION: Synthetic construct

<400> SEQUENCE: 73
ugugugugug                                                            10

<210> SEQ ID NO 74
<211> LENGTH: 24
<212> TYPE: DNA
<213> ORGANISM: Artificial Sequence
<220> FEATURE:
<223> OTHER INFORMATION: Synthetic construct

<400> SEQUENCE: 74
tgtgtgtgtg tgtgtgtgtg tgtg                                            24

<210> SEQ ID NO 75
<211> LENGTH: 36
<212> TYPE: DNA
<213> ORGANISM: Artificial Sequence
<220> FEATURE:
<223> OTHER INFORMATION: Synthetic construct

<400> SEQUENCE: 75
tgtgtgtgtg tgtgtgtgtg tgtgtgtgtg tgtgtg                               36

<210> SEQ ID NO 76
<211> LENGTH: 32
<212> TYPE: DNA
<213> ORGANISM: Artificial Sequence
<220> FEATURE:
<223> OTHER INFORMATION: Synthetic construct

<400> SEQUENCE: 76
```

```
tgtgtgtgtg tgtgtgtgtg tgtgtgtgtg tg                                 32

<210> SEQ ID NO 77
<211> LENGTH: 28
<212> TYPE: DNA
<213> ORGANISM: Artificial Sequence
<220> FEATURE:
<223> OTHER INFORMATION: Synthetic construct

<400> SEQUENCE: 77
tgtgtgtgtg tgtgtgtgtg tgtgtgtg                                      28

<210> SEQ ID NO 78
<211> LENGTH: 22
<212> TYPE: DNA
<213> ORGANISM: Artificial Sequence
<220> FEATURE:
<223> OTHER INFORMATION: Synthetic construct

<400> SEQUENCE: 78
tgtgtgtgtg tgtgtgtgtg tg                                            22

<210> SEQ ID NO 79
<211> LENGTH: 20
<212> TYPE: DNA
<213> ORGANISM: Artificial Sequence
<220> FEATURE:
<223> OTHER INFORMATION: Synthetic construct

<400> SEQUENCE: 79
tgtgtgtgtg tgtgtgtgtg                                               20

<210> SEQ ID NO 80
<211> LENGTH: 18
<212> TYPE: DNA
<213> ORGANISM: Artificial Sequence
<220> FEATURE:
<223> OTHER INFORMATION: Synthetic construct

<400> SEQUENCE: 80
tgtgtgtgtg tgtgtgtg                                                 18

<210> SEQ ID NO 81
<211> LENGTH: 16
<212> TYPE: DNA
<213> ORGANISM: Artificial Sequence
<220> FEATURE:
<223> OTHER INFORMATION: Synthetic construct

<400> SEQUENCE: 81
tgtgtgtgtg tgtgtg                                                   16

<210> SEQ ID NO 82
<211> LENGTH: 14
<212> TYPE: DNA
<213> ORGANISM: Artificial Sequence
<220> FEATURE:
<223> OTHER INFORMATION: Synthetic construct

<400> SEQUENCE: 82
tgtgtgtgtg tgtg                                                     14

<210> SEQ ID NO 83
<211> LENGTH: 12
<212> TYPE: DNA
```

-continued

```
<213> ORGANISM: Artificial Sequence
<220> FEATURE:
<223> OTHER INFORMATION: Synthetic construct

<400> SEQUENCE: 83
tgtgtgtgtg tg                                                          12

<210> SEQ ID NO 84
<211> LENGTH: 10
<212> TYPE: DNA
<213> ORGANISM: Artificial Sequence
<220> FEATURE:
<223> OTHER INFORMATION: Synthetic construct

<400> SEQUENCE: 84
tgtgtgtgtg                                                             10

<210> SEQ ID NO 85
<211> LENGTH: 41
<212> TYPE: DNA
<213> ORGANISM: Artificial Sequence
<220> FEATURE:
<223> OTHER INFORMATION: Synthetic construct

<400> SEQUENCE: 85
gtgtgtgtgt gtgtgtgtgt gtgtgtgtgt gtgtgtgtat g                          41

<210> SEQ ID NO 86
<211> LENGTH: 21
<212> TYPE: DNA
<213> ORGANISM: Artificial Sequence
<220> FEATURE:
<223> OTHER INFORMATION: Synthetic construct

<400> SEQUENCE: 86
gtggttgtgt gtgtgtggta t                                                21

<210> SEQ ID NO 87
<211> LENGTH: 41
<212> TYPE: RNA
<213> ORGANISM: Artificial Sequence
<220> FEATURE:
<223> OTHER INFORMATION: Synthetic construct

<400> SEQUENCE: 87
gugugugugu gugugugugu gugugugugu guguguguau g                          41

<210> SEQ ID NO 88
<211> LENGTH: 21
<212> TYPE: RNA
<213> ORGANISM: Artificial Sequence
<220> FEATURE:
<223> OTHER INFORMATION: Synthetic construct

<400> SEQUENCE: 88
gugguugugu gugugugguau                                                 21

<210> SEQ ID NO 89
<211> LENGTH: 28
<212> TYPE: DNA
<213> ORGANISM: Artificial Sequence
<220> FEATURE:
<223> OTHER INFORMATION: Synthetic construct

<400> SEQUENCE: 89
cgcgcgcgcg cgcgcgcgcg cgcgcgcg                                         28
```

<210> SEQ ID NO 90
<211> LENGTH: 24
<212> TYPE: DNA
<213> ORGANISM: Artificial Sequence
<220> FEATURE:
<223> OTHER INFORMATION: Synthetic construct

<400> SEQUENCE: 90
cgcgcgcgcg cgcgcgcgcg cgcg                                          24

<210> SEQ ID NO 91
<211> LENGTH: 20
<212> TYPE: DNA
<213> ORGANISM: Artificial Sequence
<220> FEATURE:
<223> OTHER INFORMATION: Synthetic construct

<400> SEQUENCE: 91
cgcgcgcgcg cgcgcgcgcg                                               20

<210> SEQ ID NO 92
<211> LENGTH: 16
<212> TYPE: DNA
<213> ORGANISM: Artificial Sequence
<220> FEATURE:
<223> OTHER INFORMATION: Synthetic construct

<400> SEQUENCE: 92
cgcgcgcgcg cgcgcg                                                   16

<210> SEQ ID NO 93
<211> LENGTH: 14
<212> TYPE: DNA
<213> ORGANISM: Artificial Sequence
<220> FEATURE:
<223> OTHER INFORMATION: Synthetic construct

<400> SEQUENCE: 93
cgcgcgcgcg cgcg                                                     14

<210> SEQ ID NO 94
<211> LENGTH: 12
<212> TYPE: DNA
<213> ORGANISM: Artificial Sequence
<220> FEATURE:
<223> OTHER INFORMATION: Synthetic construct

<400> SEQUENCE: 94
cgcgcgcgcg cg                                                       12

<210> SEQ ID NO 95
<211> LENGTH: 10
<212> TYPE: DNA
<213> ORGANISM: Artificial Sequence
<220> FEATURE:
<223> OTHER INFORMATION: Synthetic construct

<400> SEQUENCE: 95
cgcgcgcgcg                                                          10

<210> SEQ ID NO 96
<211> LENGTH: 48
<212> TYPE: RNA
<213> ORGANISM: Unknown
<220> FEATURE:

```
<223> OTHER INFORMATION: natural sequence

<400> SEQUENCE: 96
gagguggcua uggagguggc uauggaggug gcuauggagg uggcuaug                    48

<210> SEQ ID NO 97
<211> LENGTH: 24
<212> TYPE: RNA
<213> ORGANISM: Unknown
<220> FEATURE:
<223> OTHER INFORMATION: natural sequence

<400> SEQUENCE: 97
gacugaaaaa ggugguuuc uuuu                                               24

<210> SEQ ID NO 98
<211> LENGTH: 25
<212> TYPE: RNA
<213> ORGANISM: Unknown
<220> FEATURE:
<223> OTHER INFORMATION: natural sequence

<400> SEQUENCE: 98
cuaggaugga ggugggaau gguac                                              25

<210> SEQ ID NO 99
<211> LENGTH: 48
<212> TYPE: RNA
<213> ORGANISM: Artificial Sequence
<220> FEATURE:
<223> OTHER INFORMATION: Synthetic construct

<400> SEQUENCE: 99
auugaggagc agcagagaag uuggagugaa ggcagagagg gguuaagg                    48

<210> SEQ ID NO 100
<211> LENGTH: 48
<212> TYPE: RNA
<213> ORGANISM: Artificial Sequence
<220> FEATURE:
<223> OTHER INFORMATION: Synthetic construct

<400> SEQUENCE: 100
auugaggagc agcagagaag uuggaaaaaa aaaaaaaaaa aaaaaaaa                    48

<210> SEQ ID NO 101
<211> LENGTH: 48
<212> TYPE: RNA
<213> ORGANISM: Artificial Sequence
<220> FEATURE:
<223> OTHER INFORMATION: Synthetic construct

<400> SEQUENCE: 101
aaaaaaaaaa aaaaaaaaa aaaaagugaa ggcagagagg gguuaagg                     48

<210> SEQ ID NO 102
<211> LENGTH: 39
<212> TYPE: RNA
<213> ORGANISM: Unknown
<220> FEATURE:
<223> OTHER INFORMATION: natural sequence

<400> SEQUENCE: 102
accaugauca cgaagguggu uucccaggg cgaggcuua                               39
```

```
<210> SEQ ID NO 103
<211> LENGTH: 43
<212> TYPE: RNA
<213> ORGANISM: Unknown
<220> FEATURE:
<223> OTHER INFORMATION: natural sequence

<400> SEQUENCE: 103
cuccggaugu gcugaccccu gcgauuuccc caaauguggg aaa          43

<210> SEQ ID NO 104
<211> LENGTH: 28
<212> TYPE: RNA
<213> ORGANISM: Unknown
<220> FEATURE:
<223> OTHER INFORMATION: natural sequence

<400> SEQUENCE: 104
gaaaauuaau gugugugugu ggaaaauu                           28

<210> SEQ ID NO 105
<211> LENGTH: 25
<212> TYPE: RNA
<213> ORGANISM: Unknown
<220> FEATURE:
<223> OTHER INFORMATION: natural sequence

<400> SEQUENCE: 105
uuguauuuug agcuaguuug gugau                              25

<210> SEQ ID NO 106
<211> LENGTH: 24
<212> TYPE: RNA
<213> ORGANISM: Artificial Sequence
<220> FEATURE:
<223> OTHER INFORMATION: Synthetic construct

<400> SEQUENCE: 106
ucagagacau caucagagac auca                               24

<210> SEQ ID NO 107
<211> LENGTH: 24
<212> TYPE: RNA
<213> ORGANISM: Artificial Sequence
<220> FEATURE:
<223> OTHER INFORMATION: Synthetic construct

<400> SEQUENCE: 107
ggugagcaca gaggugagca caga                               24

<210> SEQ ID NO 108
<211> LENGTH: 24
<212> TYPE: RNA
<213> ORGANISM: Artificial Sequence
<220> FEATURE:
<223> OTHER INFORMATION: Synthetic construct

<400> SEQUENCE: 108
ccaaucuucc uuccaaucuu ccuu                               24

<210> SEQ ID NO 109
<211> LENGTH: 24
<212> TYPE: RNA
<213> ORGANISM: Artificial Sequence
<220> FEATURE:
<223> OTHER INFORMATION: Synthetic construct
```

```
<400> SEQUENCE: 109
gauggauucc aggauggauu ccag                                              24

<210> SEQ ID NO 110
<211> LENGTH: 24
<212> TYPE: RNA
<213> ORGANISM: Artificial Sequence
<220> FEATURE:
<223> OTHER INFORMATION: Synthetic construct

<400> SEQUENCE: 110
aaacggucug auaaacgguc ugau                                              24

<210> SEQ ID NO 111
<211> LENGTH: 40
<212> TYPE: RNA
<213> ORGANISM: Artificial Sequence
<220> FEATURE:
<223> OTHER INFORMATION: Synthetic construct

<400> SEQUENCE: 111
augucgcaga augucgcaga augucgcaga augucgcaga                             40

<210> SEQ ID NO 112
<211> LENGTH: 40
<212> TYPE: RNA
<213> ORGANISM: Artificial Sequence
<220> FEATURE:
<223> OTHER INFORMATION: Synthetic construct

<400> SEQUENCE: 112
aaccuucgua aaccuucgua aaccuucgua aaccuucgua                             40

<210> SEQ ID NO 113
<211> LENGTH: 24
<212> TYPE: RNA
<213> ORGANISM: Artificial Sequence
<220> FEATURE:
<223> OTHER INFORMATION: Synthetic construct

<400> SEQUENCE: 113
cgcuggcauc cacgcuggca ucca                                              24

<210> SEQ ID NO 114
<211> LENGTH: 24
<212> TYPE: RNA
<213> ORGANISM: Artificial Sequence
<220> FEATURE:
<223> OTHER INFORMATION: Synthetic construct

<400> SEQUENCE: 114
aaagcggcga ugaaagcggc gaug                                              24

<210> SEQ ID NO 115
<211> LENGTH: 24
<212> TYPE: RNA
<213> ORGANISM: Artificial Sequence
<220> FEATURE:
<223> OTHER INFORMATION: Synthetic construct

<400> SEQUENCE: 115
uauugauccg guuauugauc cggu                                              24

<210> SEQ ID NO 116
<211> LENGTH: 50
```

```
<212> TYPE: RNA
<213> ORGANISM: Artificial Sequence
<220> FEATURE:
<223> OTHER INFORMATION: Synthetic construct

<400> SEQUENCE: 116
cmumamgmgm amumgmgmam gmgmumgmgm gmgmamamum gmgmumamcm      50

<210> SEQ ID NO 117
<211> LENGTH: 24
<212> TYPE: RNA
<213> ORGANISM: Artificial Sequence
<220> FEATURE:
<223> OTHER INFORMATION: Synthetic construct

<400> SEQUENCE: 117
gagguggcua uggagguggc uaug                                  24

<210> SEQ ID NO 118
<211> LENGTH: 24
<212> TYPE: RNA
<213> ORGANISM: Artificial Sequence
<220> FEATURE:
<223> OTHER INFORMATION: Synthetic construct

<400> SEQUENCE: 118
gugguggcua uggagguggc uaug                                  24

<210> SEQ ID NO 119
<211> LENGTH: 48
<212> TYPE: RNA
<213> ORGANISM: Artificial Sequence
<220> FEATURE:
<223> OTHER INFORMATION: Synthetic construct

<400> SEQUENCE: 119
ucagagacau caucagagac aucaucagag acaucaucag agacauca        48

<210> SEQ ID NO 120
<211> LENGTH: 112
<212> TYPE: DNA
<213> ORGANISM: Artificial Sequence
<220> FEATURE:
<223> OTHER INFORMATION: Synthetic construct

<400> SEQUENCE: 120
cmgmcmgmcm gmcmgmcmgm cmgmcmgmcm gmamcmamcm amcmamcmam cmamcmamcm      60
amcmamcmam cmamcmamcm cmgmcmgmcm gmcmgmcmgm cmgmcmgmcm gm             112

<210> SEQ ID NO 121
<211> LENGTH: 24
<212> TYPE: RNA
<213> ORGANISM: Artificial Sequence
<220> FEATURE:
<223> OTHER INFORMATION: Synthetic construct

<400> SEQUENCE: 121
uguauuuuga gcuaguuugc ugau                                  24

<210> SEQ ID NO 122
<211> LENGTH: 27
<212> TYPE: DNA
<213> ORGANISM: Artificial Sequence
<220> FEATURE:
<223> OTHER INFORMATION: Probe
<220> FEATURE:
```

```
<221> NAME/KEY: misc_feature
<222> LOCATION: 27
<223> OTHER INFORMATION: n is a, c, g, or t
<220> FEATURE:
<221> NAME/KEY: modified_base
<222> LOCATION: 27
<223> OTHER INFORMATION: nucleotide bound to label, Digoxigenin-label

<400> SEQUENCE: 122
tttttttttt tttttttttt tttttvn                                              27

<210> SEQ ID NO 123
<211> LENGTH: 22
<212> TYPE: DNA
<213> ORGANISM: Artificial Sequence
<220> FEATURE:
<223> OTHER INFORMATION: Probe
<220> FEATURE:
<221> NAME/KEY: modified_base
<222> LOCATION: 1
<223> OTHER INFORMATION: nucleotide bound to label, Digoxigenin-label

<400> SEQUENCE: 123
gtgtaacacg tctatacgcc ca                                                   22

<210> SEQ ID NO 124
<211> LENGTH: 14
<212> TYPE: PRT
<213> ORGANISM: Artificial Sequence
<220> FEATURE:
<223> OTHER INFORMATION: an amino acid sequence of viral RNA polymerase

<400> SEQUENCE: 124

Gly Lys Pro Ile Pro Asn Pro Leu Leu Gly Leu Asp Ser Thr
1               5                   10
```